(12) United States Patent
Shellhammer et al.

(10) Patent No.: US 10,856,222 B2
(45) Date of Patent: Dec. 1, 2020

(54) PREAMBLES FOR WAKE-UP RECEIVERS

(71) Applicant: QUALCOMM Incorporated, San Diego, CA (US)

(72) Inventors: Stephen Jay Shellhammer, Ramona, CA (US); Bin Tian, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/111,047

(22) Filed: Aug. 23, 2018

(65) Prior Publication Data

US 2019/0082385 A1 Mar. 14, 2019

Related U.S. Application Data

(60) Provisional application No. 62/557,123, filed on Sep. 11, 2017, provisional application No. 62/568,760, (Continued)

(51) Int. Cl.
*H04W 52/02* (2009.01)
*H04L 5/00* (2006.01)
(Continued)

(52) U.S. Cl.
CPC ....... *H04W 52/0203* (2013.01); *H04L 5/0091* (2013.01); *H04L 5/1446* (2013.01); *H04L 27/2613* (2013.01); *H04L 27/2655* (2013.01); *H04L 27/2666* (2013.01); *H04L 47/25* (2013.01); *H04W 52/0235* (2013.01); *H04W 84/12* (2013.01)

(58) Field of Classification Search
CPC . H04L 5/0091; H04L 5/1446; H04L 27/2613; H04L 27/2666; H04L 27/2655; H04L 47/25; H04W 52/0235; H04W 52/0203; H04W 84/12
See application file for complete search history.

(56) References Cited

U.S. PATENT DOCUMENTS

| 5,579,335 A | * | 11/1996 | Sutterlin | H04B 1/707 375/150 |
| 2012/0163480 A1 | * | 6/2012 | Nemeth | H04B 1/707 375/259 |
| 2018/0376370 A1 | * | 12/2018 | Shellhammer | H04W 28/065 |

OTHER PUBLICATIONS

Huang P-K., "Specification Framework for Tgba", IEEE 802.11/17-575r3, Aug. 8, 2017, 4 pages.
(Continued)

*Primary Examiner* — Jianye Wu
(74) *Attorney, Agent, or Firm* — Paradice and Li LLP/Qualcomm

(57) ABSTRACT

This disclosure provides systems, methods and apparatuses for indicating a data rate of a packet. The transmitting device may select the data rate of a data field of the packet to be transmitted to the receiving device, and may select a pattern to embed within a preamble of the packet based on the selected data rate. In some implementations, the transmitting device may select a first structure including a first number of instances of a sequence or its logical complement if the selected data rate is a low data rate, and may select a second structure including a second number of instances of the sequence or its logical complement if the selected data rate is a high data rate.

30 Claims, 25 Drawing Sheets

Related U.S. Application Data filed on Oct. 5, 2017, provisional application No. 62/571,244, filed on Oct. 11, 2017.

(51) Int. Cl.
  *H04L 27/26* (2006.01)
  *H04L 5/14* (2006.01)
  *H04L 12/825* (2013.01)
  *H04W 84/12* (2009.01)

(56) References Cited

OTHER PUBLICATIONS

Liu J., et al., "Preamble Design for WUR WLAN", IEEE 802.11-17/679r1, May 2017, 9 pages.
Shellhammer S., et al., "Preamble Design and Simulations," IEEE 802.11-17/991r0, Jul. 2017, 21 pages
Shellhammer S.J., et al., "Dual PHY Layer Design for Wake-up Receiver", IDF 170135, Sep. 30, 2016, 3 pages.
Azizi S., (Intel): "Preamble Options", IEEE Draft; 11-17-0997-00-00BA-Preamble-Options, IEEE-SA Mentor, Piscataway, NJ USA, vol. 802.11 ba Jul. 11, 2017, XP068116408, Retrieved from the Internet: URL:https://mentor.ieee.org/802.11 /dcn/17/11-17-0997-00-00ba-preamble-options.pptx [retrieved on Jul. 11, 2017], pp. 1-10.
International Search Report and Written Opinion—PCT/US2018/048609—ISA/EPO—dated Dec. 3, 2018 (176244WO).
Liu J., (Mediatek Inc): "WUR Packet Format and Preamble Design", IEEE Draft; 1 H 7-0679-02-00BA-1-WUR-Packet-Format-and-Preamble-Design, IEEE-SA Mentor, Piscataway, NJ USA, vol. 802.11 ba, No. 2 May 10, 2017, XP068115886, Retrieved from the Internet: URL:https://mentor.ieee.org/802.11 /dcn/17/11-17-0679-02-00ba-1-wur-packet-format-and-preamble-design.pptx [retrieved on May 10, 2017],pp. 1-9.
Shellhammer S., et al., (QUALCOMM): "WUR Data Rates", IEEE Draft; 11-17-0990-02-00BA-WUR-Data-Rates, IEEE-SA Mentor, Piscataway, NJ USA, vol. 802.11 ba, No. 2 Jul. 13, 2017, XP068116394, Retrieved from the Internet: URL:https://mentor.ieee.org/802.11/dcn/17/11-17-0990-02-00ba-wur-data-rates.pptx [retrieved on Jul. 13, 2017], pp. 1-9.
Wu T., (Mediatek): "WUR Preamble Design Follow Up", IEEE Draft; 11-17-1020-00-00BA-WUR-Preamble-Design-Follow-Up, IEEE-SA Mentor, Piscataway, NJ USA, vol. 802.11 ba Jul. 13, 2017 (Jul. 13, 2017), XP068116447, Retrieved from the Internet: URL:https://mentor.ieee.org/802.11 /dcn/17/11-17-1 020-00-00ba-wur-preamble-design-follow-up.pptx [retrieved on Jul. 13, 2017], 11 pages.

\* cited by examiner

| Metric | Value |
|---|---|
| ACMetric (short) | 8 |
| CCMetric (short, long) | 4 |
| ACMetric (long) | 4 |
| CCMetric (long, short) | 8 |

PREAMBLES FOR WAKE-UP RECEIVERS

CROSS-REFERENCE TO RELATED APPLICATIONS

This Patent Application claims priority to U.S. Provisional Patent Application No. 62/557,123 entitled "PREAMBLES FOR WAKE-UP RECEIVERS" filed on Sep. 11, 2017, to U.S. Provisional Patent Application No. 62/568,760 entitled "PREAMBLES FOR WAKE-UP RECEIVERS" filed on Oct. 5, 2017, and to U.S. Provisional Patent Application No. 62/571,244 entitled "PREAMBLES FOR WAKE-UP RECEIVERS" filed on Oct. 11, 2017, all assigned to the assignee hereof. The disclosures of all prior Applications are considered part of and are incorporated by reference in this Patent Application.

TECHNICAL FIELD

This disclosure relates generally to wireless communications, and more specifically to preambles for wake-up receivers in wireless devices.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with the AP in a Wi-Fi network may be referred to as wireless stations (STAs).

Bluetooth technology also allows a number of wireless devices to communicate with each other using radio-frequency signals. Although similar in some aspects to Wi-Fi devices, Bluetooth devices typically communicate with each other without the presence of an AP (or other central controller). In addition, although Bluetooth devices typically have shorter wireless ranges than Wi-Fi devices, Bluetooth radios are less expensive and consume less power than Wi-Fi radios. As a result, Bluetooth technology is particularly well suited for applications (such as the Internet of Things) in which minimizing power consumption may be more important than achieving high data rates. The Internet of Things (IoT) may refer to a communication system in which a wide variety of objects and devices wirelessly communicate with each other.

A wireless device may have a limited amount of battery power. During a sleep mode, a wireless device may periodically activate a radio, such as a wake-up receiver (WUR), to listen for and decode messages such as a wake-up message. The wake-up message may indicate whether another device (such as an AP) has queued data waiting to be transmitted to the wireless device. In some cases, the wireless device may not successfully decode the wake-up message.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for indicating a data rate of a packet to be transmitted to a receiving device. In some implementations, the method can be performed by a transmitting device and can include selecting the data rate of a data field of the packet; selecting a pattern to embed within a preamble of the packet based on the selected data rate by selecting a first structure if the selected data rate is a low data rate and selecting a second structure if the selected data rate is a high data rate; and transmitting the packet to the receiving device, the preamble of the packet including either the first structure or the second structure as the selected pattern. In some implementations, the first structure can include a first number of instances of a sequence or its logical complement, and the second structure can include a second number of instances of the sequence or its logical complement. In some aspects, the first structure can include two instances of the sequence, and the second structure can include a single instance of the logical complement of the sequence. In addition, or in the alternative, the second structure can include one or more instances of a second sequence or one or more instances of a logical complement of the second sequence, can include one or more instances of a pad sequence, or both.

In some implementations, the first structure may be configured to generate one or more positive peaks in a waveform when the first structure is correlated with a reference pattern, and the second structure may be configured to generate a negative peak in the waveform when the second structure is correlated with the reference pattern. In some aspects, the reference pattern may be derived from the sequence by converting each logical low bit of the sequence to a negative one, and converting each logical high bit of the sequence to a positive one.

Another innovative aspect of the subject matter described in this disclosure can be implemented in a transmitting device configured to indicate a data rate of a packet to be transmitted to a receiving device. In some implementations, the transmitting device can include one or more processors and a memory storing instructions. Execution of the instructions can cause the transmitting device to select the data rate of a data field of the packet; to select a pattern to embed within a preamble of the packet based on the selected data rate by selecting a first structure if the selected data rate is a low data rate and selecting a second structure if the selected data rate is a high data rate; and to transmit the packet to the receiving device, the preamble of the packet including either the first structure or the second structure as the selected pattern. In some implementations, the first structure can include a first number of instances of a sequence or its logical complement, and the second structure can include a second number of instances of the sequence or its logical complement. In some aspects, the first structure can include two instances of the sequence, and the second structure can include a single instance of the logical complement of the sequence. In addition, or in the alternative, the second structure can include one or more instances of a second sequence or one or more instances of a logical complement of the second sequence, can include one or more instances of a pad sequence, or both.

Another innovative aspect of the subject matter described in this disclosure can be implemented in a non-transitory computer-readable medium. The non-transitory computer-readable medium can store instructions that, when executed by one or more processors of an apparatus, cause the apparatus to perform a number of operations. In some implementations, the number of operations can include selecting a data rate of a data field of a packet to be transmitted to a receiving device; selecting a pattern to embed within a preamble of the packet based on the selected data rate by selecting a first structure if the selected data rate is a low data rate and selecting a second structure if the selected data rate is a high data rate; and transmitting the packet to the receiving device, the preamble of the packet including either the first structure or the second structure as the selected pattern. In some implementations, the first structure can include a first number of instances of a sequence or its logical complement, and the second structure can include a second number of instances of the sequence or its logical complement. In some aspects, the first structure can include two instances of the sequence, and the second structure can include a single instance of the logical complement of the sequence. In addition, or in the alternative, the second structure can include one or more instances of a second sequence or one or more instances of a logical complement of the second sequence, can include one or more instances of a pad sequence, or both.

Another innovative aspect of the subject matter described in this disclosure can be implemented in an apparatus configured to indicate a data rate of a packet to be transmitted to a receiving device. The apparatus can include means for selecting the data rate of a data field of the packet; means for selecting a pattern to embed within a preamble of the packet based on the selected data rate by selecting a first structure if the selected data rate is a low data rate and selecting a second structure if the selected data rate is a high data rate; and means for transmitting the packet to the receiving device, the preamble of the packet including either the first structure or the second structure as the selected pattern. In some implementations, the first structure can include a first number of instances of a sequence or its logical complement, and the second structure can include a second number of instances of the sequence or its logical complement. In some aspects, the first structure can include two instances of the sequence, and the second structure can include a single instance of the logical complement of the sequence. In addition, or in the alternative, the second structure can include one or more instances of a second sequence or one of more instances of a logical complement of the second sequence, can include one or more instances of a pad sequence, or both.

BRIEF DESCRIPTION OF THE DRAWINGS

Like reference numbers and designations in the various drawings indicate like elements.

DETAILED DESCRIPTION

Figure 1:
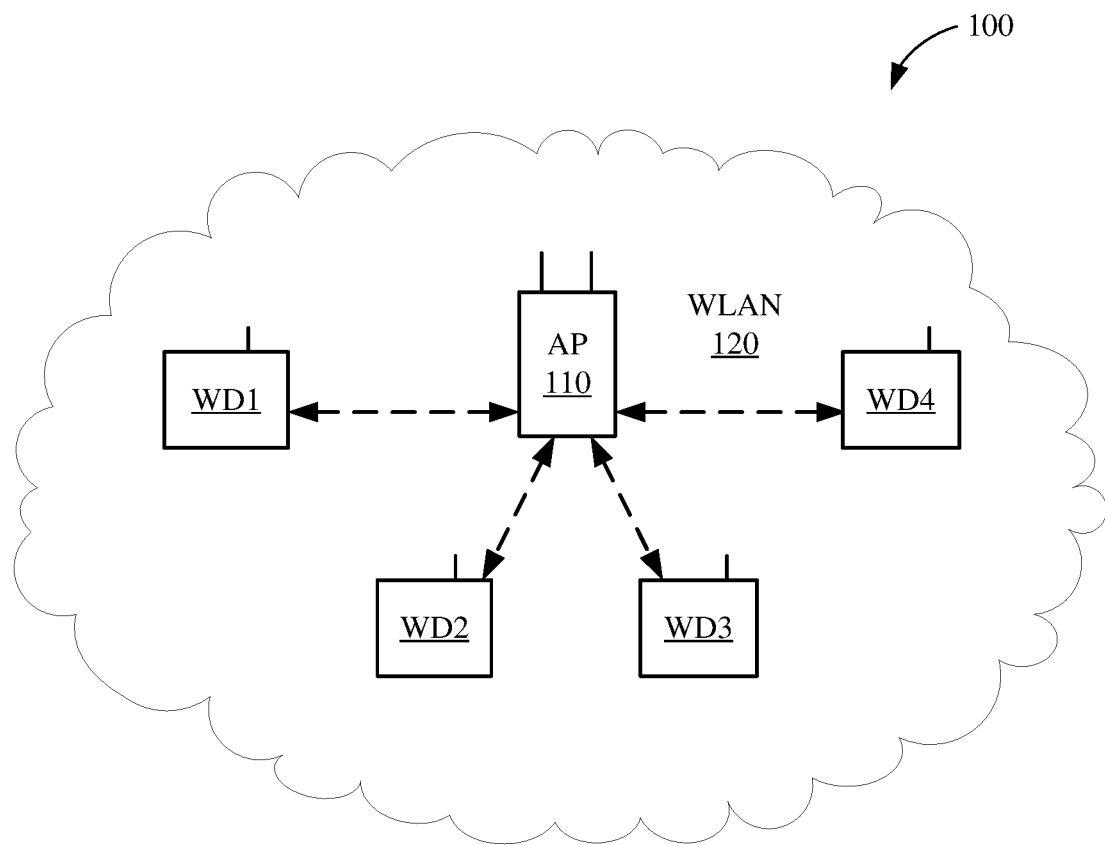
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 802.11 specifications, or any of the IEEE 802.15 specifications, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

To conserve power, some wireless devices may include a primary radio for communicating data during an active power state and a low-power radio for communicating data during a low-power state. To ensure that the wireless device receives all communications during the low-power state, the wireless device may periodically wake-up its low-power radio and listen for messages (such as wake-up messages) from an access point (AP) indicating that communications are waiting to be transmitted to the wireless device. As part of the power conservation, communications associated with the low-power radio may be transmitted at a lower data rate than communications associated with the primary radio.

Wake-up messages typically include a preamble, a signal field, and a data field. The preamble may be used for packet detection and symbol timing recovery, the signal field may indicate the data rate of the wake-up message, and the data field may contain data or instructions for a receiving device. Although the signal field may allow the receiving device to determine the data rate of the data field of the wake-up message, the signal field consumes overhead and increases the size and the transmit duration of the wake-up message.

Implementations of the subject matter described in this disclosure may allow a transmitting device to indicate the data rate of a wake-up message without using a signal field. In some implementations, the transmitting device may embed a pattern into the preamble of the wake-up message to indicate the data rate at which the data field of the wake-up message is transmitted, for example, so that a receiving device can determine the transmitted data rate by decoding and processing the pattern contained in the preamble of the wake-up message. In some aspects, the wake-up message includes a legacy preamble so that legacy devices can determine the data rate at which the data field of the wake-up message is transmitted without decoding any signaling fields (and without decoding any non-legacy portions of the wake-up message).

The transmitting device may select a data rate for transmitting the data field of the wake-up message, and may select a pattern to embed within the preamble of the wake-up message based on the selected data rate. In some implementations, the transmitting device may select a first structure to use as the selected pattern if the selected data rate is a low data rate, and may select a second structure to use as the selected pattern if the selected data rate is a high data rate (such that the first and second structures are different from each other). The first structure may include a first number of instances of a sequence or its logical complement, and the second structure may include a second number of instances of the sequence or its logical complement. In some aspects, the first structure includes two instances of the sequence, and the second structure includes a single instance of the logical complement of the sequence. In addition, or in the alternative, the second structure may include one or more instances of a second sequence or one of more instances of a logical complement of the second sequence, may include one or more instances of a pad sequence, or both.

A receiving device may correlate the received pattern with a reference pattern to generate a correlator output signal, and may determine the data rate of the data field of the wake-up message based on a presence of one or more positive peaks or a presence of one or more negative peaks in the correlator output signal. In some implementations, the presence of one or more positive peaks in the correlator output signal may correspond to the received pattern including two instances of the sequence, thereby indicating that the data field of the wake-up message was transmitted at the low date rate. Conversely, the presence of a negative peak in the correlator output signal may correspond to the received pattern including a single instance of the logical complement of the sequence, thereby indicating that the data field of the wake-up message was transmitted at the high date rate. In some aspects, the low data rate is approximately 62.5 kb/s, and the high data rate is approximately 250 kb/s. In other aspects, one or both of the low data rate and the high data rate may be of other suitable values.

In other implementations, the transmitting device may embed a pattern into the preamble of the wake-up message to indicate a first data rate, and may embed a logical complement of the pattern into the preamble of the wake-up message to indicate a second data rate. A receiving device may correlate the received pattern with a reference pattern to generate a correlator output signal, and may determine the data rate based on a presence of a positive peak or a negative peak in the correlator output signal. In some aspects, detection of a positive peak in the correlator output signal may indicate that the received pattern matches the reference pattern, which in turn may indicate that the wake-up message was transmitted at the first data rate. Detection of a negative peak in the correlator output signal may indicate that the received pattern is a logical complement of the reference pattern (the received pattern is "logically complemented"), which in turn may indicate that the wake-up message was transmitted at the second data rate.

In some other implementations, the transmitting device may transmit a wake-up message including a long preamble that contains a long pattern to indicate the first data rate, and may transmit a wake-up message including a short preamble that contains a short pattern to indicate the second data rate. A receiving device may correlate the received pattern with a reference pattern to generate a correlator output signal, and may determine the data rate based on a number of peaks present in the correlator output signal. In some aspects, detection of multiple peaks in the correlator output signal may indicate that the received pattern is the long pattern, which in turn may indicate that the wake-up message was transmitted at the first data rate. Detection of a single peak in the correlator output signal may indicate that the received pattern is the short pattern, which in turn may indicate that the wake-up message was transmitted at the second data rate.

FIG. 1 shows a block diagram of an example wireless system 100. The wireless system 100 is shown to include four wireless devices WD1-WD4, a wireless access point (AP) 110, and a wireless local area network (WLAN) 120. The WLAN 120 may be formed by a plurality of access points (APs) that may operate according to the IEEE 802.11 family of specifications (or according to other suitable wireless protocols). Thus, although only one AP 110 is shown in FIG. 1 for simplicity, it is to be understood that WLAN 120 may be formed by any number of access points such as the AP 110. The AP 110 may be assigned a unique MAC address that is programmed therein by, for example, the manufacturer of the access point. Similarly, each of the wireless devices WD1-WD4 also may be assigned a unique MAC address.

In some implementations, the wireless system 100 may correspond to a multiple-input multiple-output (MIMO) wireless network, and may support single-user MIMO (SU-MIMO) and multi-user MIMO (MU-MIMO) communications. For other implementations, the wireless system 100 may correspond to or utilize orthogonal frequency division multiple access (OFDMA) communications. Further, although the WLAN 120 is depicted in FIG. 1 as an infrastructure Basic Service Set (BSS), in some other implementations, WLAN 120 may be an Independent Basic Service Set (IBSS), an Extended Service Set (ESS), an ad-hoc network, or a peer-to-peer (P2P) network (such as operating according to Wi-Fi Direct protocols). Thus, although not specifically shown in FIG. 1, in some implementations the wireless devices WD1-WD4 may exchange signals directly with each other (such as without the presence of the AP 110).

The wireless devices WD1-WD4 may be any suitable Wi-Fi enabled wireless devices including, for example, cell phones, IoT devices, personal digital assistants (PDAs), tablet devices, laptop computers, or the like. The wireless devices WD1-WD4 also may be referred to as a wireless station (STA), a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the wireless devices WD1-WD4 may include one or more transceivers, one or more processing resources (such as processors or ASICs), one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described with respect to FIGS. 10-11, FIGS. 12A-12C, FIG. 13, FIGS. 17-18, and FIGS. 22-23.

The AP 110 may be any suitable device that allows one or more wireless devices to connect to a network (such as a local area network (LAN), wide area network (WAN), metropolitan area network (MAN), or the Internet) via the AP 110 using Wi-Fi, Bluetooth, cellular, or any other suitable wireless communication standards. In some implementations, the AP 110 may include one or more transceivers, a network interface, one or more processing resources, and one or more memory sources. The memory resources may include a non-transitory computer-readable medium (such as one or more nonvolatile memory elements, such as EPROM, EEPROM, Flash memory, a hard drive, etc.) that stores instructions for performing operations described with respect to FIGS. 10-11, FIGS. 12A-12C, FIG. 13, FIGS. 17-18, and FIGS. 22-23. In some implementations, one or more functions of an AP, such as AP 110, may be performed by a wireless station, such as one of the wireless devices WD1-WD4 (for example, when the wireless station is operating as a soft AP).

The one or more transceivers in each of the wireless devices WD1-WD4 and the AP 110 may include Wi-Fi transceivers, Bluetooth transceivers, cellular transceivers, or other suitable radio frequency (RF) transceivers (not shown for simplicity) to transmit and receive wireless communication signals. Each transceiver may communicate with other wireless devices in distinct frequency bands or using distinct communication protocols. For example, the Wi-Fi transceiver may communicate within a 2.4 GHz frequency band, within a 5 GHz frequency band, or within a 60 GHz frequency band in accordance with the IEEE 802.11 family of specifications. The cellular transceiver may communicate within various RF frequency bands in accordance with the LTE protocol described by the 3rd Generation Partnership Project (3GPP) (such as between approximately 700 MHz and approximately 3.9 GHz) or in accordance with other cellular protocols (such as the GSM protocol).

In some implementations, the transceivers included within the wireless devices WD1-WD4 also may include a wake-up receiver that can be used to receive frames or packets when the wireless devices WD1-WD4 are in a low-power mode or state. In some aspects, the wake-up receiver in a wireless device may listen for and receive a wake-up message transmitted from an AP, and may activate one or more Wi-Fi transceivers of the wireless device based on reception of the wake-up message.

Figure 2:
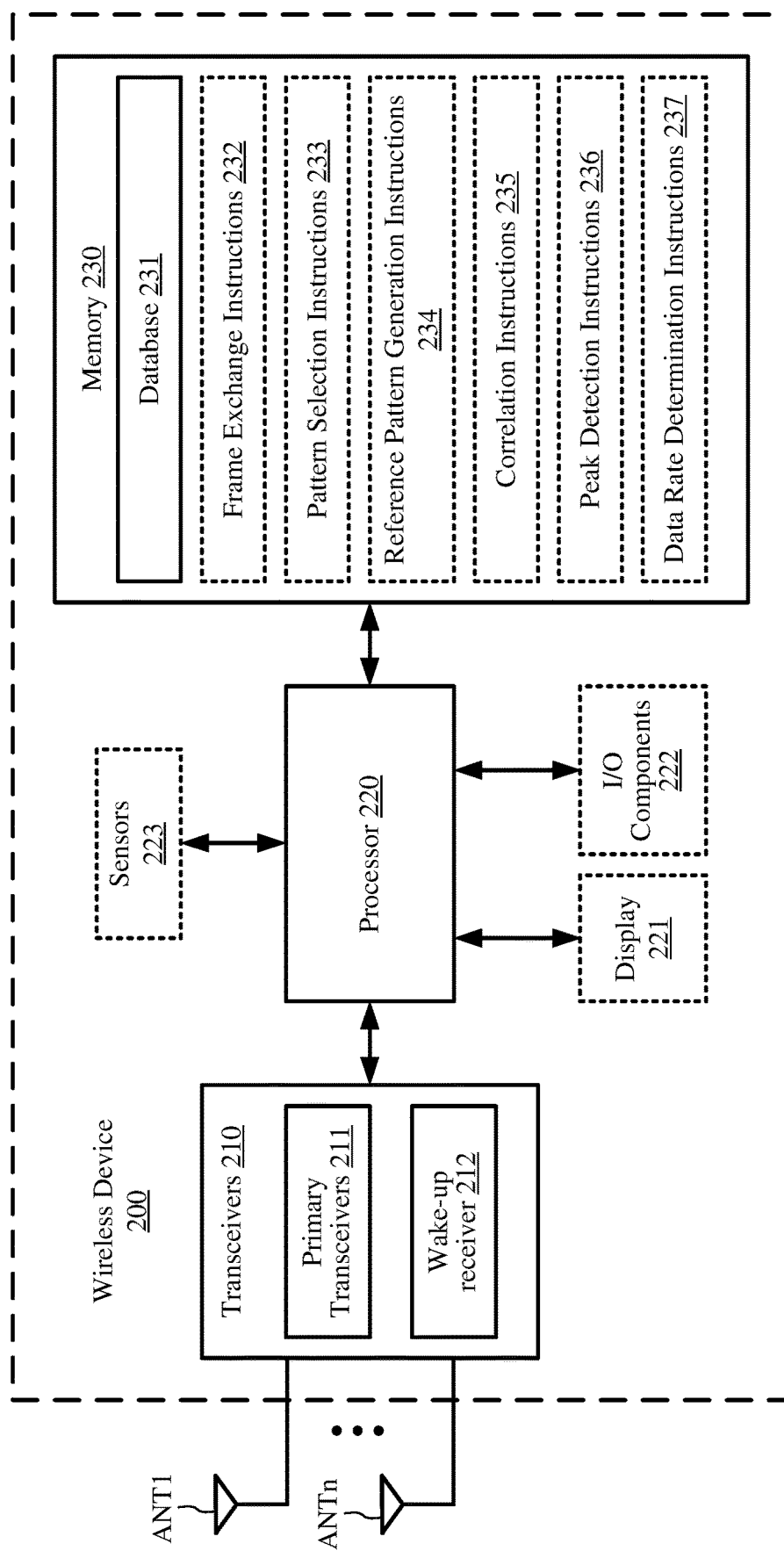
FIG. 2 shows a block diagram of an example wireless device.

FIG. 2 shows a block diagram of an example wireless device 200. The example wireless device 200 may be one implementation of at least one of the wireless devices WD1-WD4 or the AP 110 of FIG. 1. The wireless device 200 may include one or more transceivers 210, a processor 220, a memory 230, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, the AP 110 or one or more of the wireless devices WD1-WD4 of FIG. 1. Although not shown in FIG. 2 for simplicity, the transceivers 210 may include any number of transmit chains to process and transmit signals to other wireless devices via the antennas ANT1-ANTn, and may include any number of receive chains to process signals received from the antennas ANT1-ANTn. Thus, the wireless device 200 may be configured for MIMO operations. The MIMO operations may include SU-MIMO operations and MU-MIMO operations. In addition, the wireless device 200 may be configured for OFDMA communications and/or other suitable multiple access mechanisms, for example, as may be provided in the IEEE 802.11ax standards.

In some implementations, the one or more transceivers 210 may include a number of primary transceivers 211 and a number of wake-up receivers 212. The primary transceivers 211 may be used for exchanging data with other wireless devices at relatively high data rates when the wireless device 200 is in an active power mode, and the wake-up receiver 212 may be used for receiving data when the wireless device 200 is in a low-power state (such as a power save state or a sleep state). Although the wake-up receiver 212 may not support wideband transmissions and may not be able to achieve the same data rates as the primary transceivers 211, the wake-up receiver 212 consumes significantly less power than the primary transceivers 211. During a low-power mode, the wireless device 200 may reduce its power consumption (and thereby extend its battery life) by de-activating or powering down the primary transceivers 211 while using the wake-up receiver 212 to listen for messages (such as wake-up messages, beacon frames, and DTIMs) transmitted from an AP. In some aspects, the wake-up receiver 212 may consume between 2 and 3 orders of magnitude less power than the primary transceivers 211. The wake-up receiver 212 may be separate from the primary transceivers 211, for example, by not sharing any components with the primary transceivers 211. The separation between the primary transceivers 211 and the wake-up receiver 212 may allow the wake-up receiver 212 to remain operational when the primary transceivers 211 are in a low-power state.

The PHY layer of the wake-up receiver 212 may be configured for operation in an unlicensed frequency spectrum, for example, to achieve greater bandwidth for a given power level without violating power spectral density (PSD) limits. In addition, or in the alternative, the PHY layer of the wake-up receiver 212 may support a limited number of data rates (as compared to the PHY layers of the primary transceivers 211) to minimize circuit complexity and area. For example, while the PHY layers of the primary transceivers 211 may support as many as 20 (or more) data rates for MIMO and OFDMA transmissions, the PHY layer of the wake-up receiver 212 may support only 2 data rates. In some aspects, the wake-up receiver 212 is a non-coherent receiver that operates on the envelope (or amplitude) of received signals.

In some implementations, the wireless device 200 may use multiple antennas ANT1-ANTn to provide antenna diversity. Antenna diversity may include polarization diversity, pattern diversity, and spatial diversity. For purposes of discussion herein, the processor 220 is shown as coupled between the transceivers 210 and the memory 230. For actual implementations, the transceivers 210, the processor 220, and the memory 230 may be connected together using one or more buses (not shown for simplicity).

The wireless device 200 may optionally include a display 221 and input/output (I/O) components 222. The display 221 may be any suitable display or screen allowing for user interaction and/or to present items or data to a user. In some aspects, the display 221 may be a touch-sensitive display. The I/O components 222 may be or include any suitable mechanism, interface, or device to receive input (such as commands) from the user and to provide output to the user. For example, the I/O components 222 may include (but are not limited to) a graphical user interface, keyboard, mouse, microphone and speakers, and so on.

In addition, or in the alternative, the wireless device 200 may optionally include or be coupled to one or more sensors 223 (such as when the wireless device 200 is an IoT device). The one or more sensors 223 may be any suitable type of sensor that can detect or sense various conditions near or related to the wireless device 200. For one example in which the wireless device 200 is a component of a security system, the one or more sensors 223 may be configured to detect movement, to detect noise, to detect an opened window or door, and the like. For another example in which the wireless device 200 is a smart thermostat, the one or more sensors 223 may be configured to detect changes in temperature, to detect the presence or absence of persons in an area, and the like.

The memory 230 may include a database 231 that stores profile information for a plurality of wireless devices such as APs, wireless stations, and IoT devices. The profile information for any given AP may include, for example, the AP's service set identification (SSID), medium access control (MAC) address, channel information, received signal strength indicator (RSSI) values, goodput values, channel state information (CSI), supported data rates, connection history with the AP, a trustworthiness value of the AP (e.g., indicating a level of confidence about the AP's location, etc.), and any other suitable information pertaining to or describing the operation of the AP. The profile information for a particular IoT device or wireless station may include, for example, the device's MAC address, IP address, supported data rates, preferred frequency bands or channels, frequency hopping schedules, a number of capabilities, and any other suitable information pertaining to or describing the operation of the device.

The database 231 also may store a number of patterns that can be used to indicate various data rates of a packet, may store a number of reference patterns derived from the selected patterns, and may store a mapping between each of the selected patterns and a corresponding data rate or preamble length. In some implementations, the pattern contained in the preamble of a received packet may be correlated with a reference pattern to determine the data rate of the received packet. In addition, or in the alternative, the length of a pattern contained in the preamble of a received packet may be indicative of the received packet's data rate. In some other implementations, the preamble length of a packet may be indicative of the packet's data rate.

The memory 230 also may include a non-transitory computer-readable storage medium (such as one or more non-volatile memory elements, such as EPROM, EEPROM, Flash memory, a hard drive, and so on) that may store the following programs or instructions:

frame exchange instructions_232 to create and exchange frames (such as data frames, control frames, management frames, and trigger frames) and messages (such as data messages, paging messages, wake-up messages, and so on) between the wireless device 200 and other wireless devices, for example, as described with respect to FIGS. 10-11, FIGS. 12A-12C, FIG. 13, FIGS. 17-18, and FIGS. 22-23;

pattern selection instructions_233 to select or generate a pattern indicative of a selected data rate of a packet and to embed the selected pattern within a preamble of the packet to be transmitted to one or more other devices, for example, as described with respect to FIGS. 10-11, FIGS. 12A-12C, FIG. 13, FIGS. 17-18, and FIGS. 22-23;

reference pattern generation instructions 234 to select or generate a reference pattern to be correlated with a pattern contained in the preamble of a received packet, for example, as described with respect to FIGS. 10-11, FIGS. 12A-12C, FIG. 13, FIGS. 17-18, and FIGS. 22-23;

correlation instructions_235 to correlate a received pattern with the reference pattern to generate a signal or waveform indicative of a degree of correlation between the received pattern and the reference pattern, for example, as described with respect to FIGS. 10-11, FIGS. 12A-12C, FIG. 13, FIGS. 17-18, and FIGS. 22-23;

peak detection instructions_236 to detect a presence of one or more positive peaks or one or more negative peaks in the signal or waveform, for example, as described with respect to FIGS. 10-11, FIGS. 12A-12C, FIG. 13, FIGS. 17-18, and FIGS. 22-23; and data rate determination instructions 237 to determine a data rate of the received packet based on the detection of one or more positive peaks or one or more negative peaks in the signal, for example, as described with respect to FIGS. 10-11, FIGS. 12A-12C, FIG. 13, FIGS. 17-18, and FIGS. 22-23.

Execution of each set of instructions 232-237 by the processor 220 may cause the wireless device 200 to perform the corresponding functions. The non-transitory computer-readable medium of the memory 230 thus includes instructions for performing all or a portion of the operations described with respect to FIGS. 10-11, FIGS. 12A-12C, FIG. 13, FIGS. 17-18, and FIGS. 22-23.

The processor 220 may be any one or more suitable processors capable of executing scripts or instructions of one or more software programs stored in wireless device 200 (such as within the memory 230). The processor 220 may execute the frame exchange instructions 232 to create and exchange frames (such as data frames, control frames, management frames, and trigger frames) and messages (such as data messages, paging messages, wake-up messages, and so on) between the wireless device 200 and other wireless devices. In some implementations, the processor 220 may execute the frame exchange instructions 232 to receive a wake-up message and to decode a pattern contained in the preamble of the wake-up message.

The processor 220 may execute the pattern selection instructions 233 to select or generate a pattern indicative of a selected data rate of a packet (such as a wake-up message) to be transmitted to one or more other devices and to embed the selected pattern within a preamble of the packet. In some implementations, execution of the pattern selection instructions 233 may select the pattern to indicate a first data rate, and may select or generate a logical complement of the pattern to indicate a second data rate. In other implementations, execution of the pattern selection instructions 233 may select or generate a long pattern to indicate the first data rate, and may select or generate a short pattern to indicate the second data rate. As used herein, the term "long pattern" may refer to a pattern containing more than a number of bits or more than a number of individual sequences, and the term "short pattern" may refer to a pattern containing less than the number of bits or less than the number individual sequences. In some other implementations, execution of the pattern selection instructions 233 may select or generate a first structure including a first number of instances of a sequence or its logical complement to indicate a low data rate (such as 62.5 kb/s), and may select or generate a second structure including a second number of instances of the sequence or its logical complement to indicate a high data rate (such as 250 kb/s). In some aspects, the first structure includes two instances of the sequence, and the second structure includes a single instance of the logical complement of the sequence. In addition, or in the alternative, the second structure also may include one or more instances of a second sequence or one or more instances of a logical complement of the second sequence, or one or more instances of a pad sequence, or both.

The processor 220 may execute the reference pattern generation instructions 234 to select or generate a reference pattern to be correlated with a pattern contained in the preamble of a received packet. In some implementations, execution of the reference pattern generation instructions 234 may select a stored pattern as the reference pattern. In other implementations, execution of the reference pattern generation instructions 234 may generate the reference pattern based on the stored pattern.

The processor 220 may execute the correlation instructions 235 to correlate the received pattern with the reference pattern to generate a signal indicative of a degree of correlation between the received pattern and the reference pattern. In some implementations, the signal may include one or more large positive peaks or one or more large negative peaks when the received pattern and the reference pattern are aligned in time (such as when all bits of the received pattern and the reference pattern match or when all bits of the received pattern are logical complements to corresponding bits in the reference pattern), and the signal may resemble noise when the received pattern and the reference pattern are not aligned in time (such as when the bits of the received pattern and the reference pattern do not match).

The processor 220 may execute the peak detection instructions 236 to detect a presence of one or more positive peaks or one or more negative peaks in the signal or waveform. In some implementations, execution of the peak detection instructions 236 may determine whether a given spike or peak in the signal or waveform qualifies as a large positive peak or a large negative peak, for example, using one or more threshold levels. Additionally or alternatively, execution of the peak detection instructions 236 may determine how many spikes or peaks appear in the signal or waveform, may determine a spacing or time offset between spikes or peaks appearing in the signal or waveform, or a combination thereof.

The processor 220 may execute the data rate determination instructions 237 to determine a data rate of the received packet based on the detection of one or more positive peaks or one or more negative peaks in the signal or waveform. In some implementations, the detection of a large positive peak or a large negative peak in the signal or waveform may indicate whether the received packet contains a given pattern or a logical complement of the given pattern. In some aspects, a presence of the given pattern in the received packet may indicate that the packet was transmitted at a first data rate, and a presence of the logical complement of the given pattern in the received packet may indicate that the packet was transmitted at a second data rate. As used herein, the term "large positive peak" may refer to a peak having a magnitude that is more positive than a first value, and the term "large negative peak" may refer to a peak having a magnitude that is more negative than a second value.

In other implementations, the detection of multiple large positive peaks or multiple large negative peaks in the signal may indicate whether the received packet includes a short preamble containing a short pattern or includes a long preamble containing a long pattern. In some aspects, a presence of multiple large positive peaks or multiple large negative peaks may indicate that the received packet includes a long pattern and was transmitted at a low data rate, and a presence of a single large positive peak or a single large negative peak may indicate that the received packet includes a short pattern and was transmitted at a high data rate.

In some other implementations, the detection of one or more large positive peaks in the signal may indicate that the packet was transmitted using the low data rate, and the detection of a large negative peak in the signal may indicate that the packet was transmitted using the high data rate. In some aspects, a presence of multiple large positive peaks in the signal may indicate that the received packet contains the first structure including a first number of instances of a sequence or its logical complement, and a presence of a large negative peak in the signal may indicate that the received packet contains the second structure including a second number of instances of the sequence or its logical complement.

Although functionality is described with respect to instructions 232-237, in some implementations, an equivalent functionality may be provided by hardware modules, firmware modules, or any feasible combination of hardware, firmware, and software modules (not shown in FIG. 2 for simplicity). In some implementations, one or more of the functions performed by executing the instructions 232-237 may be performed by the wake-up receiver 212, for example, as described with respect to FIG. 3.

The wake-up receiver 212 may consume significantly less power than the primary transceivers 211, and may employ a different modulation scheme than the primary transceivers 211. A transmitting device may use modulation to encode data onto a carrier signal by modifying one or more characteristics (such as the frequency, amplitude, and phase) of the carrier signal, and a receiving device may use demodulation to decode data modulated onto the carrier signal. A modulated waveform may be divided into time units known as symbols. Each of the symbols may be modulated separately, for example, by varying the phase and amplitude of each symbol. For example, a binary phase-shift keying (BPSK) modulation scheme conveys information by alternating between waveforms that are transmitted with either no phase offset or with a 180° offset (such that each symbol conveys a single bit of information). For another example, a quadrature amplitude modulation (QAM) modulation scheme uses two carrier signals, the in-phase signal component (I) and the quadrature signal component (Q), to transmit data. The I signal component and the Q signal component are transmitted with a phase offset of 90°, and each of the I and Q signal components may be transmitted with a specific amplitude selected from a finite set. The number of amplitude "bins" determines the number of bits that are conveyed by each symbol. For another example, an ON-OFF keying (OOK) modulation scheme conveys information by either transmitting a signal at a given amplitude (for the ON part of the signal) or transmitting the signal at a zero amplitude (for the OFF part of the signal).

An AP (such as the AP 110 of FIG. 1) having queued data for delivery to the wireless device 200 may transmit a wake-up message that causes the wireless device 200 to exit the low-power mode and enter an active power mode. The wake-up message may contain a pattern known to the wireless device 200. The wake-up receiver 212 may receive the wake-up message, decode the pattern, and then wake-up (or activate) the primary transceivers 211. Once activated, the primary transceivers 211 may be used to transmit and receive data at higher data rates (and using greater channel widths) than the wake-up receiver 212, thereby increasing data throughput of the wireless device 200. Thereafter, when the primary transceivers 211 are no longer transmitting or receiving data, the wireless device 200 may return to the low-power state and power-down various components of the primary transceivers 211 to conserve power.

In some implementations, one or more portions of the wake-up message may be encoded using an OOK modulation scheme. In some aspects, the wake-up message may be transmitted using a single carrier signal, and the pattern may be encoded onto the carrier signal using a binary OOK modulation scheme. In other aspects, the wake-up message may be transmitted using a multi-tone carrier signal, and the device specific pattern may be encoded onto the multi-tone carrier signal using an OOK modulation scheme.

A conventional wake-up message typically includes a preamble, a signal field, and a data field. The preamble may be used for packet detection and symbol timing recovery, the signal field may indicate the data rate of the wake-up message, and the data field may contain data or instructions for the wireless device 200. Although the signal field may allow a receiving device (such as the wireless device 200) to determine the data rate of the data field, the signal field consumes overhead and increases the size and the transmit duration of the wake-up message. Eliminating the signal field may reduce the overhead of the wake-up message and thereby decrease the transmit duration of the wake-up message.

In accordance with aspects of the present disclosure, a wake-up message is disclosed that includes a preamble and a data field, but not a signal field, to reduce the overhead of the wake-up message. The elimination of the signal field may reduce the overhead (and thus the transmit duration) of the wake-up message. In some implementations, an indication of the data rate of the data field of the wake-up message may be encoded within a pattern contained in the preamble of the wake-up message. More specifically, a transmitting device may embed, in the preamble of the wake-up message, a special pattern that indicates the data rate of the data field of the wake-up message. The pattern also may indicate a length of the wake-up message's preamble. A receiving device may decode the special pattern contained in the preamble of the wake-up message, and determine the data rate of the data field (and also the preamble length) of the wake-up message based on the decoded special pattern.

Figure 3:
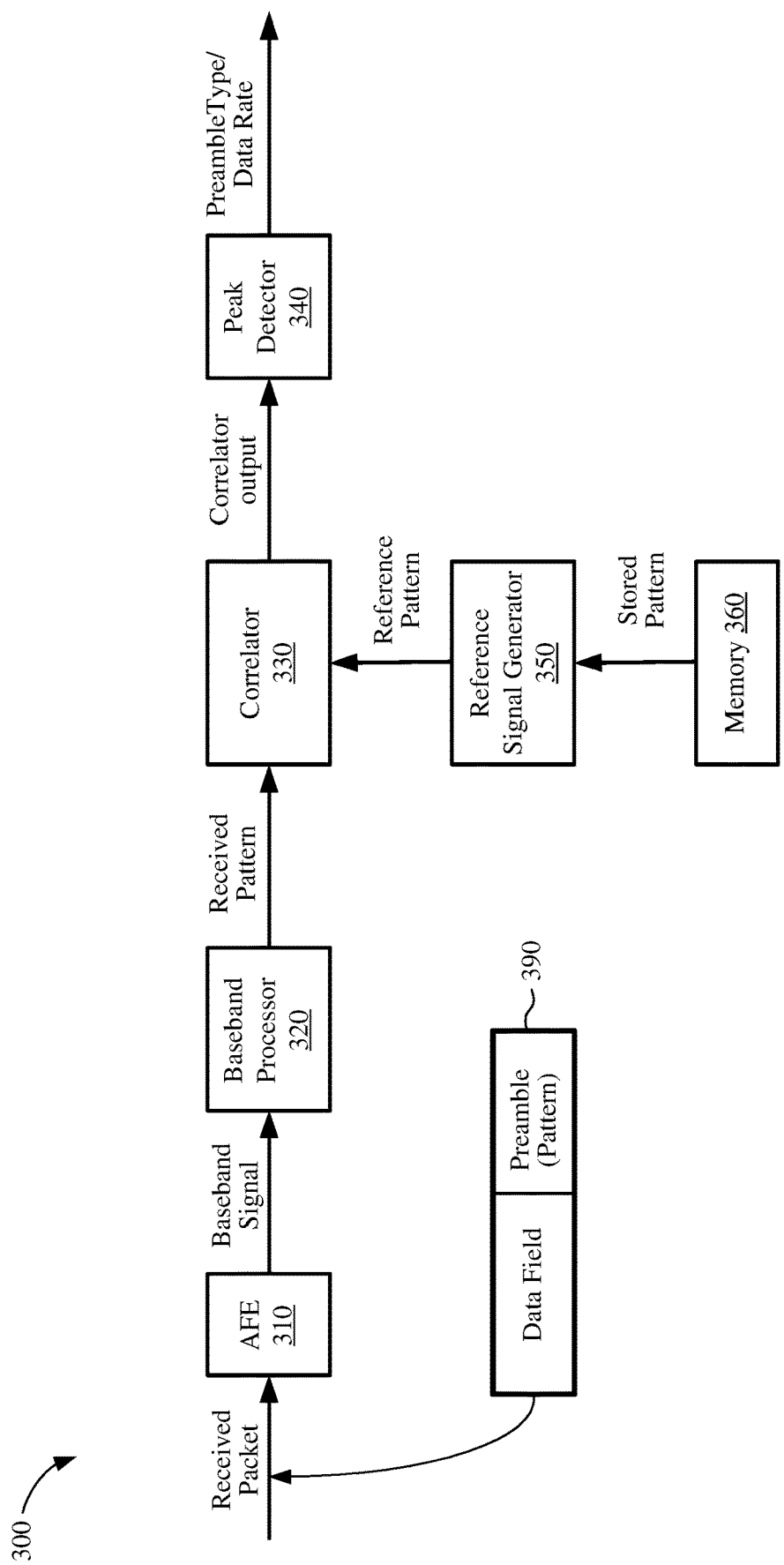
FIG. 3 shows a block diagram of an example wake-up receiver.

FIG. 3 shows a block diagram of an example wake-up receiver 300. The wake-up receiver 300, which may be one implementation of the wake-up receiver 212 of FIG. 2, may determine the data rate of a received wake-up message 390 based at least in part on a correlation between the pattern contained in the received wake-up message 390 and a known reference pattern. In some implementations, the wake-up receiver 300 may determine the data rate of the wake-up message 390 based on whether the received pattern is the reference pattern or is a logically complemented version of the reference pattern. In other implementations, the wake-up receiver 300 may determine the data rate of the wake-up message 390 based on whether the wake-up message 390 includes a short preamble containing a short pattern or includes a long preamble containing a long pattern. In some other implementations, the wake-up receiver 300 may determine the data rate of the wake-up message 390 based on whether the preamble of the wake-up message 390 contains the first structure or the second structure (such as either the pattern $\overline{W}$ or the pattern [W, W]). In this manner, the receiving device may determine the data rates of wake-up messages 390 that do not include a signal field.

The wake-up receiver 300 is shown to include an analog front-end (AFE) 310, a baseband processor 320, a correlator 330, a peak detector 340, a reference signal generator 350, and a memory 360. The AFE 310 may include any suitable circuits or components capable of receiving messages or packets in the form of signals and down-converting the received signals from a carrier frequency to a baseband frequency. The baseband processor 320 may be any suitable processor capable of processing baseband signals. In some aspects, the AFE 310 and the baseband processor 320 may be configured for narrowband communications (such as wireless transmissions having a relatively narrow bandwidth of, for example, 4 MHz).

The correlator 330 includes a first input coupled to an output of the baseband processor 320, a second input coupled to an output of the reference signal generator 350, and an output coupled to an input of the peak detector 340. The correlator 330 may be configured to correlate a received pattern contained in the preamble of the wake-up message with a reference pattern provided by the reference signal generator 350 to generate a correlator output signal. The correlator output signal is provided to the peak detector 340. The use of a single correlator 330 in the wake-up receiver 300 may not only reduce power consumption but also conserve circuit area, for example, as compared with using a first correlator to detect short preambles and a second correlator to detect long preambles.

The peak detector 340 may detect a presence of positive peaks or a presence of negative peaks in the correlator output signal. The peak detector 340 may use a number of threshold levels to determine whether a particular spike in the correlator output signal qualifies as either a positive peak or a negative peak. In some implementations, the detection of a positive peak in the correlator output signal may indicate that the packet was transmitted at a first data rate, and the detection of a negative peak in the correlator output signal may indicate that the packet was transmitted at a second data rate. In other implementations, the detection of a long preamble may indicate that the packet was transmitted at the first data rate, and the detection of a short preamble may indicate that the packet was transmitted at the second data rate. In some other implementations, a presence of the first structure in the packet preamble may indicate that the data field of the packet was transmitted at the first data rate, and a presence of the second structure in the packet preamble may indicate that the data field of the packet was transmitted at the second data rate. The first data rate may be one of a low data rate and a high data rate, and the second data rate may be the other of the low data rate and the high data rate. In some aspects, the low data rate is 62.5 kb/s, and the high data rate is 250 kb/s.

The memory 360 may store the same pattern used by the transmitting device (not shown for simplicity). In some implementations, the pattern may be device-specific, for example, so that the wake-up receiver 300 can determine that a packet containing the device-specific pattern is intended for the wireless device 200. In such implementations, the transmitting device may store a plurality of different patterns to be used for transmitting packets (such as the wake-up message 390) to a plurality of different receiving devices. In other implementations, the pattern may be a sequence (or a number of sequences) provided by the IEEE 802.11ba specification, for example, so that all transmitting devices use the specified pattern and all receiving devices store the specified pattern for use as the reference pattern.

The reference signal generator 350 provides a reference pattern to the correlator 330. In some implementations, the reference signal generator 350 may forward the pattern stored in the memory 360 as the reference pattern to the correlator 330. In other implementations, the reference signal generator 350 may generate the reference pattern based on the pattern stored in the memory 360. In some aspects, the reference signal generator 350 may generate a reference pattern R from a stored sequence S using the expression $R=(2 \times S)-1$, for example, so that 1's in the stored sequence S appear as 1's in the reference pattern R, and 0's in the stored sequence S appear as −1's bits in the reference pattern R. In addition, or in the alternative, the reference pattern R may be zero mean (such that it includes equal numbers of 1's and −1's), which in turn may cause the correlator output signal to also be zero mean.

A transmitting device may use wake-up messages as disclosed herein to send data or instructions to a receiving device (such as the wireless device 200 of FIG. 2) as follows. The transmitting device may select a pattern that is known to the receiving device, may embed the selected pattern into the preamble of a wake-up message 390, and may transmit the wake-up message 390 to the receiving device. In some implementations, the transmitting device may select a maximum length sequence (MLS) as the pattern to embed in the preamble of the wake-up message 390.

A MLS is a sequence having specific correlation properties such that when a MLS is correlated with a copy of itself, the resulting correlator output signal may include a large peak (such as a particular peak that is distinguishable from other peaks in the correlator output signal) when the MLS and its copy are aligned in time, and may resemble noise when the MLS and its copy are not aligned in time. For example, when the MLS and its copy are aligned in time so that the bits of the MLS match corresponding bits of its copy, the matching 1's in the MLS and its copy produce a large positive peak in the correlator output signal. Similarly, when the MLS and a logical complement of the MLS are aligned in time, the result is a large negative peak in the correlator output signal. Conversely, when the MLS and its copy or its logical complement are not aligned in time, the resulting correlator output signal includes neither a large positive peak nor a large negative peak, but rather resembles noise. These correlation properties render MLSs well-suited for symbol timing recovery using the methods described herein.

In some implementations, the transmitting device selects an MLS as the pattern, and then embeds either the MLS or its logical complement into the preamble of the wake-up message 390. The MLS is denoted herein as a sequence S, and may be used to indicate a first data rate of the wake-up message 390. The logical complement of the MLS is denoted herein as a complemented sequence $\overline{S}$, and may be used to indicate a second data rate of the wake-up message 390. In some aspects, the transmitting device may use the sequence S to indicate the low data rate of 62.5 kb/s, and may use the complemented sequence $\overline{S}$ to indicate the high data rate of 250 kb/s. In other aspects, the transmitting device may use the complemented sequence $\overline{S}$ to indicate the low data rate of 62.5 kb/s, and may use the sequence S to indicate the high data rate of 250 kb/s.

In other implementations, the transmitting device may select the data rate at which the data field of the wake-up message is to be transmitted, may select a first structure to embed as the selected pattern within the wake-up message's preamble if the selected data rate is a low data rate, and may select a second structure to embed as the selected pattern within the wake-up message's preamble if the selected data rate is a high data rate. In some implementations, the first structure may be longer than the second structure. In some aspects, the first structure may include a first number of instances of a sequence or its logical complement, and the second structure may include a second number of instances of the sequence or its logical complement. In some implementations, the first structure includes two instances of a sequence W, and the second structure includes a single instance of the logical complement of the sequence (denoted herein as $\overline{W}$). The first structure may be formed by the concatenation of two copies of the sequence W, and may be denoted herein as [W, W]. In some aspects, the sequence W=[1010010010111011000101110011000], and the logically complemented sequence $\overline{W}$=[0101101101000100111010001100011].

In some implementations, the transmitting device may transmit the selected pattern (such as the sequence S, the complemented sequence $\overline{S}$, the first structure, the second structure, and so on) using OOK modulation of a single carrier signal, for example, by selectively turning on and off the carrier signal on a per-symbol basis. In other implementations, the transmitting device may transmit the selected pattern using multi-carrier OOK modulation of an OFDM waveform. For example, the transmitting device may transmit a logic 1 by modulating the carrier signal, and may transmit a logic 0 by not modulating the carrier signal. In this manner, the transmitting device may transmit the pattern by multiplying an OFDM waveform by sequential bits in the pattern. Using OOK modulation of an OFDM waveform to transmit logic 1 and logic 0 bits may allow the transmitting device to increase the transmission bandwidth of the wake-up message without increasing the data rate.

The wake-up receiver 300 in the receiving device receives the wake-up message 390, down-converts the wake-up message 390 using the AFE 310, and extracts the pattern contained in the preamble. The received pattern and the reference pattern are provided to the correlator 330, which correlates the received pattern and the reference pattern to generate the correlator output signal.

In implementations for which the preamble of the wake-up message 390 contains the sequence S, the correlator output signal generated by the correlator 330 may include a large positive peak if the received sequence S is aligned in time with the reference pattern R (such that the received sequence S "matches" the reference pattern R). The large positive peak appears in the correlator output signal because all the 1's in the received sequence S are multiplied by corresponding 1's in the reference pattern R, and all the 0's in the received sequence S are multiplied by corresponding −1's in the reference pattern R. Conversely, if the received sequence S is not aligned in time with the reference pattern R (such that the received sequence S does not "match" the reference pattern R), then the correlator output signal may be a near-zero waveform (resembling noise) due to the correlation properties of the MLS.

In implementations for which the preamble of the wake-up message 390 contains the complemented sequence $\overline{S}$, the correlator output signal may include a large negative peak if the received complemented sequence $\overline{S}$ is aligned in time with the reference pattern R (such that the received complemented sequence $\overline{S}$ "matches" the reference pattern R). The large negative peak appears in the correlator output signal because all the 0's in the received complemented sequence $\overline{S}$ are multiplied by corresponding 1's in the reference pattern R, and all the 1's in the received complemented sequence $\overline{S}$ are multiplied by corresponding −1's in the reference pattern R. Conversely, if the received complemented sequence $\overline{S}$ is not aligned in time with the reference pattern R (such that the received complemented sequence $\overline{S}$ does not "match" the reference pattern R), then the correlator output signal may be a near-zero waveform (resembling noise) due to the correlation properties of the complemented MLS.

Figure 4A:
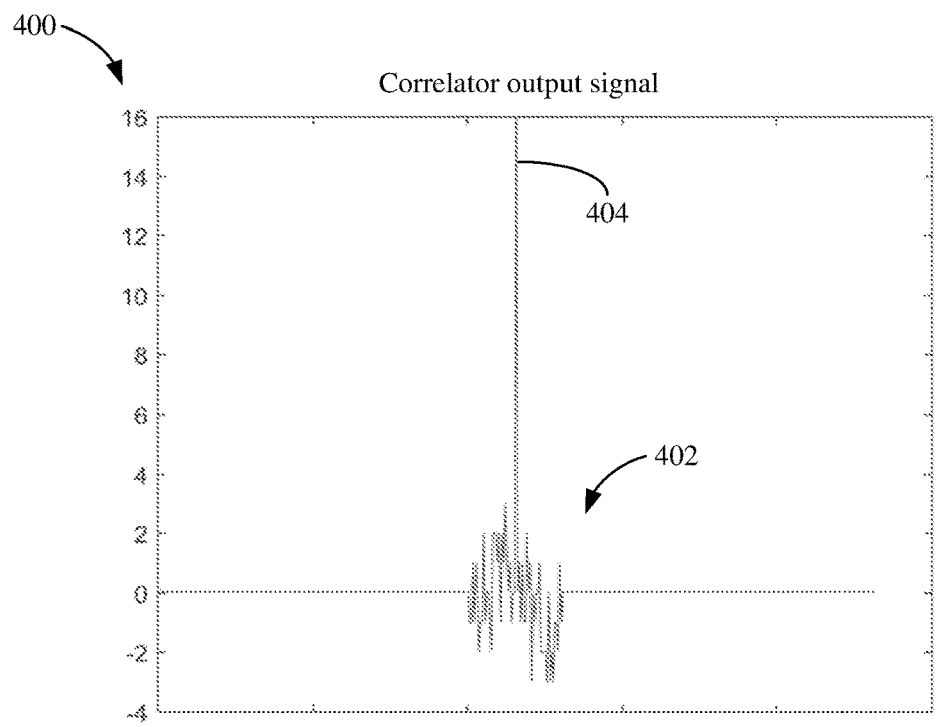
FIG. 4A shows a graph depicting an example correlator output signal based on a pattern contained in a preamble of a wake-up message.
Figure 4B:
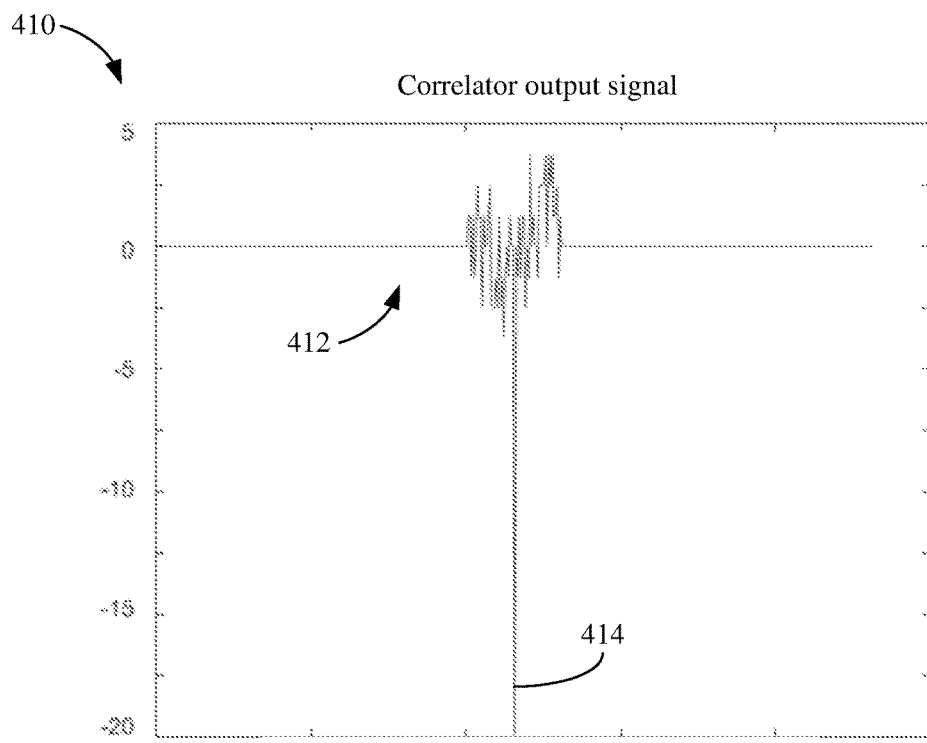
FIG. 4B shows a graph depicting an example correlator output signal based on a complemented pattern contained in a preamble of a wake-up message.

Because the transmitting device uses complementary MLSs embedded in the preamble of the wake-up message 390 to indicate its data rate, the wake-up receiver 300 may determine the data rate of the received wake-up message 390 by determining whether the preamble of the wake-up message 390 contains the sequence S or the complemented sequence $\overline{S}$. For example, if the correlator output signal includes a large positive peak (such as depicted in FIG. 4A), then the wake-up receiver 300 may determine that the wake-up message 390 contains the sequence S and was transmitted at the first data rate. Conversely, if the correlator output signal includes a large negative peak (such as depicted in FIG. 4B), then the wake-up receiver 300 may determine that the wake-up message 390 contains the complemented sequence $\overline{S}$ and was transmitted at the second data rate. In this manner, the wake-up receiver 300 may determine the data rate of the data field in the wake-up message 390 without the presence of a dedicated signal field in the wake-up message 390.

In implementations for which the preamble of the wake-up message 390 contains the first structure including two instances of the sequence W, the correlator output signal generated by the correlator 330 may include two large positive peaks if the two instances of the sequence W are aligned in time with the reference pattern R (such that the received pattern "matches" the reference pattern R). A large positive peak may appear in the correlator output signal because all the 0's in a received instance of the sequence W are multiplied by corresponding −1's in the reference pattern R, and all the 1's in the received instance of the sequence W are multiplied by corresponding 1's in the reference pattern R. Conversely, if the two instances of the sequence W are not aligned in time with the reference pattern R (such that the received pattern does not "match" the reference pattern R), then the correlator output signal may be a near-zero waveform (resembling noise) due to the correlation properties of the sequence W.

In implementations for which the preamble of the wake-up message 390 contains the second structure including a single instance of the logically complemented sequence $\overline{W}$, the correlator output signal generated by the correlator 330 may include a large negative peak if the received complemented sequence $\overline{W}$ is aligned in time with the reference pattern R (such that the received pattern "matches" the reference pattern R). The large negative peak may appear in the correlator output signal because all the 0's in the received complemented sequence $\overline{W}$ are multiplied by corresponding 1's in the reference pattern R, and all the 1's in the received complemented sequence $\overline{W}$ are multiplied by corresponding −1's in the reference pattern R. Conversely, if the received complemented sequence $\overline{W}$ is not aligned in time with the reference pattern R (such that the received pattern does not "match" the reference pattern R), then the correlator output signal may be a near-zero waveform (resembling noise) due to the correlation properties of the received complemented sequence $\overline{W}$.

FIG. 4A shows a graph 400 depicting an example correlator output signal 402 based on the sequence S contained in the preamble of the wake-up message 390. The correlator output signal 402 is generated by the correlator 330 when the received sequence S is aligned in time with the reference pattern R, and thus includes a large positive peak 404. Note that the correlator output signal 402 is one-half the length of the received sequence S. For example, if the received sequence S is 32 bits long, then the correlator output signal 402 is 16 bits long.

FIG. 4B shows a graph 410 depicting an example correlator output signal 412 based on the complemented sequence $\overline{S}$ contained in the preamble of the wake-up message 390. The correlator output signal 412 is generated by the correlator 330 when the received complemented sequence $\overline{S}$ is aligned in time with the reference pattern R, and thus includes a large negative peak 414.

Referring again to FIG. 3, the receiving device may use a single correlator (such as the correlator 330) to determine whether the received packet includes the sequence S or the complemented sequence $\overline{S}$, and therefore to determine whether the wake-up message 390 was transmitted at the low data rate or the high data rate. Because the length of the sequence S contained in the preamble of the wake-up message 390 is based on the low data rate, the preamble of the wake-up message 390 is the same length for both the low data rate and the high data rate, even though a short preamble could be used when transmitting the wake-up message 390 at the high data rate. As a result, the wake-up message 390 may include unnecessary overhead when transmitted at the high data rate.

In some other implementations, the transmitting device may use a short preamble when transmitting the wake-up message 390 at the high data rate, and may use a long preamble when transmitting the wake-up message 390 at the low data rate. Generally, communications at lower data rates require longer preambles than communications at higher data rates because of the lower SNR associated with the lower data rate communications. In some implementations, the short preamble may be of a length suitable for use with the high data rate, and may contain a short pattern including one instance or copy of the sequence S (or alternatively one instance of the complemented sequence $\overline{S}$). In some implementations, the long preamble may be of a length suitable for use with the low data rate, and may include multiple instances or copies of the sequence S, the complemented sequence $\overline{S}$, or both. In some aspects in which the low data rate is 62.5 kb/s and the high data rate is 250 kb/s, the long pattern includes four total instances of the sequence S or its complement $\overline{S}$ because the high data rate is four times the low data rate (250/62.5=4), and thus requires a preamble that is approximately four times as long as the short preamble. In this manner, the transmitting device may use a short preamble containing a short pattern (such as the 32-bit sequence S described above) when transmitting a wake-up message at the high data rate, and may use a long preamble containing a long pattern (such as four copies of the sequence S and/or the complemented sequence $\overline{S}$) when transmitting a wake-up message at the low data rate. Thus, in some aspects, the short preamble contains a 32-bit pattern, and the long preamble contains a 128-bit pattern. If the preamble bit duration is 1 μs, then the short preamble has a duration of 32 μs, and the long preamble has a duration of 128 μs.

The long pattern may be generally expressed as:

$$[S \cdot B_1, S \cdot B_2, S \cdot B_3, \ldots S \cdot B_N]$$

where the operation S·B indicates a bit-by-bit exclusive-OR (XOR) operation between the sequence S and a bitstring or bitmap B denoting whether the corresponding sequence is logically complemented or not. As used herein, when B=0, the operation S·B produces the original sequence S, and when B=1, the operation S·B produces the complemented sequence $\overline{S}$. For example, a long pattern containing four copies of the complemented sequence $\overline{S}$ may be denoted as $[\overline{S}, \overline{S}, \overline{S}, \overline{S}]$ or expressed by a bitmap B=1111. For another example, a long pattern containing a concatenation of the complemented sequence $\overline{S}$, two copies of the sequence S, followed by the complemented sequence $\overline{S}$ may be denoted as $[\overline{S}, S, S, \overline{S}]$ or expressed by a bitmap B=1001. For another example, a long pattern containing a concatenation of two copies of the complemented sequence $\overline{S}$, followed by the sequence S, and followed by the complemented sequence $\overline{S}$ may be denoted as $[\overline{S}, \overline{S}, S, \overline{S}]$ or expressed by a bitmap B=1101.

Thus, in accordance with aspects of the present disclosure, the transmitting device may select a short preamble containing a short pattern (such as including one instance of the sequence S or one instance of the complemented sequence $\overline{S}$) when transmitting a wake-up message at the high data rate, and may select a long preamble containing a long pattern (such as including multiple instances of the sequence S and/or the complemented sequence $\overline{S}$) when transmitting the wake-up message at the low data rate. Both the short pattern and the long pattern may be constructed to allow the receiving device to perform packet detection, to perform symbol timing recovery, and to determine whether the wake-up message includes a short preamble or a long preamble. In this manner, the receiving device may determine the data rate of the wake-up message based on the length or duration of its preamble. For example, a determination that the wake-up message includes a long preamble (such as 128 bits) may indicate that the wake-up message was transmitted at the low data rate, and a determination that the wake-up message includes a short preamble (such as 32 bits) may indicate that the wake-up message was transmitted at the high data rate.

In addition, because both the short preamble and the long preamble are constructed using one or more copies of a MLS or a logical complement of the MLS, the receiving device may use a single correlator to determine whether the received packet includes a short preamble or a long preamble. The use of a single correlator that can detect both a short preamble and a long preamble may not only reduce power consumption but also may conserve circuit area, for example, as compared with using different correlators to detect short preambles and long preambles.

Referring again to FIG. 3, the transmitting device may indicate the high data rate by embedding a single copy of the sequence S (or alternatively a single copy of the complemented sequence $\overline{S}$) into a short preamble of the wake-up message 390. The wake-up receiver 300 in the receiving device receives the wake-up message 390, down-converts the wake-up message 390 using the AFE 310, and extracts the sequence S contained in the short preamble. The received sequence S and the reference pattern R (which may be derived from either the sequence S or the complemented sequence $\overline{S}$) are provided to the correlator 330, which correlates the received sequence S and the reference pattern R to generate the correlator output signal.

Figure 5A:
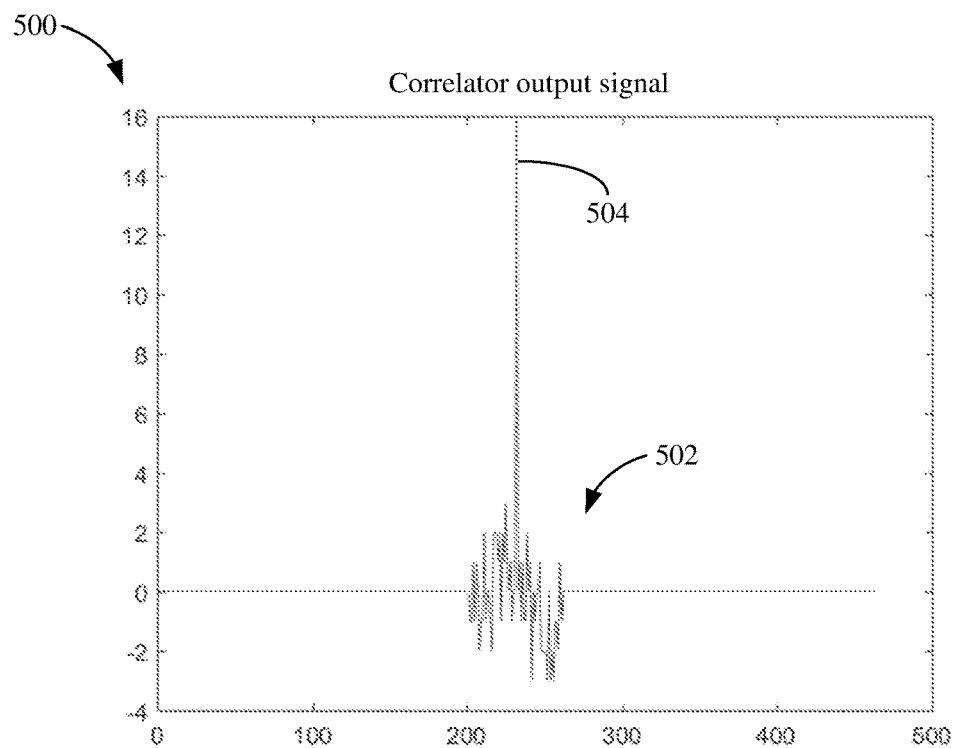
FIG. 5A shows a graph depicting an example correlator output signal based on a short preamble of a wake-up message.

When the short preamble of the wake-up message 390 contains the sequence S, the correlator output signal may include a large positive peak if the received sequence S is aligned in time with the reference pattern R (when the reference pattern R=2S−1), for example, as depicted in FIG. 5A. The large positive peak appears in the correlator output signal because all the 1's in the received sequence S are multiplied by corresponding 1's in the reference pattern R, and all the 0's in the received sequence S are multiplied by corresponding −1's in the reference pattern R. Conversely, if the received short pattern is not aligned in time with the reference pattern R, then the correlator 330 generates a correlator output signal having near-zero waveform due to the correlation properties of the MLS-based sequence S.

In some other implementations, the short preamble of the wake-up message 390 may contain the complemented sequence $\bar{S}$ (rather than the sequence S). If the received complemented sequence $\bar{S}$ is aligned in time with the reference pattern R (such as when the reference pattern R=2S−1), the correlator output signal may include a large negative peak, for example, as depicted in FIG. 4B. The large negative peak appears in the correlator output signal because all the 0's in the complemented sequence $\bar{S}$ are multiplied by corresponding 1's in the reference pattern R, and all the 1's in the received complemented sequence $\bar{S}$ are multiplied by corresponding −1's in the reference pattern R. Conversely, if the received complemented sequence $\bar{S}$ is not aligned in time with the reference pattern R, then the correlator 330 generates a correlator output signal having near-zero waveform due to the correlation properties of the MLS-based complemented sequence $\bar{S}$.

FIG. 5A shows a graph 500 depicting an example correlator output signal 502 based on the wake-up message 390 including a short preamble containing the sequence S. The correlator output signal 502 is generated by the correlator 330 when the short sequence S is aligned in time with the reference pattern R=2S−1, and thus includes a large positive peak 504. Note that the correlator output signal 502 is one-half the length of the received sequence S. For example, if the received sequence S is 32 bits long, then the correlator output signal 502 is 16 bits long.

Referring again to FIG. 3, the transmitting device may indicate the low data rate by embedding a long pattern into a long preamble of the wake-up message 390. The long pattern may contain four instances of the sequence S and/or the complemented sequence $\bar{S}$. For example, the long pattern contained in the wake-up message 390 may be formed by the concatenation of four copies of the complemented sequence $\bar{S}$, and therefore may be denoted as [$\bar{S}$, $\bar{S}$, $\bar{S}$, $\bar{S}$]. The wake-up receiver 300 in the receiving device receives the wake-up message 390, down-converts the wake-up message 390 using the AFE 310, and extracts the long pattern [$\bar{S}$, $\bar{S}$, $\bar{S}$, $\bar{S}$]. The correlator 330 correlates the long pattern [$\bar{S}$, $\bar{S}$, $\bar{S}$, $\bar{S}$] with the reference pattern R to generate the correlator output signal.

Figure 5B:
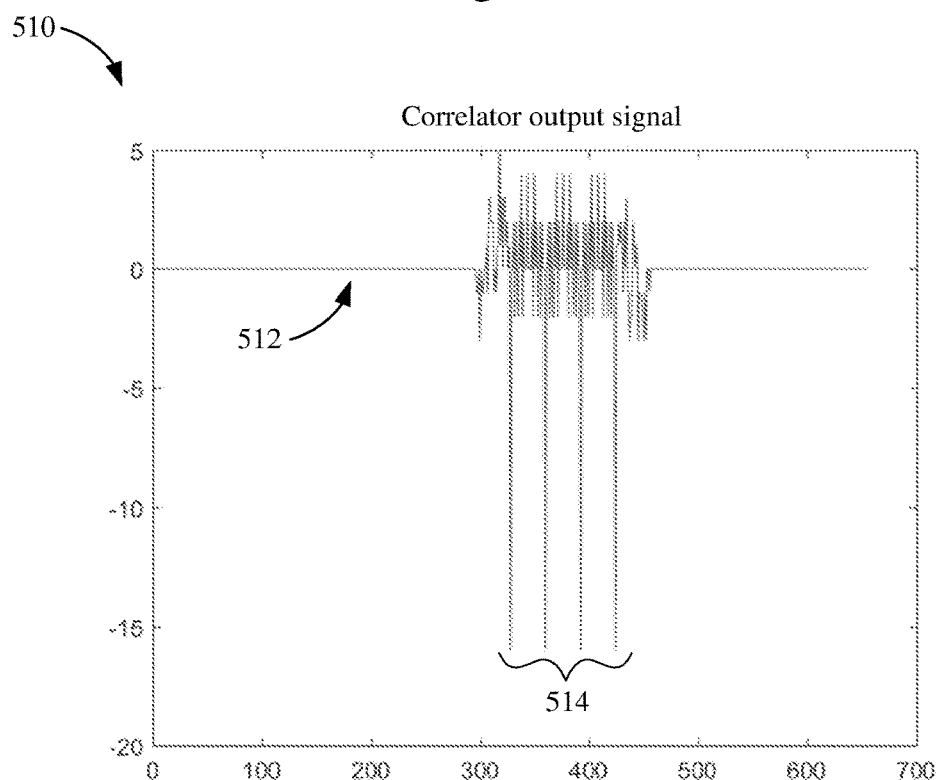
FIG. 5B shows a graph depicting an example correlator output signal based on a long preamble of a wake-up message.

Because the long pattern contains four copies of the complemented sequence $\bar{S}$, the correlator output signal may include four large negative peaks if the long pattern is aligned in time with the reference pattern R (because the reference pattern R=2S−1), for example, as depicted in FIG. 5B. Each of the four large negative peaks appears in the correlator output signal because all the 0's in the received complemented sequence $\bar{S}$ are multiplied by corresponding 1's in the reference pattern R, and all the 1's in the received complemented sequence $\bar{S}$ are multiplied by corresponding −1's in the reference pattern R. Conversely, if the received long pattern is not aligned in time with the reference pattern R, then the correlator 330 generates a correlator output signal having near-zero waveform due to the correlation properties of the MLS-based long pattern.

FIG. 5B shows a graph 510 depicting an example correlator output signal 512 based on the wake-up message 390 having a long preamble containing four copies of the complemented sequence $\bar{S}$. The correlator output signal 512 is generated by the correlator 330 when the received long pattern is aligned in time with the reference pattern R and thus includes four large negative peaks 514.

Thus, in some aspects, the peak detector 340 may determine whether a received wake-up message includes a short preamble or a long preamble based on the number of peaks detected in the correlator signal. For example, a detection of one peak in the correlator output signal (such as the positive peak 504 in the graph 500 of FIG. 5A) may indicate a short preamble and therefore also may indicate that the wake-up message was transmitted using the high data rate. A detection of four peaks in the correlator output signal (such as the four negative peaks 514 in the graph 510 of FIG. 5B) may indicate a long preamble and therefore also may indicate the wake-up message was transmitted using the low data rate Referring again to FIG. 5B, the long preamble containing the long pattern is used for low data rate communications. In some instances, the four negative peaks 514 in the correlator output signal 512 may not be of sufficient amplitude to be reliably detected in the presence of a low SNR. The wake-up receiver's ability to detect peaks in the correlator output signal for the long preamble may be improved by combining or aggregating the four peaks 514 in the correlator output signal 512. Thus, in some implementations, an aggregator may be provided within the wake-up receiver 300 to aggregate multiple peaks in the correlator output signal which correspond to the correlation of multiple copies or instances of the sequence S and/or the complemented sequence $\bar{S}$.

Figure 5C:
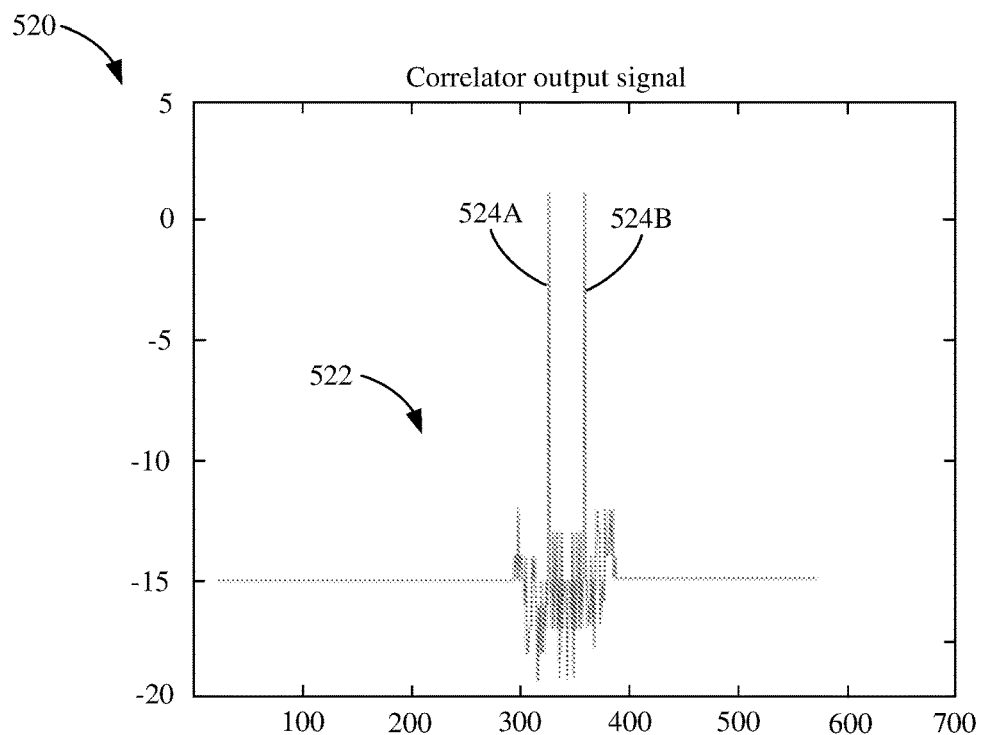
FIG. 5C shows a graph depicting an example correlator output signal based on a first structure contained in the preamble of a wake-up message.

FIG. 5C shows a graph 520 depicting an example correlator output signal 522 based on the wake-up message 390 containing a first structure including the two instances of the sequence W. In some implementations, transmitting device may indicate the low data rate by embedding the first structure [W, W] as the selected pattern into the preamble of the wake-up message 390. For purposes of discussion herein, the correlator output signal 522 may be generated by the correlator 330 of FIG. 3. In other implementations, the correlator output signal 522 may be generated by another suitable correlator circuit.

The correlator output signal 522 may include two large positive peaks 524A and 524B when the received structure [W, W] is aligned in time with the reference pattern R. Each of the two large positive peaks 524A and 524B may appear in the correlator output signal 522 because all the 0's in the received structure [W, W] are multiplied by corresponding −1's in the reference pattern R, and all the 1's in the received structure [W, W] are multiplied by corresponding 1's in the reference pattern R. Conversely, if the received structure [W, W] is not aligned in time with the reference pattern R, then the correlator output signal may have a near-zero waveform (such as because of the correlation properties of the first structure).

Referring also to FIG. 3, the wake-up receiver 300 in the receiving device may receive the wake-up message 390, may down-convert the wake-up message 390 using the AFE 310, and nay extract the first structure [W, W]. The correlator 330 in the receiving device may correlate the first structure [W, W] with the reference pattern R to generate the correlator output signal 522 of FIG. 5C.

Figure 5D:
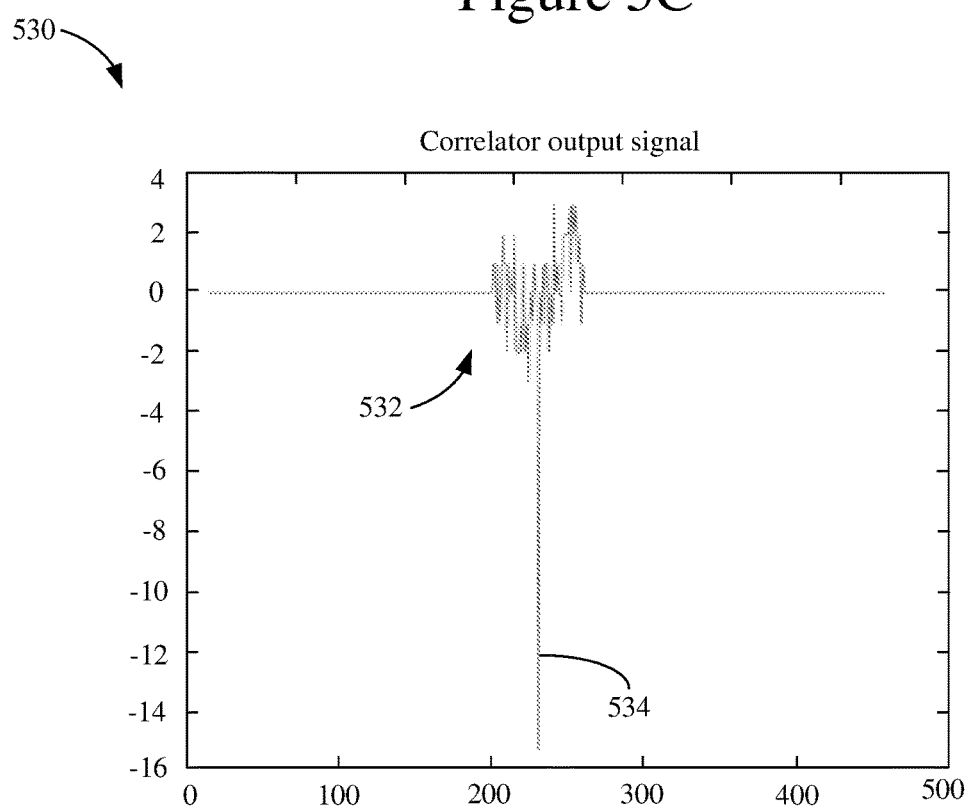
FIG. 5D shows a graph depicting an example correlator output signal based on a second structure contained in the preamble of a wake-up message.

FIG. 5D shows a graph 530 depicting an example correlator output signal 532 based on the wake-up message 390 containing a second structure including a single instance of the logically complemented sequence $\bar{W}$. In some implementations, transmitting device may indicate the high data rate by embedding the second structure $\bar{W}$ as the selected pattern into the preamble of the wake-up message 390. For purposes of discussion herein, the correlator output signal 532 may be generated by the correlator 330 of FIG. 3. In other implementations, the correlator output signal 532 may be generated by another suitable correlator circuit.

The correlator output signal 532 may include a large negative peak 534 when the received structure $\overline{W}$ is aligned in time with the reference pattern R. The large negative peak 534 may appear in the correlator output signal 532 because all the 0's in the received structure $\overline{W}$ are multiplied by corresponding 1's in the reference pattern R, and all the 1's in the received structure $\overline{W}$ are multiplied by corresponding −1's in the reference pattern R. Conversely, if the received structure $\overline{W}$ is not aligned in time with the reference pattern R, then the correlator output signal may have a near-zero waveform (such as because of the correlation properties of the second structure).

Referring also to FIG. 3, the wake-up receiver 300 in the receiving device may receive the wake-up message 390, may down-convert the wake-up message 390 using the AFE 310, and may extract the second structure $\overline{W}$. The correlator 330 in the receiving device may correlate the second structure $\overline{W}$ with the reference pattern R to generate the correlator output signal 532 of FIG. 5D.

Figure 6:
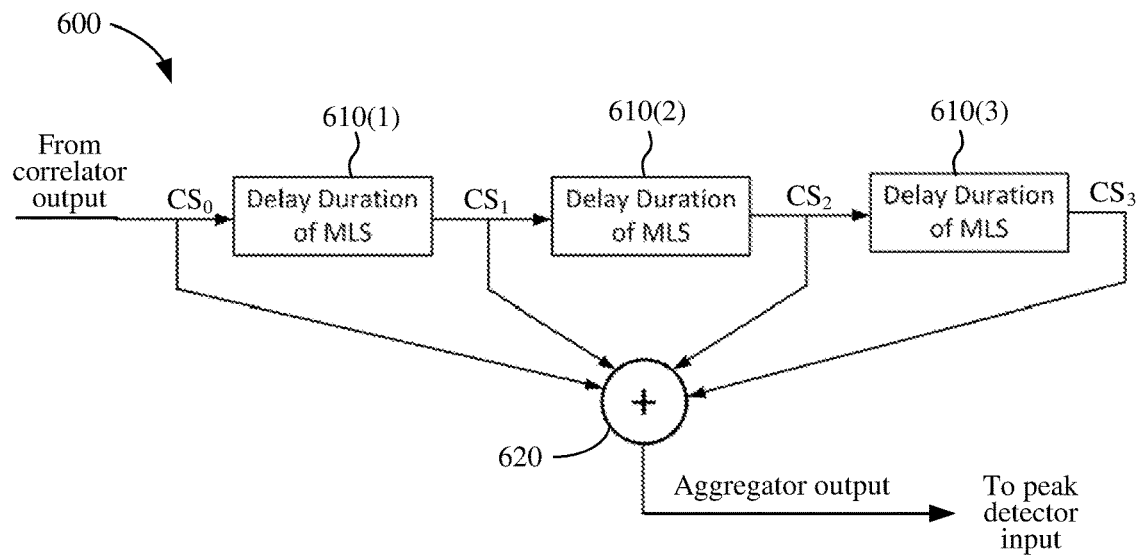
FIG. 6 shows a block diagram of an example aggregator.

FIG. 6 shows a block diagram of an example aggregator 600. The aggregator 600 includes an input to receive a correlator output signal ($CS_0$), an output to generate an aggregator output signal, a number of series-connected delay elements 610(1)-610(3), and a summer 620. In some implementations, the aggregator 600 may be provided between the correlator 330 and the peak detector 340 of the wake-up receiver 300 of FIG. 3, for example, so that the output of the correlator 330 is coupled to the input of the first delay element 610(1) and the output of the summer 620 is coupled to the input of the peak detector 340. Each of the delay elements 610(1)-610(3) may be configured to delay the correlator output signal by a duration of the sequence S. For example, the first delay element 610(1) delays the correlator output signal $CS_0$ provided by the correlator 330 to generate a first delayed correlator signal $CS_1$, the second delay element 610(2) delays the first delayed signal $CS_1$ to generate a second delayed correlator signal $CS_2$, and the third delay element 610(3) delays the second delayed signal $CS_2$ to generate a third delayed correlator signal $CS_3$. In some aspects, each of the delay elements 610(1)-610(3) may introduce a delay of 32 μs.

The summer 620 includes inputs coupled to the output of the correlator 330 and to an output of each of the delay elements 610(1)-610(3). The summer 620 sums (or aggregates) the correlator output signal $CS_0$ and the three delayed correlator signals $CS_1$-$CS_3$ to generate an aggregator output signal in which the peaks of the correlator output signal $CS_0$ are added together, for example, as depicted in FIG. 7A.

Figure 7A:
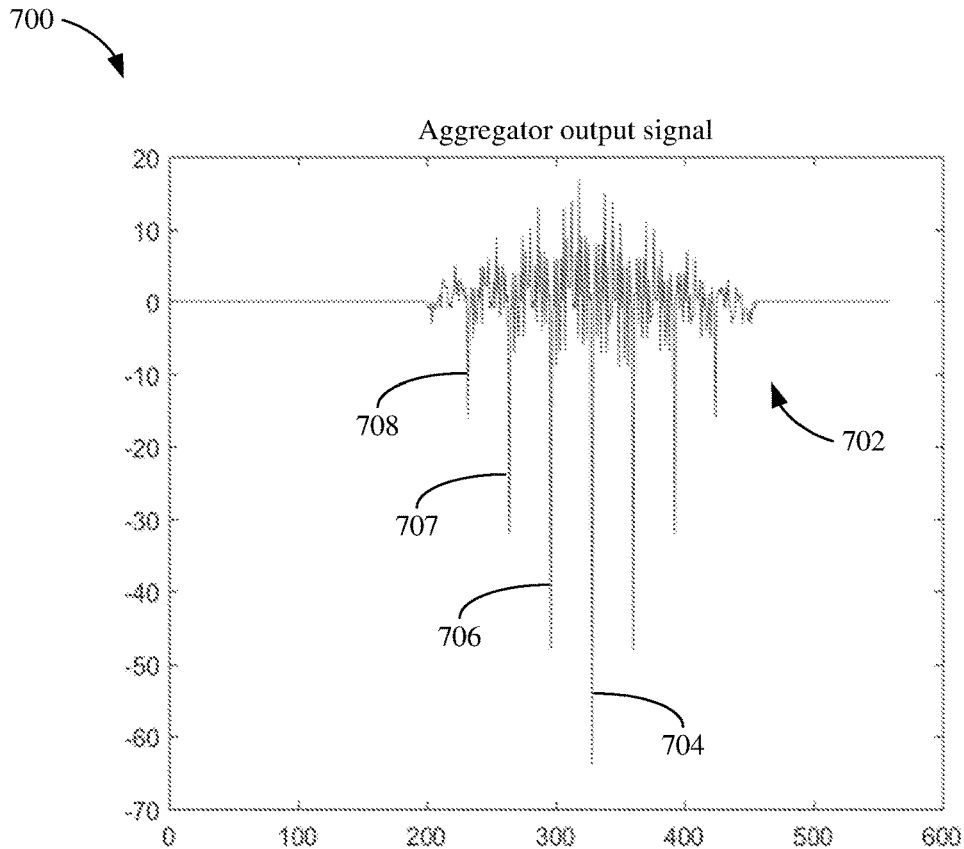
FIG. 7A shows a graph depicting an example output waveform generated by the aggregator of FIG. 6.

FIG. 7A shows a graph 700 depicting an example output waveform 702 generated by the aggregator of FIG. 6. The output waveform 702 is shown to include a large negative peak 704 that represents the sum of the four negative peaks 514 in the graph 510 of FIG. 5B. Note that the output waveform 702 also includes smaller negative peaks 706-708 which represent sums of less than all four negative peaks 514. For example, the negative peak 706 may represent the sum of three of the negative peaks 514, the negative peak 707 may represent the sum of two of the negative peaks 514, and the negative peak 708 may represent one of the negative peaks 514.

Because of the low SNR of the low data rate, the negative peak 706 may be strong enough to be incorrectly detected by the peak detector. The undesirable effects associated with the smaller negative peaks 706-708 may be corrected by using a different long pattern. In some aspects, the transmitting device may use a long pattern including at least one instance of the sequence S and at least one instance of the sequence $\overline{S}$, rather than a long pattern that consists of only copies of S or only copies of $\overline{S}$, to reduce incorrect peak detections. For example, the long pattern [$\overline{S}$, $\overline{S}$, S, $\overline{S}$] may be used instead of the long pattern [$\overline{S}$, $\overline{S}$, $\overline{S}$, $\overline{S}$].

Figure 7B:
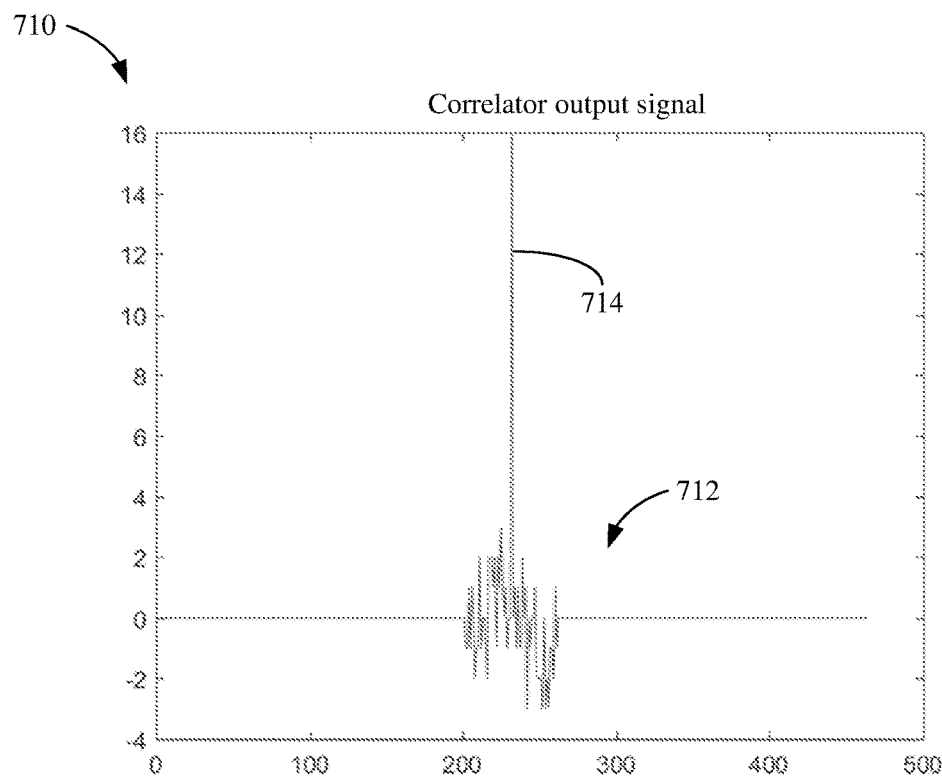
FIG. 7B shows a graph depicting another example output waveform based on a short pattern contained in a short preamble of a wake-up message.
Figure 7C:
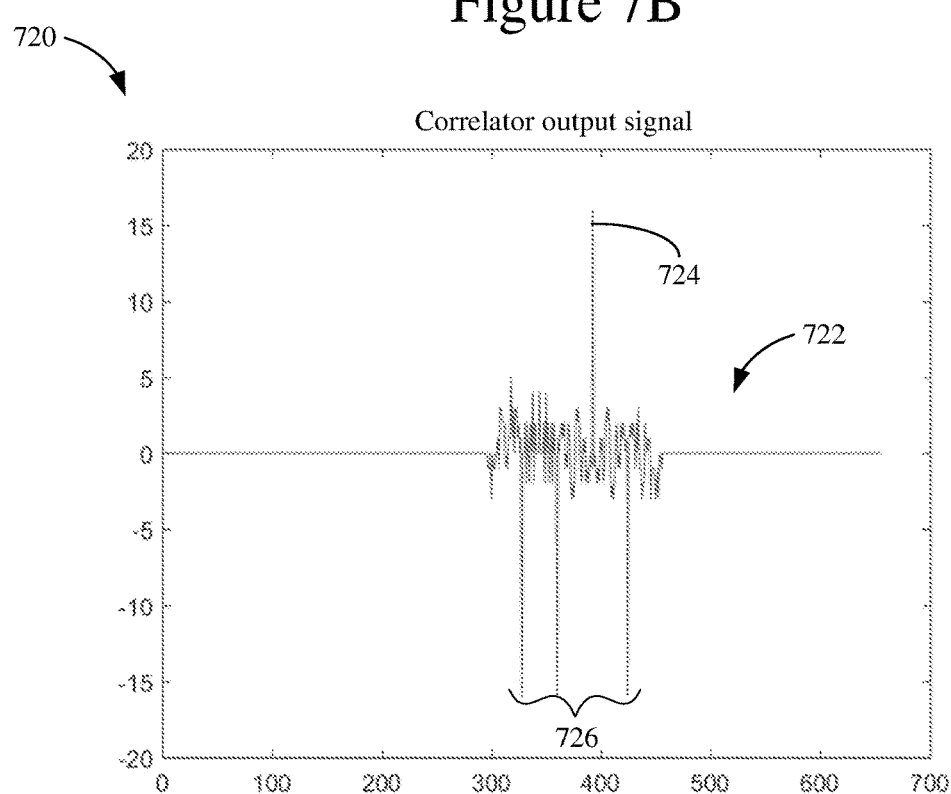
FIG. 7C shows a graph depicting another example output waveform based on a long pattern contained in a long preamble of a wake-up message.

FIG. 7B shows a graph 710 depicting an example output waveform 712 generated by the correlator 330 based on the short pattern containing one instance of the sequence S. The output waveform 712 includes a large positive peak 714. FIG. 7C shows a graph 720 depicting an example output waveform 722 generated by the correlator 330 based on the long pattern [$\overline{S}$, $\overline{S}$, S, $\overline{S}$]. The output waveform 722 includes a large positive peak 724 corresponding to the one instance of the sequence S and three large negative peaks 726 corresponding to the three instances of $\overline{S}$.

Figure 8:
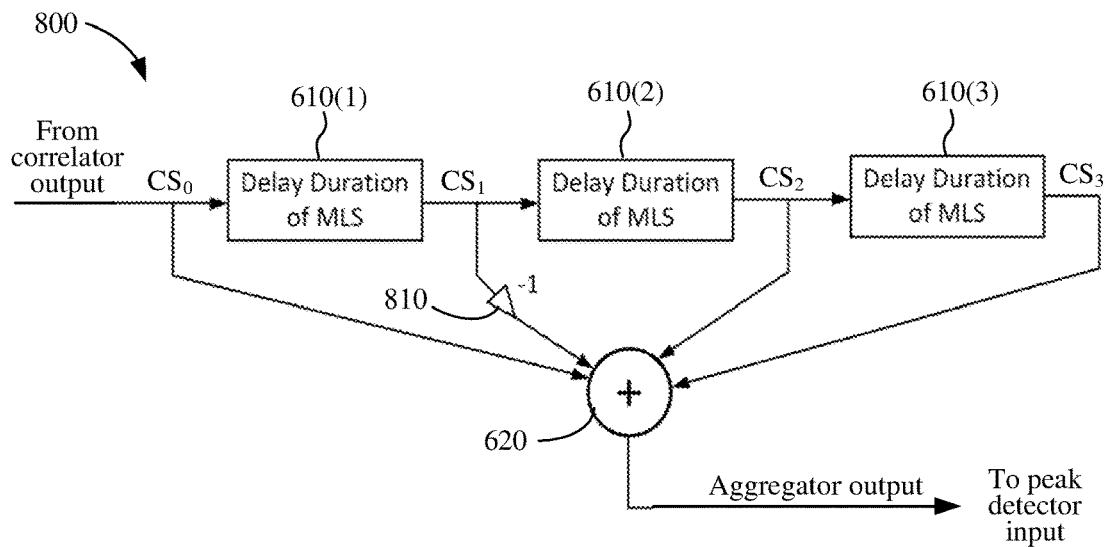
FIG. 8 shows a block diagram of another example aggregator.

FIG. 8 shows a block diagram of another example aggregator 800. The aggregator 800 is similar to the aggregator 600 of FIG. 6, except that a logic element 810 is provided between the output of the first delay element 610(1) and the corresponding input of the summer 620. The logic element 810 multiplies the delayed signal $CS_1$ by −1, for example, to account for the positive peak caused by the one instance of the sequence S in the long pattern of [$\overline{S}$, $\overline{S}$, S, $\overline{S}$].

In some other implementations, other long patterns may be used by the transmitting device, and the logic element 810 may be used to multiply any combination of the correlator signals $CS_1$-$CS_3$ provided by the respective delay elements 610(1)-610(3).

Figure 9:
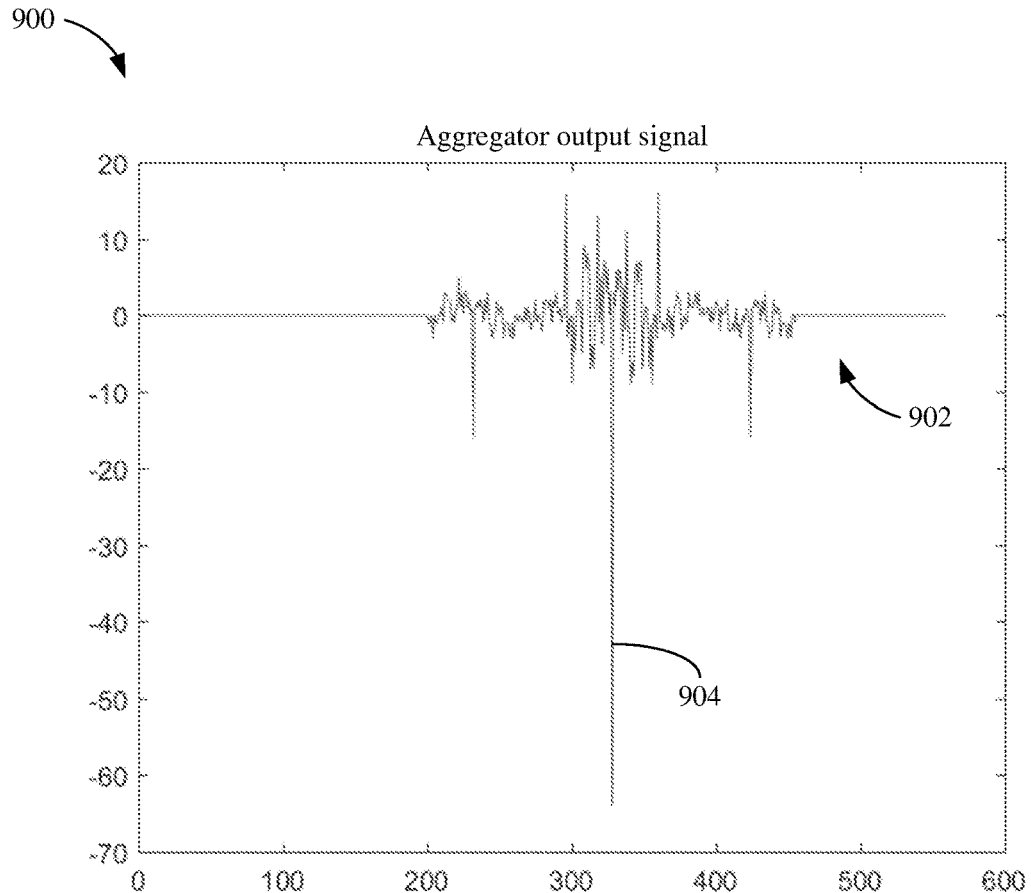
FIG. 9 shows a graph depicting an example output waveform generated by the aggregator of FIG. 8.

FIG. 9 shows a graph 900 depicting an example output waveform 902 generated by the aggregator 800 of FIG. 8. The output waveform 902, which is generated by the aggregator 800 based on the long pattern of [$\overline{S}$, $\overline{S}$, S, $\overline{S}$], is shown to include a large negative peak 904 with significantly reduced side peaks as compared with the output waveform 702 of FIG. 7A.

In some other implementations, a transmitting device may use two different sequences to construct the short preamble and the long preamble. In some aspects, the first sequence $S_0$ is a MLS, and the second sequence $S_1$ is orthogonal to the first sequence $S_0$, for example, such that a bitwise exclusive-OR operation on the first sequence $S_0$ and the second sequence $S_1$ generates a resulting sequence for which the number of 1's is approximately equal to one-half the number of bits in each of the first and second sequences. The concatenation of the first and second sequences may be expressed as $[S_0 \cdot B_1, S_1 \cdot B_2, S_1 \cdot B_3, \ldots S_0 \cdot B_N]$, where the operation S·B indicates a bit-by-bit exclusive-OR operation between a given one of the sequences $S_0$ and $S_1$ and a bitstring B. In other words, while each bit of the complemented sequence $\overline{S}$ is the logical opposite of a corresponding bit of the original sequence S, each bit of the second sequence $S_1$ may or may not be the logical opposite of a corresponding bit of the first sequence $S_0$—as long as the aperiodic correlation between the first sequence $S_0$ and the second sequence $S_1$ tends to be zero (but not necessarily zero).

Figure 10:
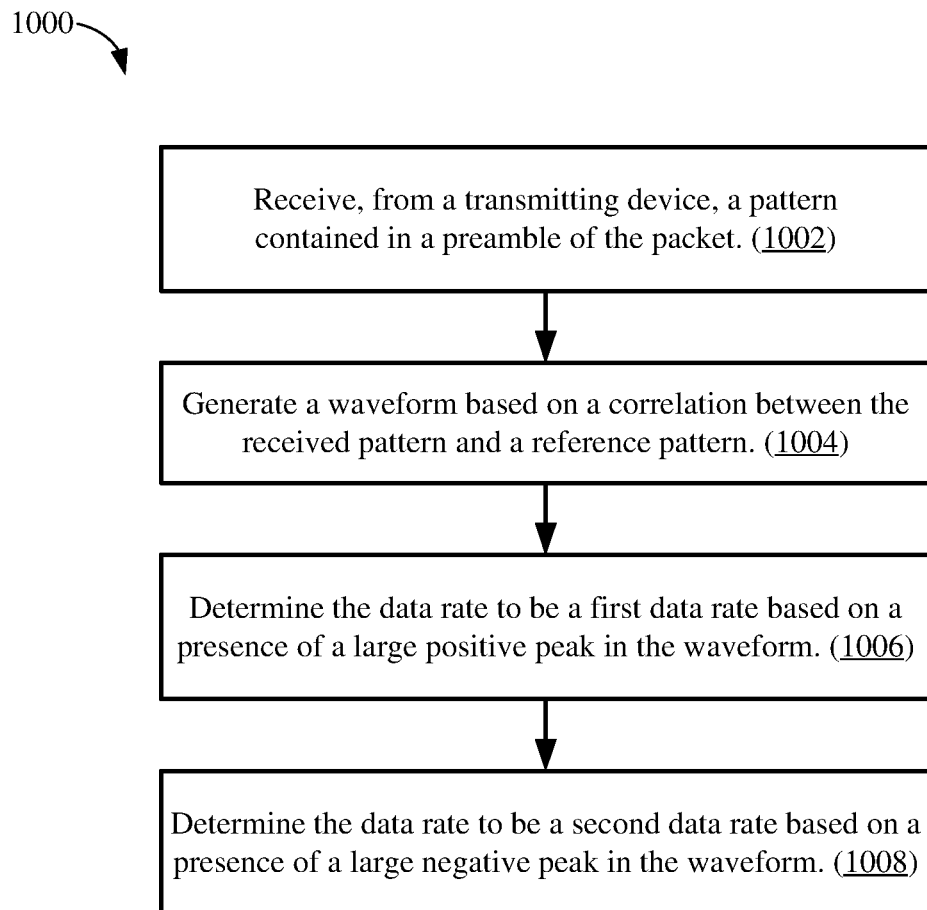
FIG. 10 shows an illustrative flow chart depicting an example operation for determining a data rate of a received packet.

FIG. 10 shows an illustrative flow chart depicting an example operation 1000 for determining a data rate of a received packet. The example operation 1000 may be performed by any suitable wireless device including, for example, the AP 110 of FIG. 1, any of the wireless devices WD1-WD4 of FIG. 1, or the wireless device 200 of FIG. 2. The receiving device receives, from the transmitting device, a pattern contained in a preamble of the packet (1002). The receiving device generates a waveform based on a correlation between the received pattern and a reference pattern (1004). In some implementations, the pattern comprises one or more instances of a maximal length sequence (MLS), and the reference pattern comprises one or more instances of the MLS or a variant of the MLS (such as a logical complement of the MLS). In some aspects, the reference pattern is derived from the MLS by converting the 0's of the MLS to −1's, and maintaining the 1's of the MLS.

The receiving device determines the data rate of the packet to be a first data rate based on a presence of a large positive peak in the waveform (1006), and determines the data rate of the packet to be a second data rate based on a presence of a large negative peak in the waveform (1008). In some implementations, the receiving device comprises a non-coherent wake-up receiver, the first data rate comprises a low data rate defined by the IEEE 802.11ba specification, and the second data rate comprises a high data rate defined by the IEEE 802.11ba specification. In some aspects, the first data rate is approximately 62.5 kb/s, and the second data rate is approximately 250 kb/s.

Figure 11:
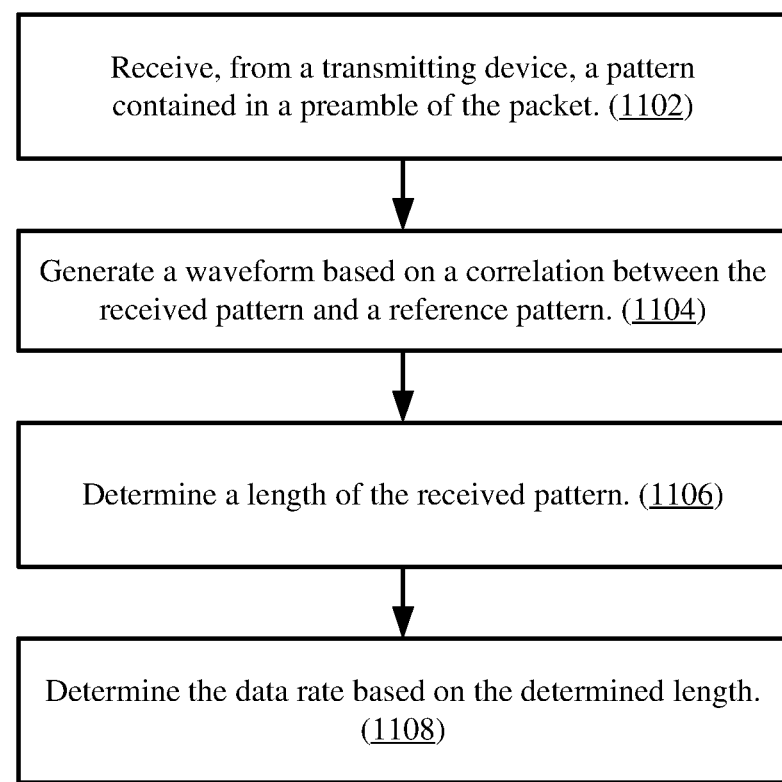
FIG. 11 shows an illustrative flow chart depicting another example operation for determining a data rate of a received packet.

FIG. 11 shows an illustrative flow chart depicting another example operation 1100 for determining a data rate of a received packet. The example operation 1100 may be performed by any suitable wireless device including, for example, the AP 110 of FIG. 1, any of the wireless devices WD1-WD4 of FIG. 1, or the wireless device 200 of FIG. 2. The receiving device receives, from the transmitting device, a pattern contained in a preamble of the packet (1102). The receiving device generates a waveform based on a correlation between the received pattern and a reference pattern (1104). In some implementations, the received pattern comprises one or more instances of a maximal length sequence (MLS), and the reference pattern comprises one or more instances of the MLS or a variant of the MLS (such as a logical complement of the MLS). In some aspects, the reference pattern is derived from the MLS by converting the 0's of the MLS to −1's, and maintaining the 1's of the MLS.

The receiving device determines a length of the received pattern (1106). The receiving device may determine the length of the received pattern by detecting a short pattern or a long pattern in the preamble. In some implementations, the short pattern comprises one maximal length sequence (MLS), and the long pattern comprises a plurality of copies of the MLS. In some aspects, the long pattern comprises at least one copy of the MLS and at least one copy of a logically complemented MLS.

The receiving device determines the data rate based on the determined length (1108). In some implementations, detection of the long pattern indicates a low data rate, and detection of the short pattern indicates a high data rate.

Figure 12A:
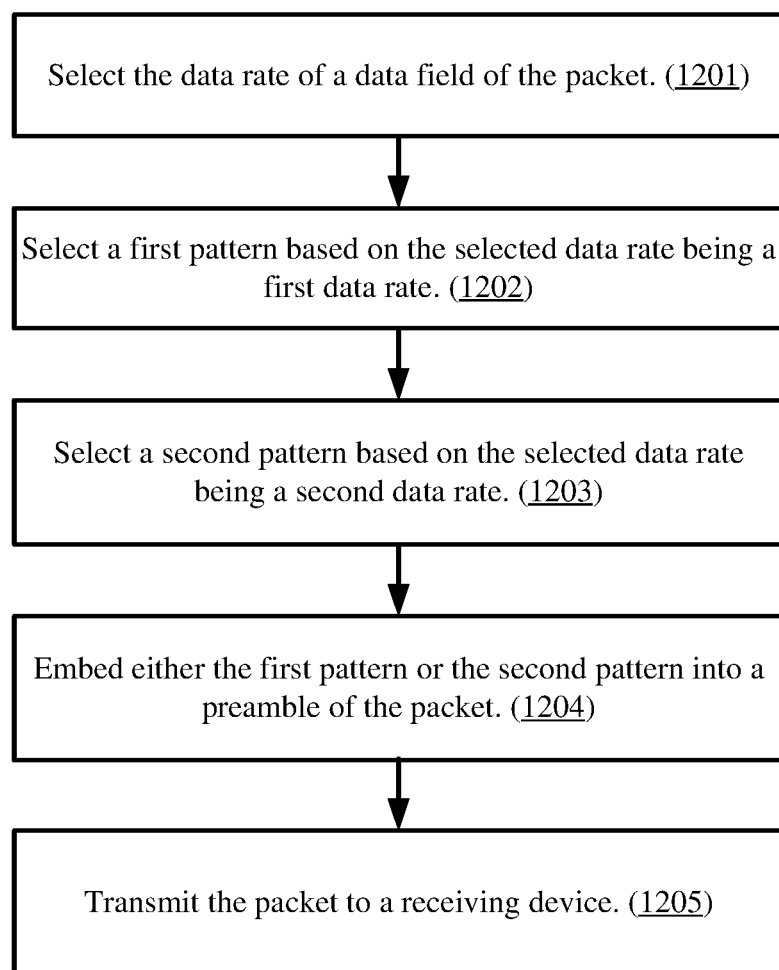
FIG. 12A shows an illustrative flow chart depicting an example operation for indicating a data rate of a transmitted packet.

FIG. 12A shows an illustrative flow chart depicting an example operation 1200 for indicating a data rate of a transmitted packet. The example operation 1200 may be performed by any suitable wireless device including, for example, the AP 110 of FIG. 1, any of the wireless devices WD1-WD4 of FIG. 1, or the wireless device 200 of FIG. 2. The transmitting device selects the data rate of a data field of the packet (1201). The transmitting device selects a first pattern based on the selected data rate being a first data rate (1202), and selects a second pattern based on the selected data rate being a second data rate (1203). In some implementations, the first pattern comprises a maximal length sequence (MLS), and the second pattern comprises a logical complement of the MLS.

The transmitting device embeds either the first pattern or the second pattern into a preamble of the packet (1204). For example, if the selected data rate is the first data rate, the transmitting device embeds the first pattern into the preamble of the packet. If the selected data rate is the second data rate, the transmitting device embeds the second pattern into the preamble of the packet. In some aspects, the first data rate comprises a low data rate defined by the IEEE 802.11ba specification, and the second data rate comprises a high data rate defined by the IEEE 802.11ba specification.

The transmitting device transmits the packet to a receiving device (1205). In some aspects, the transmitting device transmits at least the preamble of the packet by modulating an OFDM waveform using an ON-OFF keying modulation scheme.

Figure 12B:
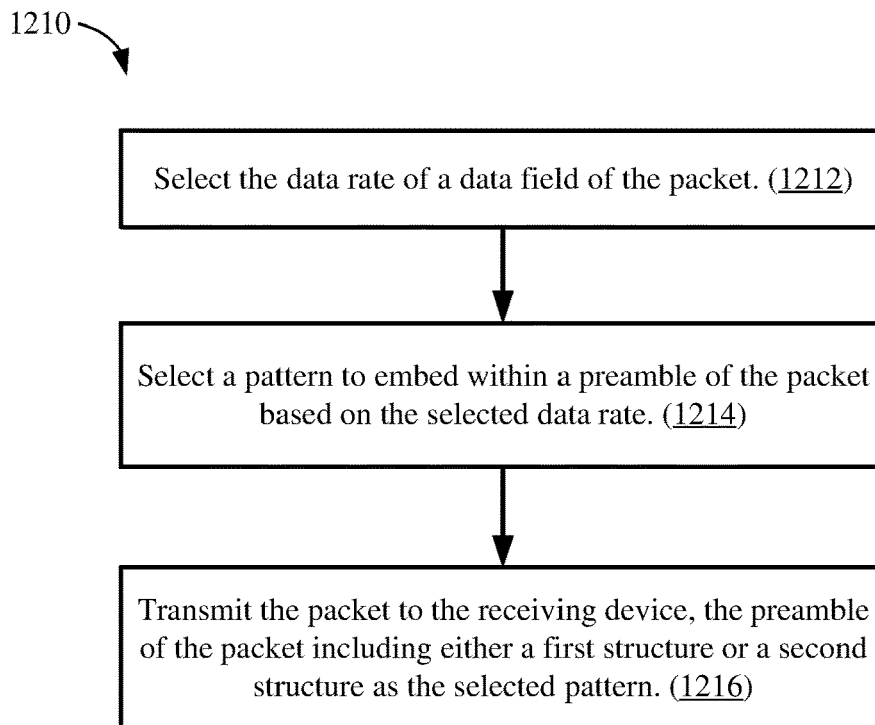
FIG. 12B shows an illustrative flow chart depicting another example operation for indicating a data rate of a transmitted packet.

FIG. 12B shows an illustrative flow chart depicting another example operation 1210 for indicating a data rate of a transmitted packet. The example operation 1210 may be performed by any suitable wireless device including, for example, the AP 110 of FIG. 1, any of the wireless devices WD1-WD4 of FIG. 1, or the wireless device 200 of FIG. 2. The transmitting device may select the data rate of a data field of the packet (1212). In some implementations, the transmitting device may select a low data rate (LDR) of 62.5 kb/s or a high data rate (HDR) of 250 kb/s, for example, as provided in the IEEE 802.11ba specification. In other implementations, the transmitting device may select other suitable data rates.

Figure 12C:
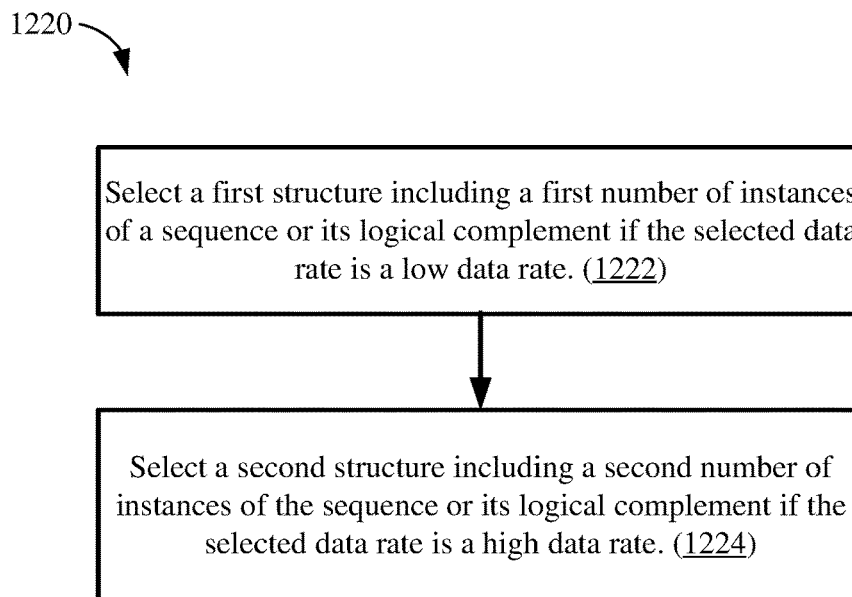
FIG. 12C shows an illustrative flow chart depicting an example operation for selecting a pattern based on a data rate of a packet.

The transmitting device may select a pattern to embed within a preamble of the packet based on the selected data rate (1214). In some implementations, the transmitting device may select different patterns to embed within the packet preamble based on the selected data rate. For example, FIG. 12C shows an illustrative flow chart depicting an example operation 1220 for selecting a pattern based on the selected data rate of a packet. The transmitting device may select a first structure that includes a first number of instances of a sequence or its logical complement if the selected data rate is the low data rate (1222), and may select a second structure that includes a second number of instances of the sequence or its logical complement if the selected data rate is the high data rate (1224). In some implementations, the first structure may include two instances of the sequence W, and the second structure may include a single instance of the logically complemented sequence $\overline{W}$. In some aspects, the sequence W may be 32 bits long, the first structure may be 64 bits long, and the second structure may be 32 bits long. In other implementations, the second structure may also include one or more instances of a second sequence or one or more instances of a logical complement of the second sequence. In addition, or in the alternative, the second structure may include one or more instances of a pad sequence.

Referring again to FIG. 12B, the transmitting device may transmit the packet to the receiving device, the preamble of the packet including either the first structure or the second structure as the selected pattern (1216). The transmitting device may embed the selected pattern within any suitable portion of the packet preamble. In some implementations, the transmitting device may embed the selected pattern within the Sync field of a WUR message. In addition, or in the alternative, the transmitting device may transmit the selected pattern by modulating an OFDM waveform using an ON-OFF keying modulation scheme.

Figure 13:
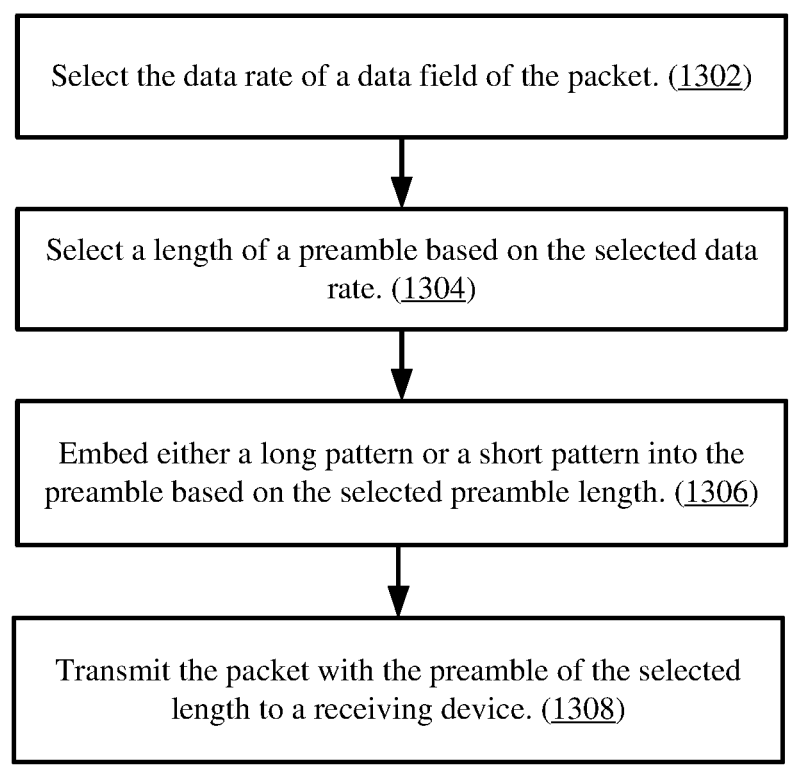
FIG. 13 shows an illustrative flow chart depicting another example operation for indicating a data rate of a transmitted packet.

FIG. 13 shows an illustrative flow chart depicting another example operation 1300 for indicating a data rate of a transmitted packet. The example operation 1300 may be performed by any suitable wireless device including, for example, the AP 110 of FIG. 1, any of the wireless devices WD1-WD4 of FIG. 1, or the wireless device 200 of FIG. 2. The transmitting device selects the data rate of a data field of the packet (1302). The transmitting device selects a length of a preamble based on the selected data rate (1304). In some implementations, the transmitting device selects a short preamble if the selected data rate is a high data rate, and selects a long preamble if the selected data rate is a low data rate. The short preamble may contain one copy of an MLS, and the long preamble may contain a plurality of copies of the MLS or logical complements of the MLS.

The transmitting device embeds either a long pattern or a short pattern into the preamble based on the selected preamble length (1306). In some aspects, the transmitting device embeds the long pattern into the packet's preamble when the packet is to be transmitted at the low data rate, and embeds the short pattern into the packet's preamble when the packet is to be transmitted at the high data rate. The transmitting device then transmits the packet with the preamble of the selected length to a receiving device (1308). In some aspects, the preamble is transmitted by modulating an OFDM waveform using an ON-OFF keying modulation scheme.

The short patterns described above each include a single instance of the sequence S or the complemented sequence $\overline{S}$, and may be readily distinguishable from long patterns that include a plurality of instances of the sequence S or the complemented sequence $\overline{S}$. In other implementations, the short pattern and the long pattern may each include a plurality of instances of a sequence (such as the sequence S or the complemented sequence $\overline{S}$). In some aspects, both the short pattern and the long pattern may be constructed using the same maximum length sequence (MLS), for example, so that a wake-up receiver may use a single correlator (such as the correlator 330 of FIG. 3) to correlate either the short pattern or the long pattern with the reference pattern to generate an output signal. Although the short pattern may include fewer instances of the sequence than the long pattern, peaks in the output signal resulting from the short pattern may have the same timing offset as peaks in the output signal resulting from the long pattern. More specifically, in implementations in which the short pattern and the long pattern each include multiple instances of the same sequence (such as the sequence S or the complemented sequence $\overline{S}$), the spacing between peaks in the output signal will be the same irrespective of whether the short pattern is correlated with the reference pattern or the long pattern is correlated with the reference pattern. As a result, the wake-up receiver may have more difficulty determining whether a received pattern is a short pattern or a long pattern, for example, as compared to implementations in which the short pattern contains only one instance of the sequence.

For example, referring again to FIG. 5B, the four large negative peaks 514 in the waveform of the correlator output signal 512 are caused by sequentially correlating four instances of the complemented sequence $\overline{S}$ with the reference pattern. Because each instance of the complemented sequence $\overline{S}$ has the same length or duration, the four large negative peaks 514 in the waveform of the correlator output signal 512 are equally spaced apart in time, for example, such that the time offset between each pair of adjacent peaks 514 is the same. Thus, although the peak detector 340 may be able to determine that the four large negative peaks 514 result from correlating the sequences [$\overline{S}$, $\overline{S}$, $\overline{S}$, $\overline{S}$] with the reference pattern, the peak detector 340 may not be able to determine whether the sequences [$\overline{S}$, $\overline{S}$, $\overline{S}$, $\overline{S}$] are part of a short pattern or a long pattern, which in turn may reduce the ability of the wake-up receiver to determine the data rate of a received packet based on the length of the pattern contained in the packet's preamble.

In accordance with aspects of the present disclosure, one or more short pad sequences may be embedded within the short pattern to increase the spacing between peaks in the output signal resulting from multiple instances of the sequence S (or the complemented sequence $\overline{S}$) contained in the short pattern (as compared to the spacing between peaks in the correlator output signal corresponding to multiple instances of the sequence S (or the complemented sequence $\overline{S}$) contained in the long pattern). For example, if the duration of the sequence S (and thus the duration of the complemented sequence $\overline{S}$) is T µs, then peaks in the output signal resulting from multiple instances of the sequence S may be separated in time by T µs, irrespective of whether the instances of the sequence S are contained in a short pattern or in a long pattern. Similarly, if the duration of the complemented sequence $\overline{S}$ is T µs, then peaks in the output signal resulting from multiple instances of the complemented sequence $\overline{S}$ may be separated in time by T µs, irrespective of whether the instances of the sequence S are contained in a short pattern or in a long pattern.

Thus, by inserting an instance of a pad sequence P having a duration of Δ µs between each pair of adjacent sequences contained in the short pattern, peaks in the associated output signal may be separated in time by T+Δ µs (rather than by T µs). The long pattern may not include any instances of the pad sequence P, for example, so that peaks in its associated output signal are separated in time by T µs. In this manner, one or more instances of the pad sequence P may be inserted in the short pattern, but not in the long pattern, so that the timing offset between peaks in the output signal resulting from the short pattern are different than the timing offset between peaks in the output signal resulting from the long pattern. The resulting differences in spacings between peaks in the output signal for the short pattern and the long pattern may allow the wake-up receiver to more easily distinguish between a short pattern and a long pattern, which in turn may improve its ability to determine the data rate of a received packet based on the pattern contained in its preamble.

In addition, or in the alternative, one or more short pad sequences may be embedded within the long pattern to alter the spacing between peaks in the output signal resulting from instances of the sequence S (or the complemented sequence $\overline{S}$) contained in the long pattern. However, because inserting one or more short pad sequences into the long pattern increases the length of the long pattern, it may be desirable to insert the short pad sequences only into the short pattern, for example, because the length of the short pattern is less than the length of the long pattern, even after the short pad sequences are inserted into the short pattern.

The pad sequence P may include any suitable pattern, and may also be of any suitable length. In some aspects, the pad sequence P may include a pattern of alternating 1's and 0's to minimize undesirable logic state residuals at the input of the wake-up receiver, although a pattern of all 1's or all 0's may also be used as the pad sequence P. Further, although the pad sequence P is described in the examples herein as including 2 bits, the pad sequence P may include other numbers of bits, for example, as long as the length of the pad sequence does not inadvertently cause the spacing between peaks in the output signal resulting from the short pattern to become equal to the spacing between peaks in the output signal resulting from the long pattern.

In some implementations, the long pattern may be constructed by concatenating instances or copies of the sequences S and/or $\overline{S}$, and the short pattern may be constructed by concatenating instances or copies of the sequences S and/or $\overline{S}$ and then inserting an instance of the pad sequence P between adjacent instances of the sequences S and/or $\overline{S}$. In some aspects, each sequence bit has a duration of 1 μs. For purposes of discussion herein, a 16-bit MLS is selected as the sequence S, a 2-bit pattern is selected as the pad sequence P, the long pattern is constructed using eight instances of the sequence S and/or the complemented sequence $\overline{S}$, and the short pattern is constructed using three instances of the sequence S and/or the complemented sequence $\overline{S}$ and two instances of the pad sequence P. For example, the 16-bit MLS may be selected as S=[0,1,0,0,0, 1,1,1,1,0,1,0,1,1,0,0], the 2-bit pattern P=[1,0] may be selected as the pad sequence P, the long pattern may include four copies of the sequence S and four copies of the complemented sequence $\overline{S}$ constructed as LP=[S, $\overline{S}$, S, S, $\overline{S}$, $\overline{S}$, $\overline{S}$, S], and the short pattern may include two copies of the sequence S, one copy of the complemented sequence $\overline{S}$, and two copies of the pad sequence P constructed as SP=[S, P, $\overline{S}$, P, S]. For this example, the long pattern LP has a duration of 128 μs, and the short pattern SP has a duration of 52 μs.

It is to be understood that the specific length and pattern of the MLS described herein is merely one of many possible implementations, and therefore aspects of the present disclosure are not so limited. Similarly, the specific lengths and patterns of the pad sequence P, the long pattern (LP), and the short pattern (SP) described herein are merely one of many possible implementations, and therefore aspects of the present disclosure are not so limited. Further, the short pattern and the long pattern disclosed herein may also be referred to as a short sync and a long sync, respectively.

Figure 14:
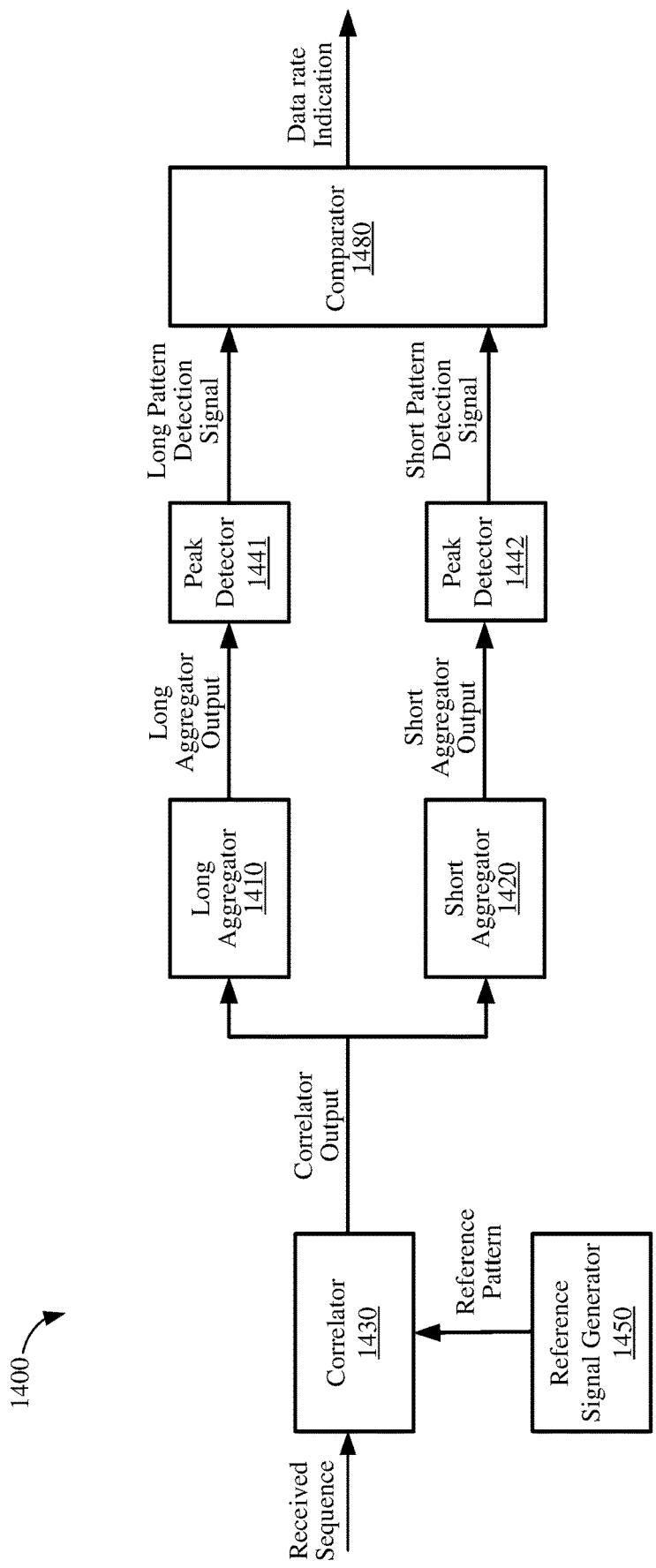
FIG. 14 shows a block diagram of an example pattern detector.

FIG. 14 shows a block diagram of an example pattern detector 1400. The pattern detector 1400 is shown to include a long aggregator 1410, a short aggregator 1420, a correlator 1430, a first peak detector 1441, a second peak detector 1442, a reference signal generator 1450, and a comparator 1480. The pattern detector 1400 may be employed by the wake-up receiver 300 of FIG. 3, for example, by coupling an input terminal of the correlator 1430 to the output of the baseband processor 320. In some aspects, the correlator 1430 may be one implementation of the correlator 330 of FIG. 3, the first and second peak detectors 1441-1442 may be one implementation of the peak detector 340 of FIG. 3, and the reference signal generator 1450 may be one implementation of the reference signal generator 350 of FIG. 3. It is noted that using a single correlator 1430 in a wake-up receiver (such as the wake-up receiver 300 of FIG. 3) may not only reduce power consumption but also conserve circuit area, for example, as compared with receivers that use different correlators for long preambles and short preambles.

The correlator 1430 includes a first input to receive one or more sequences of a pattern contained in the preamble of a wake-up message, includes a second input to receive the reference pattern R from the reference signal generator 1450, and includes an output coupled to inputs of the long aggregator 1410 and the short aggregator 1420. The correlator 1430 may be configured to correlate each of the received sequences with the reference pattern R to generate the correlator output signal. The correlator output signal, which is provided to the long aggregator 1410 and to the short aggregator 1420, may include a number of large positive peaks and/or a number of large negative peaks depending on the sequences contained in the received pattern. For example, when a received sequence S is aligned in time with the reference pattern R, the correlator output signal may include a large positive peak, for example, because the 1's in the received sequence S are multiplied by corresponding 1's in the reference pattern R, and the 0's in the received sequence S are multiplied by corresponding −1's in the reference pattern R. When a received complemented sequence $\overline{S}$ is aligned in time with the reference pattern R, the correlator output signal may include a large negative peak, for example, because the 0's in the received complemented sequence $\overline{S}$ are multiplied by corresponding 1's in the reference pattern R, and the 1's in the received complemented sequence $\overline{S}$ are multiplied by corresponding −1's in the reference pattern R.

The long aggregator 1410 may aggregate multiple peaks in the correlator output signal corresponding to multiple instances of the sequence S and/or the complemented sequence $\overline{S}$ contained in a received long pattern to generate the long aggregator output signal. The first peak detector 1441 includes an input coupled to the output of the long aggregator 1410, and may detect a presence of positive peaks or negative peaks in the long aggregator output signal. In some aspects, the first peak detector 1441 may use a number of threshold levels to determine whether a particular peak in the long aggregator output signal qualifies as either a large positive peak or a large negative peak. The long pattern detection signal generated by the first peak detector 1441 may indicate whether a long pattern was detected in the received wake-up message.

The short aggregator 1420 may aggregate multiple peaks in the correlator output signal corresponding to multiple instances of the sequence S and/or the complemented sequence $\overline{S}$ contained in a received short pattern to generate a short aggregator output signal. The second peak detector 1442 includes an input coupled to the output of the short aggregator 1420, and may detect a presence of positive peaks or negative peaks in the short aggregator output signal. In some aspects, the second peak detector 1442 may use a number of threshold levels to determine whether a particular peak in the short aggregator output signal qualifies as either a large positive peak or a large negative peak. The short aggregator detection signal generated by the second peak detector 1442 may indicate whether a short pattern was detected in the received wake-up message.

The comparator 1480 includes a first input to receive the long pattern detection signal provided by the first peak detector 1441, a second input to receive the short pattern detection signal provided by the second peak detector 1442, and an output to provide a data rate indication signal. In some implementations, the comparator 1480 may compare or otherwise analyze the long pattern detection signal and the short pattern detection signal to determine which of the long pattern detection signal or the short pattern detection signal includes a dominant peak. In some aspects, if the long pattern detection signal includes a dominant peak and the short pattern detection signal does not include a dominant peak, then the comparator 1480 may cause the data rate indication signal to indicate that the received packet was transmitted at the low data rate. Conversely, if the short pattern detection signal includes a dominant peak and the long pattern detection signal does not include a dominant peak, then the comparator 1480 may cause the data rate indication signal to indicate that the received packet was transmitted at the high data rate.

In some implementations, the detection of a long pattern may indicate a presence of a long preamble in the received wake-up message, which in turn may indicate that the wake-up message was transmitted at the low data rate. The detection of a short pattern may indicate a presence of a short preamble in the received wake-up message, which in turn may indicate that the wake-up message was transmitted at the high data rate. In some aspects, the low data rate is 62.5 kb/s, and the high data rate is 250 kb/s.

Figure 15A:
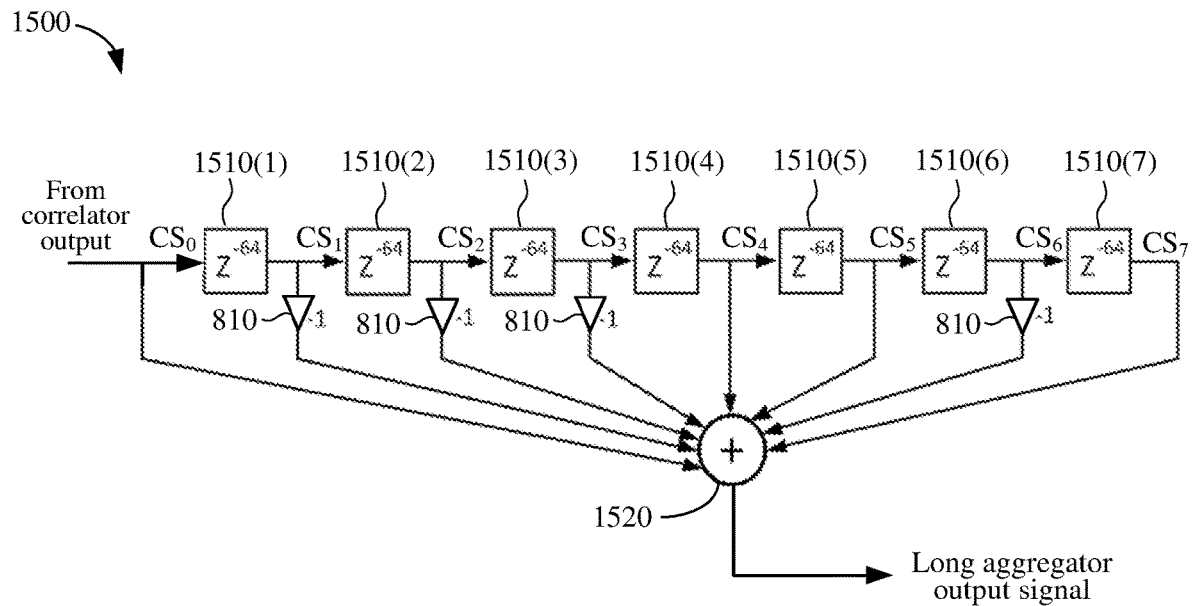
FIG. 15A shows a block diagram of an example long aggregator configured to aggregate peaks in a correlator output signal for long patterns.

FIG. 15A shows a block diagram of an example long aggregator 1500 configured to aggregate peaks in the correlator output signal resulting from a correlation between a long pattern and the reference pattern R. The long aggregator 1500, which may be one implementation of the long aggregator 1410 of FIG. 14, includes an input to receive a correlator output signal ($CS_0$), an output to generate the long aggregator output signal, a number of series-connected sampling circuits 1510(1)-1510(7), and a summer 1520. Each of the sampling circuits 1510(1)-1510(7) may be configured to delay and sample the correlator output signal generated by the correlator 1430. For example, the first sampling circuit 1510(1) samples the correlator output signal $CS_0$ provided by the correlator 1430 and generates a first delayed correlator signal $CS_1$, the second sampling circuit 1510(2) samples the first delayed correlator signal $CS_1$ and generates a second delayed correlator signal $CS_2$, the third sampling circuit 1510(3) samples the second delayed correlator signal $CS_2$ and generates a third delayed correlator signal $CS_3$, and so on, where the seventh sampling circuit 1510(7) samples the sixth delayed signal $CS_6$ and generates a seventh delayed correlator signal $CS_7$.

For implementations in which the short and long patterns are based on a 16-bit MLS having a duration of 16 μs, each of the sampling circuits 1510(1)-1510(7) may be configured to introduce a delay of 16 μs and may have a sampling rate of 4 MHz. In this manner, each of the sampling circuits 1510(1)-1510(7) may aggregate peaks every 16 μs*4 MHz=64 samples of the correlator output signal, and each of the correlator signals $CS_1$-$CS_7$ may be delayed by 16 μs relative to the previous correlator signal. Thus, in some implementations, the peaks in the correlator output signal resulting from sequential instances of the sequence S (or the logically complemented sequence $\overline{S}$) in the long pattern are separated in time by 16 μs, and configuration of the sampling circuits 1510(1)-1510(7) results in the long aggregator 1500 having a sampling interval of 16 μs. As a result, if the correlator output signal is generated in response to a correlation of the long pattern with the reference pattern, then the peaks in the correlator output signal align with the sampling interval of the long aggregator 1500, for example, so that the long aggregator 1500 aggregates all of the peaks (or at least most of the peaks) to generate a large dominant peak. Conversely, if the correlator output signal is generated in response to a correlation of the short pattern with the reference pattern, then only one of the peaks in the correlator output signal aligns with the sampling interval of the long aggregator 1500, for example, so that the long aggregator 1500 does not generating a large dominant peak.

The summer 1520 sums, aggregates, or otherwise combines the incrementally delayed correlator signals $CS_0$-$CS_7$ to generate a long aggregator output signal having a dominant peak representative of the sums of the individual peaks in the correlator output signal. More specifically, the summer 1520 aggregates or combines individual peaks resulting from different instances of the sequence S (or the complemented sequence $\overline{S}$) in the long pattern to generate a large dominant peak that can be more easily detected than any of the individual peaks (particularly at high SNRs levels associated with the low data rate).

The long aggregator 1500 also includes a number of logic elements 810 coupled between selected ones of the sampling circuits 1510(1)-1510(7) and the summer 1520. The logic elements 810 may be configured to multiply selected ones of the correlator signals $CS_0$-$CS_7$ by −1 to compensate for negative peaks in the correlator output signal caused by instances of the sequence S in the long pattern LP=[S, $\overline{S}$, S, S, S, $\overline{S}$, $\overline{S}$, S]. For the example long aggregator 1500 of FIG. 15, the logic elements 810 are configured to multiple the correlator signals $CS_1$, $CS_2$, $CS_3$, and $CS_6$ by −1 to compensate for instances of the complemented sequence $\overline{S}$ appearing at sequence locations 7, 6, 5, and 2 of the long pattern LP=[S, $\overline{S}$, S, S, $\overline{S}$, $\overline{S}$, $\overline{S}$, S]. An example of a long aggregator output signal generated by the summer 1520 based on a correlation of the long pattern LP=[S, $\overline{S}$, S, S, $\overline{S}$, $\overline{S}$, $\overline{S}$, S] with instances of the reference pattern R is depicted in FIG. 16A.

Figure 15B:
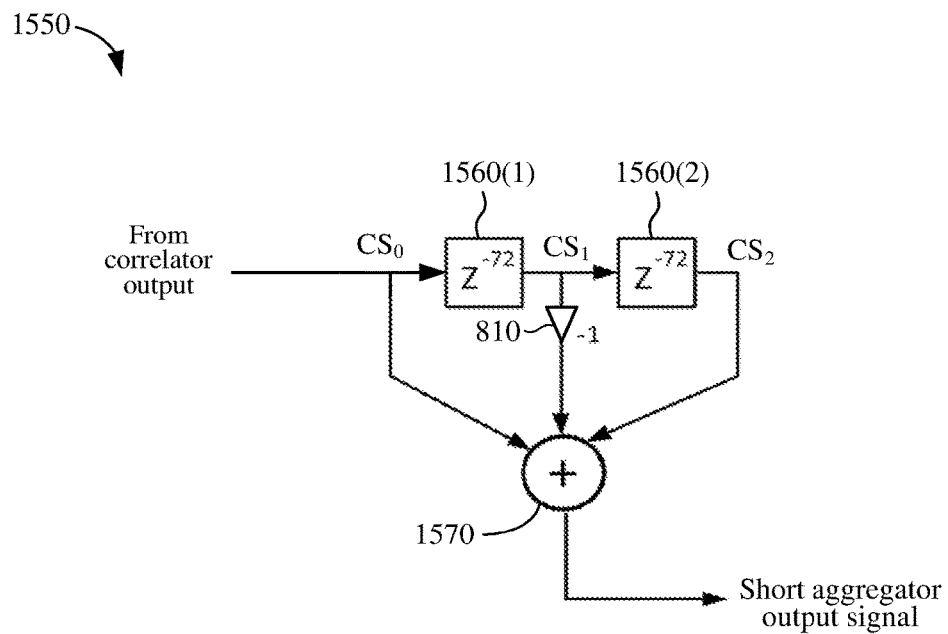
FIG. 15B shows a block diagram of an example short aggregator configured to aggregate peaks in a correlator output signal for short patterns.
Figure 16A:
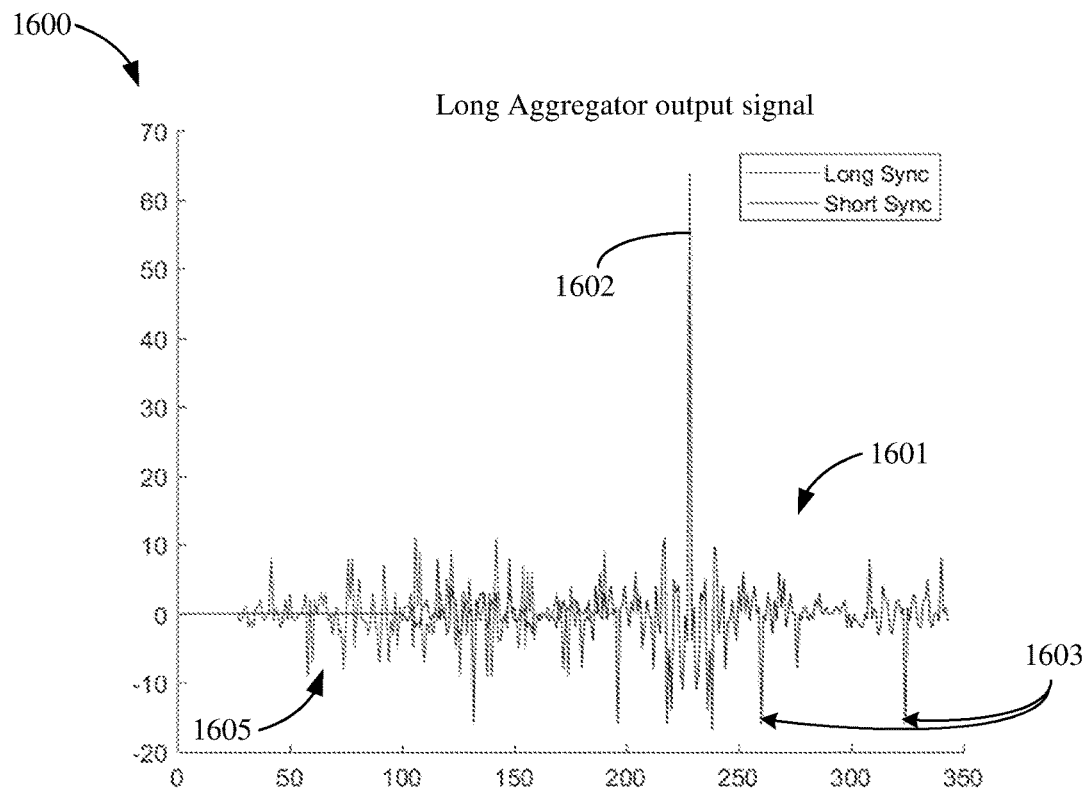
FIG. 16A shows a graph depicting an example output waveform generated by the long aggregator of FIG. 15A.

FIG. 15B shows a block diagram of an example short aggregator 1550 configured to aggregate peaks in the correlator output signal resulting from a correlation between a short pattern and the reference pattern R. The short aggregator 1550, which may be one implementation of the short aggregator 1420 of FIG. 14, includes an input to receive the correlator output signal $CS_0$, an output to generate a short aggregator output signal, a number of series-connected sampling circuits 1560(1)-1560(2), and a summer 1570. Each of the sampling circuits 1560(1)-1560(2) may be configured to delay and sample the correlator output signal generated by the correlator 1430. For example, the first sampling circuit 1560(1) samples the correlator output signal $CS_0$ provided by the correlator 1430 and generates a first delayed correlator signal $CS_1$, and the second sampling circuit 1560(2) samples the first delayed signal $CS_1$ and generates a second delayed correlator signal $CS_2$.

For implementations in which the short and long patterns are based on a 16-bit MLS having a duration of 16 μs and a pad sequence P having a duration of 2 μs, each of the sampling circuits 1560(1)-1560(2) may be configured to introduce a delay of 16 μs+2 μs=18 μs and may have a sampling rate of 4 MHz. In this manner, each of the sampling circuits 1560(1)-1560(2) may aggregate peaks every 18 μs×4 MHz=72 samples of the correlator output signal, and each of the correlator signals $CS_1$-$CS_2$ may be delayed by 18 μs relative to the previous correlator signal. Thus, in some implementations, the peaks in the correlator output signal resulting from sequential instances of the sequence S (or the complemented sequence $\overline{S}$) in the short pattern are separated in time by 18 μs, and configuration of the sampling circuits 1560(1)-1560(2) results in the short aggregator 1550 having a sampling interval of 18 μs. As a result, if the correlator output signal is generated in response to a correlation of the short pattern with the reference pattern, then the peaks in the correlator output signal align with the sampling interval of the short aggregator 1550, for example, so that the short aggregator 1550 aggregates all of the peaks (or at least most of the peaks) to generate a large dominant peak. Conversely, if the correlator output signal is generated in response to a correlation of the long pattern with the reference pattern, then only one of the peaks in the correlator output signal aligns with the sampling interval of the short aggregator 1550, for example, so that the short aggregator 1550 does not generating a large dominant peak.

The summer 1570 sums, aggregates, or otherwise combines the incrementally delayed correlator signals $CS_0$-$CS_2$ to generate a short aggregator output signal having a dominant peak representative of the sums of peaks in the correlator output signal. More specifically, the summer 1570 aggregates or combines individual peaks resulting from different instances of the sequence S (or the complemented sequence $\overline{S}$) in the short pattern to generate a large dominant peak that can be more easily detected than any of the individual peaks.

The short aggregator 1550 also includes a logic element 810 coupled between the output of the first sampling circuit 1560(1) and the summer 1570. The logic element 810 is configured to multiply the correlator signal $CS_1$ by −1 to compensate for the negative peak in the correlator output signal caused by the instance of the complemented sequence $\overline{S}$ in the short pattern SP=[S, P, $\overline{S}$, P, S]. An example of the short aggregator output signal provided by the summer 1570 based on a correlation of the short pattern SP=[S, P, $\overline{S}$, P, S] with instances of the reference pattern R is depicted in FIG. 16B.

FIG. 16A shows a graph 1600 depicting an example output waveform 1601 generated by the long aggregator 1500 of FIG. 15A based on a correlation of the long pattern LP=[S, $\overline{S}$, S, S, $\overline{S}$, $\overline{S}$, $\overline{S}$, S] with instances of the reference pattern R. The output waveform 1601 includes a large "dominant" peak 1602 that represents the sum or combination of eight peaks in the correlator output signal which correspond to the eight instances of the sequence S or $\overline{S}$ in the long pattern. Although not shown for simplicity, the eight peaks in the correlator output signal are separated in time by the duration of the sequence S, which for this example is 16 μs. Note that the output waveform 1601 includes a number of small negative peaks 1603 that may correspond to individual peaks in the correlator output signal that were not aggregated with other peaks, for example, because these peaks 1603 are not aligned with the sampling interval of the long aggregator 1500.

The graph 1600 also depicts an example output waveform 1605 generated by the long aggregator 1500 based on a correlation of the short pattern SP=[S, P, $\overline{S}$, P, S] with instances of the reference pattern R. The output waveform 1605 does not include any notable peaks because the sequences contained in the short pattern are not aligned in time with the sampling interval of the long aggregator 1500. In some aspects, the output waveform 1605 may be a zero-mean waveform, for example, because of the symmetry of the short pattern SP=[S, P, $\overline{S}$, P, S].

Figure 16B:
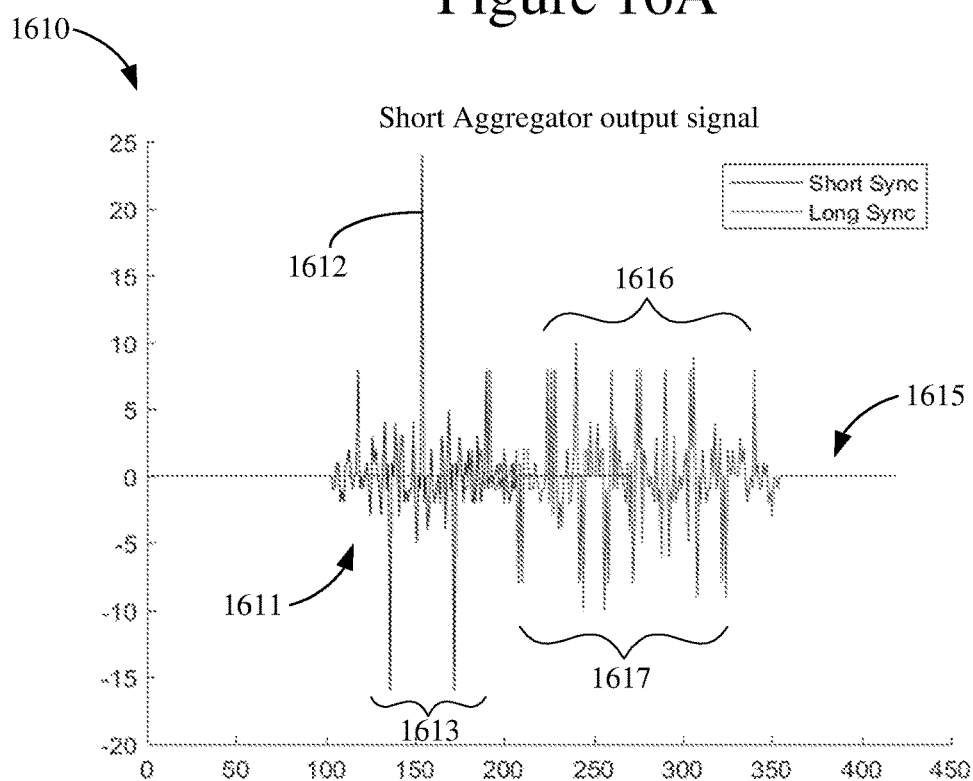
FIG. 16B shows a graph depicting an example output waveform generated by the short aggregator of FIG. 15B.

FIG. 16B shows a graph 1610 depicting an example output waveform 1611 generated by the short aggregator 1550 of FIG. 15B based on a correlation of the short pattern SP=[S, P, $\overline{S}$, P, S] with instances of the reference pattern R. The output waveform 1611 includes a large "dominant" peak 1612 that represents the sum or combination of three peaks in the correlator output signal which correspond to the three instances of the sequence S or $\overline{S}$ in the short pattern. Although not shown for simplicity, the three peaks in the correlator output signal are separated in time by the duration of the sequence S plus the duration of the pad sequence, which for this example is 16 μs+2 μs=18 μs. Note that the output waveform 1611 includes a number of small negative peaks 1613 that may correspond to individual peaks in the correlator output signal that were not aggregated with other peaks, for example, because these peaks 1613 are not aligned with the sampling interval of the short aggregator 1550.

The graph 1610 also depicts an example output waveform 1615 generated by the short aggregator 1550 based on a correlation of the long pattern LP=[S, $\overline{S}$, S, S, $\overline{S}$, $\overline{S}$, $\overline{S}$, S] with instances of the reference pattern R. The output waveform 1615 may include a number of smaller positive peaks 1616 corresponding to individual instances of the sequence S in the long pattern that were not aggregated, and may include a number of smaller negative peaks 1617 corresponding to individual instances of the complemented sequence $\overline{S}$ in the long pattern that were not aggregated, but notably does not include a large dominant peak.

Figure 17:
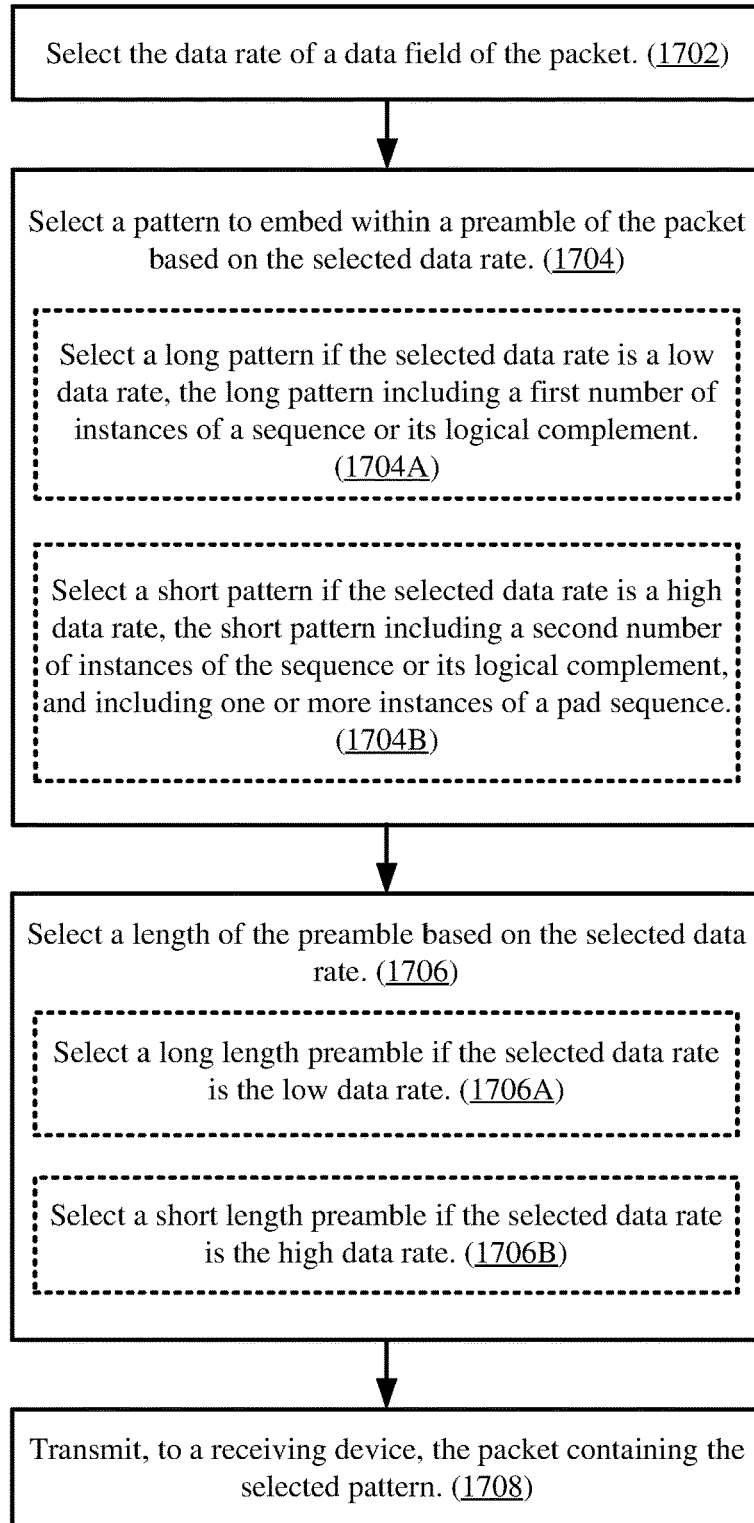
FIG. 17 shows an illustrative flow chart depicting another example operation for indicating a data rate of a transmitted packet.

FIG. 17 shows an illustrative flow chart depicting another example operation 1700 for indicating a data rate of a transmitted packet. The example operation 1700 may be performed by any suitable wireless device including, for example, the AP 110 of FIG. 1, any of the wireless devices WD1-WD4 of FIG. 1, or the wireless device 200 of FIG. 2. The transmitting device selects the data rate of a data field of the packet (1702). In some implementations, the transmitting device may select between a low data rate and a high data rate. In some aspects, the low data rate is 62.5 kb/s, and the high data rate is 250 kb/s.

The transmitting device selects a pattern to embed within a preamble of the packet based on the selected data rate (1704). In some implementations, the transmitting device selects a long pattern if the selected data rate is the low data rate, the long pattern including a first number of instances of a sequence or its logical complement (1704A), and selects a short pattern if the selected data rate is the high data rate, the short pattern including a second number of instances of the sequence or its logical complement, and including one or more instances of a pad sequence (1704B). In some implementations, the sequence is a maximal length sequence (MLS), and its logical complement is a logically complemented MLS. In some implementations, the pad sequence comprises a pattern of alternating 1's and 0's.

In some aspects, the short pattern includes alternating instances of the sequence and the pad sequence, for example, such that an instance of the pad sequence appears between each pair of adjacent sequences in the short pattern. Each instance of the pad sequence may introduce a time offset between a corresponding pair of adjacent sequences, thereby increasing the separation in time between successive instances of the sequence in the short pattern (as compared to the separation in time between successive instances of the sequence in the long pattern). In this manner, the separation in time between successive instances of the sequence in the short pattern is greater than the separation in time between successive instances of the sequence in the short pattern, which in turn allows the comparator 1480 of FIG. 14 to determine the data rate of the received packet based on a comparison between the long pattern detection signal and the short pattern detection signal.

The sequence may include any suitable MLS, and may include various combinations of instances of the MLS and the logically complemented MLS. The pad sequence may also be of any suitable length, as long as the pad sequence length does not cause the separation in time between successive instances of the sequence in the short pattern to be similar to the separation in time between successive instances of the sequence in the long pattern. In some implementations, the MLS comprises 16 bits, the pad sequence comprises 2 bits, and each of the bits in the MLS and the pad sequence has a duration of 1 μs.

The transmitting device selects a length of the preamble based on the selected data rate (1706). In some implementations, the transmitting device selects a long length preamble if the selected data rate is the low data rate (1706A), and selects a short length preamble if the selected data rate is the high data rate (1706B). In some aspects, the long preamble is configured to contain the long pattern, and the short preamble is configured to contain the short pattern.

The transmitting device then transmits, to a receiving device, the packet including the preamble containing the selected pattern (1708). The packet may be transmitted by modulating an OFDM waveform using an ON-OFF Keying (OOK) modulation scheme. In some aspects, a presence of the long pattern in the preamble may indicate that the packet is transmitted at the low data rate, and a presence of the short pattern in the preamble may indicate that the packet is transmitted at the high data rate.

Figure 18:
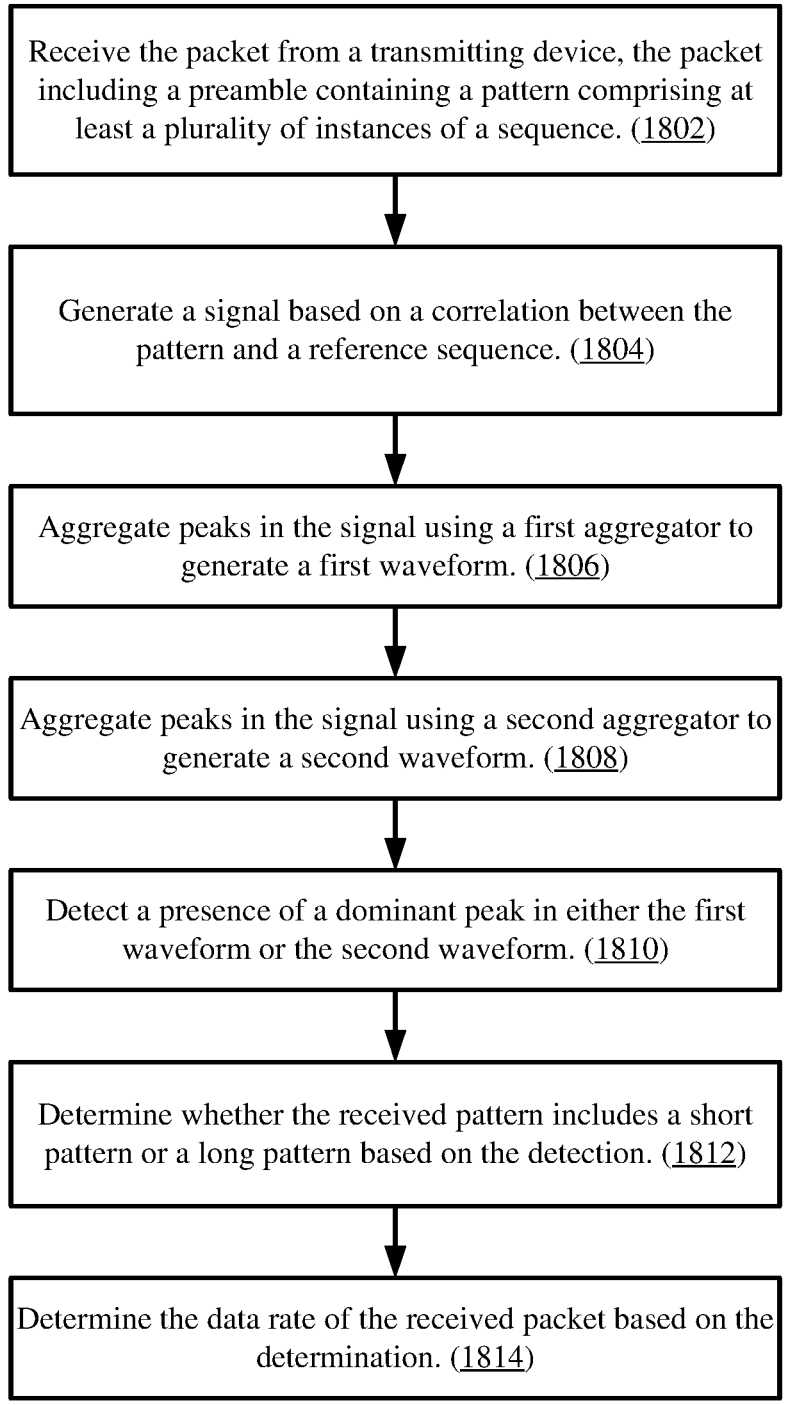
FIG. 18 shows an illustrative flow chart depicting another example operation for determining a data rate of a received packet.

FIG. 18 shows an illustrative flow chart depicting another example operation 1800 for determining a data rate of a received packet. The example operation 1800 may be performed by any suitable wireless device including, for example, the AP 110 of FIG. 1, any of the wireless devices WD1-WD4 of FIG. 1, or the wireless device 200 of FIG. 2. The receiving device receives the packet from a transmitting device, the packet including a preamble containing a pattern comprising at least two or more instances of a sequence (1802). In some implementations, the preamble may be a long preamble that contains a long pattern, or may be a short preamble that contains a short pattern. The long pattern may include a first number of instances of a sequence, and the short pattern may include a second smaller number of instances of the sequence and one or more instances of a pad sequence. In some implementations, the sequence is one of a maximal length sequence (MLS) or a logically complemented MLS. In some implementations, the pad sequence comprises a pattern of alternating 1's and 0's.

In some aspects, the short pattern includes alternating instances of the sequence and the pad sequence, for example, such that an instance of the pad sequence appears between each pair of adjacent sequences in the short pattern. Each instance of the pad sequence introduces a time offset between a corresponding pair of adjacent sequences, thereby increasing the separation in time between successive instances of the sequence in the short pattern (as compared to the separation in time between successive instances of the sequence in the long pattern). In this manner, the separation in time between successive instances of the sequence in the short pattern is greater than the separation in time between successive instances of the sequence in the short pattern.

The receiving device generates a signal based on a correlation between the pattern and a reference sequence (1804). In some implementations, the receiving device may correlate successive instances of the sequence (or the complemented sequence) with a reference pattern to generate the signal, and the signal may include a peak corresponding to each instance of the sequence (or the complemented sequence) in the received pattern. In some aspects, a correlation between the sequence and the reference pattern may generate a positive peak in the signal, and a correlation between the complemented sequence and the reference pattern may generate a negative peak in the signal.

The receiving device aggregates peaks in the signal using a first aggregator to generate a first waveform (1806), and aggregates peaks in the signal using a second aggregator to generate a second waveform (1808). In some implementations, the first aggregator is configured to aggregate peaks in the signal that are separated in time by a first timing offset, and the second aggregator is configured to aggregate peaks in the signal that are separated in time by a second timing offset that is greater than the first timing offset.

The receiving device detects a presence of a dominant peak in either the first waveform or the second waveform (1810). For one example, if the received pattern comprises a long pattern including a number of sequences separated in time by the first timing offset, then the peaks in the corresponding output signal may align with the sampling interval of the first aggregator, for example, so that all of the peaks (or at least most of the peaks) in the signal are aggregated to generate a large dominant peak. Because the second aggregator is configured to sample the correlator output signal using the second timing offset, the peaks in the corresponding output signal may not align with the sampling interval of the second aggregator, for example, so that no more than one of the peaks is aggregated by the second aggregator.

Conversely, if the received pattern comprises a short pattern including a number of sequences separated in time by the second timing offset (such as because of the presence of a pad sequence between pairs of adjacent sequences in the short pattern), then the peaks in the signal may align with the sampling interval of the second aggregator, for example, so that all of the peaks (or at least most of the peaks) in the correlator output signal are aggregated to generate a large dominant peak. Because the first aggregator is configured to sample the correlator output signal using the first timing offset, the peaks in the signal may not align with the sampling interval of the first aggregator, for example, so that no more than one of the peaks is aggregated by the first aggregator.

The receiving device determines whether the received pattern includes a short pattern or a long pattern based on the detection (1812). In some implementations, the presence of a dominant peak in the waveform generated by the first aggregator may indicate that the received pattern comprises the long pattern, and the presence of a dominant peak in the waveform generated by the second aggregator may indicate that the received pattern comprises the short pattern.

The receiving device determines the data rate of the received packet based on the determination (1814). In some aspects, the receiving device determines that the data rate of the packet is the low data rate if the received pattern comprises the long pattern, and determines that the data rate of the packet is the high data rate if the received pattern comprises the short pattern.

In accordance with some other aspects of the present disclosure, the short pattern may include a single instance of a first sequence S, and the long pattern may include one or more instances of the first sequence S or the complemented sequence $\overline{S}$, as well as one or more instances of a second sequence T or the complemented second sequence $\overline{T}$, or any combination thereof. In some aspects, the first sequence S is a 16-bit sequence, the second sequence T is a 16-bit sequence different than the first sequence S, and each sequence bit has a duration of 2 μs. The first sequence S and the second sequence T are selected to each have relatively high auto-correlation properties, and to have relatively high cross-correlation properties.

In some implementations, the short pattern is constructed using a single instance of the first sequence S, and the long pattern is constructed using four total instances: two instances of the complemented first sequence $\overline{S}$, one instance of the second sequence T, and one instance of the complemented second sequence $\overline{T}$. For the examples disclosed herein, the first sequence S=[0,1,0,1,1,0,0,1,1,1,1,0,1,0,0,0] and the second sequence T=[1,1,1,0,0,1,0,1,0,1,1,0,1,0,0,0]. Additionally, the short pattern (SP) includes the first sequence S so that the SP=S, and the long pattern (LP) includes two copies of the complemented first sequence $\overline{S}$, one copy of the second sequence T, and one copy of the complemented second sequence $\overline{T}$ constructed as LP=[$\overline{S}$, T, T, $\overline{S}$]. For this example, the long pattern LP has a transmit duration $TX_{LP}$=(16 bits)*(4 sequences)*(2 μs)=128 μs, and the short pattern SP has a transmit $TX_{SP}$=(16 bits)*(2 μs)=32 μs.

It is to be understood that the specific length and pattern selected for the first sequence S and the second sequence T described herein is merely one of many possible implementations, and therefore aspects of the present disclosure are not so limited. Thus, in other implementations, other suitable bit patterns may be selected for the first sequence S and the second sequence T, and the first sequence S and the second sequence T may include more than 16 bits or less than 16 bits.

Figure 19:
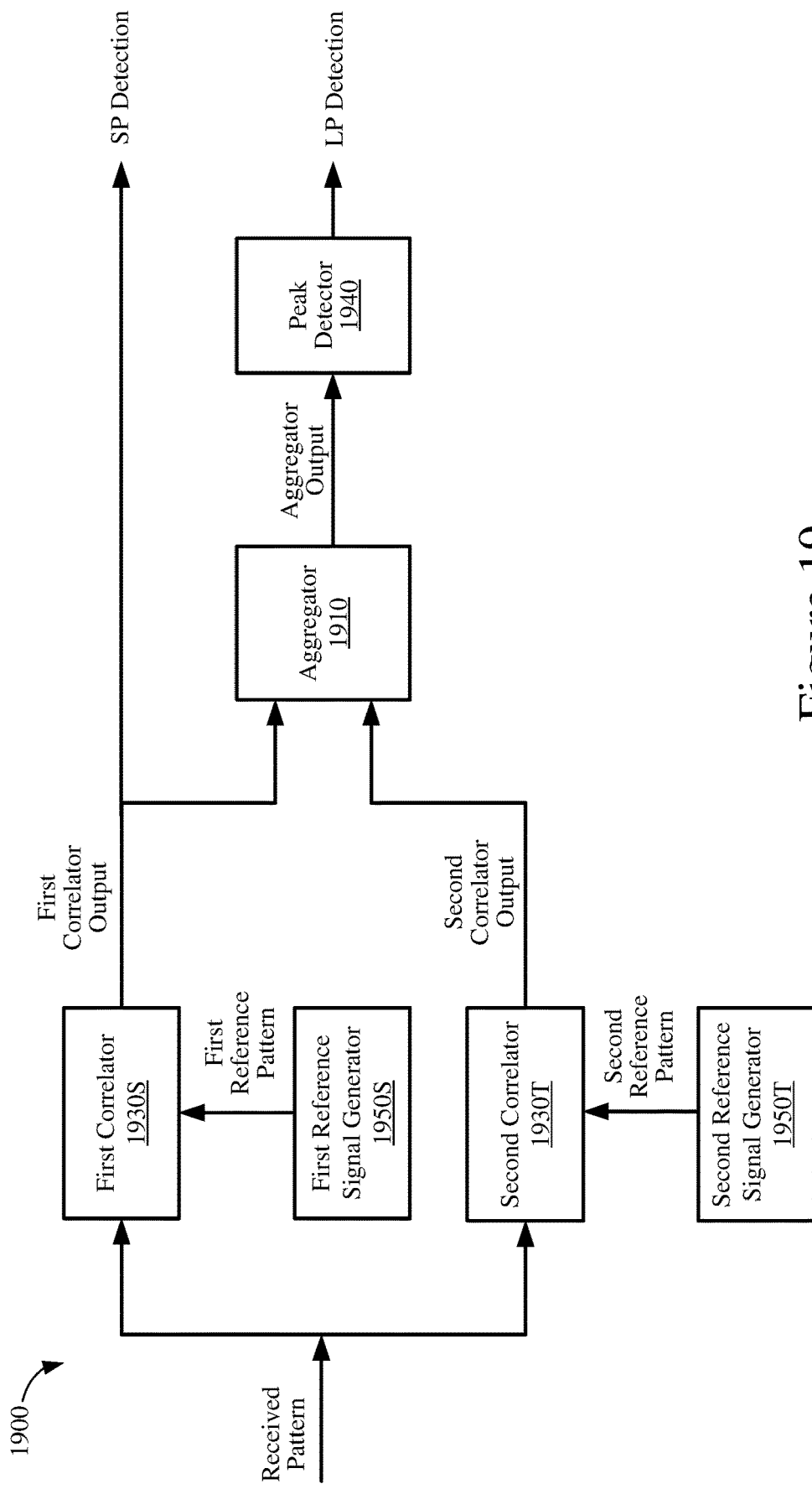
FIG. 19 shows a block diagram of another example pattern detector.

FIG. 19 shows a block diagram of another example pattern detector 1900. The pattern detector 1900 is shown to include an aggregator 1910, a first correlator 1930S, a second correlator 1930T, a first reference signal generator 1950S, a second reference signal generator 1950T, and a peak detector 1940. The pattern detector 1900 may be employed by the wake-up receiver 300 of FIG. 3, for example, by coupling input terminals of the first correlator 1930S and the second correlator 1930T to the output of the baseband processor 320. In some aspects, the first and second correlators 1930S and 1930T, respectively, may each be an implementation of the correlator 330 of FIG. 3, and the peak detector 1940 may be an implementation of the peak detector 340 of FIG. 3.

The first reference signal generator 1950S provides a first reference pattern R1 to the first correlator 1930S. In some aspects, the first reference signal generator 1950S may generate the first reference pattern R1 from the first sequence S using the expression R1=(2×S)−1, for example, so that 1's in the first sequence S appear as 1's in the first reference pattern R1, and 0's in the first sequence S appear as −1's in the first reference pattern R1. In addition, or in the alternative, the first reference pattern R1 may be zero mean (such that it includes equal numbers of 1's and −1's), which in turn may cause the correlator output signal to also be zero mean.

The second reference signal generator 1950T provides a second reference pattern R2 to the second correlator 1930T. In some aspects, the second reference signal generator 1950T may generate the second reference pattern R2 from the second sequence T using the expression R2=(2×T)−1, for example, so that 1's in the second sequence T appear as 1's in the second reference pattern R2, and 0's in the second sequence T appear as −1's in the second reference pattern R2. In addition, or in the alternative, the second reference pattern R2 may be zero mean (such that it includes equal numbers of 1's and −1's), which in turn may cause the correlator output signal to also be zero mean.

The first correlator 1930S includes a first input to receive a pattern contained in the preamble of a wake-up message, includes a second input to receive the first reference pattern R1 from the first reference signal generator 1950S, and includes an output coupled to a first input of the aggregator 1910. The first correlator 1930S may be configured to correlate a sequence contained in the received pattern with the first reference pattern R1 to generate a first correlator output signal. The first correlator output signal, which is provided to the aggregator 1910, may include a large positive peak when the received pattern includes the first sequence S aligned in time with the first reference pattern R1. The large positive peak may appear in the first correlator output signal because the 1's in the received first sequence S are multiplied by corresponding 1's in the first reference pattern R1, and the 0's in the received first sequence S are multiplied by corresponding −1's in the first reference pattern R1. In some implementations, the first correlator output signal may be used as a short pattern (SP) detection signal indicative of whether a short pattern was detected in the received wake-up message.

The second correlator 1930T includes a first input to receive the pattern contained in the preamble of the wake-up message, includes a second input to receive the second reference pattern R2 from the second reference signal generator 1950T, and includes an output coupled to a second input of the aggregator 1910. The second correlator 1930T may be configured to correlate each sequence contained in the received pattern with the second reference pattern R2 to generate a second correlator output signal. The second correlator output signal, which is provided to the aggregator 1910, may include a number of large positive peaks and/or a number of large negative peaks depending on the sequences contained in the received pattern. For example, when a received second sequence T is aligned in time with the second reference pattern R2, the second correlator output signal may include a large positive peak, for example, because the 1's in the received second sequence T are multiplied by corresponding 1's in the second reference pattern R2, and the 0's in the received second sequence T are multiplied by corresponding −1's in the second reference pattern R2. When a received complemented second sequence $\overline{T}$ is aligned in time with the second reference pattern R2, the second correlator output signal may include a large negative peak, for example, because the 0's in the received complemented second sequence $\overline{T}$ are multiplied by corresponding 1's in the second reference pattern R2, and the 1's in the received complemented second sequence $\overline{T}$ are multiplied by corresponding −1's in the second reference pattern R2. Further, when a received complemented first sequence $\overline{S}$ is aligned in time with the second reference pattern R2, the second correlator output signal may include a large negative peak, for example, because the 0's in the received complemented first sequence $\overline{S}$ are multiplied by corresponding 1's in the second reference pattern R2, and the 1's in the received complemented first sequence $\overline{S}$ are multiplied by corresponding −1's in the second reference pattern R2.

The aggregator 1910 may aggregate positive peaks in the first correlator output signal $CS_1$ corresponding to instances of the first sequence S, negative peaks in the first correlator output signal $CS_1$ corresponding to instances of the complemented first sequence $\overline{S}$, positive peaks in the second correlator output signal $CS_2$ corresponding to instances of the second sequence T, and negative peaks in the second correlator output signal $CS_2$ corresponding to the complemented second sequence $\overline{T}$ contained in a received long pattern. In some aspects, the aggregator 1910 may detect a presence of the long pattern in the received wake-up message by combining delayed versions of the first and second correlator output signals $CS_1$ and $CS_2$, for example, as described in more detail with respect to FIG. 20.

The peak detector 1940 includes an input coupled to the output of the aggregator 1910, and may detect a presence of positive peaks or negative peaks in the aggregator output signal. In some aspects, the peak detector 1940 may use a number of threshold levels to determine whether a particular peak in the aggregator output signal qualifies as either a large positive peak or a large negative peak. The peak detector 1940 may generate a long pattern (LP) detection signal indicative of whether a long pattern was detected in the received wake-up message.

In some implementations, the detection of a long pattern may indicate a presence of a long preamble in the received wake-up message, which in turn may indicate that the wake-up message was transmitted at the low data rate. The detection of a short pattern may indicate a presence of a short preamble in the received wake-up message, which in turn may indicate that the wake-up message was transmitted at the high data rate. In some aspects, the low data rate is 62.5 kb/s, and the high data rate is 250 kb/s.

Figure 20:
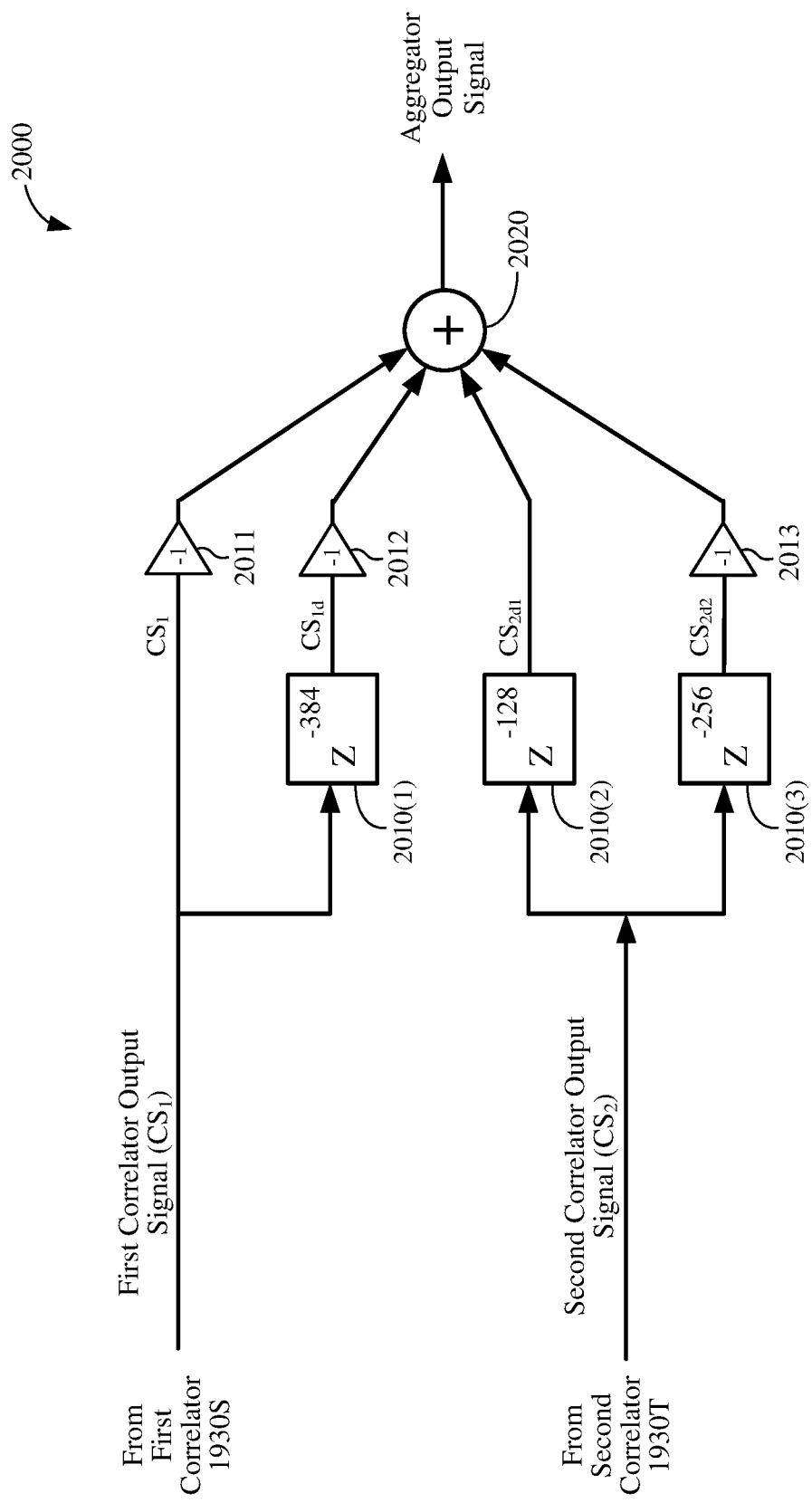
FIG. 20 shows a block diagram of another example aggregator.

FIG. 20 shows a block diagram of another example aggregator 2000. The aggregator 2000, which may be one implementation of the aggregator 1910 of FIG. 19, includes a first input to receive the first correlator output signal $CS_1$ provided by the first correlator 1930S, includes a second input to receive the second correlator output signal $CS_2$ provided by the second correlator 1930T, includes a number of sampling circuits 2010(1)-2010(3), three logic elements 2011-2013, and a summer 2020. The sampling circuits 2010(1)-2010(3) may be configured to delay and sample the correlator output signals. In some implementations, the first sampling circuit 2010(1) samples the first correlator output signal $CS_1$ provided by the first correlator 1930S and generates a first delayed correlator signal $CS_{1d}$, the second sampling circuit 2010(2) samples the second correlator output signal $CS_2$ provided by the second correlator 1930T and generates a second delayed correlator signal $CS_{2d1}$, and the third sampling circuit 2010(3) samples the second correlator output signal $CS_2$ provided by the second correlator 1930T and generates a third delayed correlator signal $CS_{2d2}$.

The first sampling circuit 2010(1) may be configured to introduce a delay of 96 µs and may have a sampling rate of 4 MHz, for example, so that the first sampling circuit 2010(1) introduces a delay equivalent to 96 µs*4 MHz=384 samples of the first correlator output signal $CS_1$. The second sampling circuit 2010(2) may be configured to introduce a delay of 32 µs and may have a sampling rate of 4 MHz, for example, so that the second sampling circuit 2010(2) introduces a delay equivalent to 32 µs*4 MHz=128 samples of the second correlator output signal $CS_2$. The third sampling circuit 2010(3) may be configured to introduce a delay of 64 µs and may have a sampling rate of 4 MHz, for example, so that the third sampling circuit 2010(3) introduces a delay equivalent to 64 µs*4 MHz=256 samples of the second correlator output signal $CS_2$.

In this manner, peaks in the second correlator output signal $CS_2$ resulting from instances of the first complemented first sequence $\bar{S}$, the second sequence T, or the complemented second sequence $\bar{T}$ will align to generate a large dominant peak if the first correlator output signal $CS_1$ is generated in response to a correlation of the long pattern with the first reference pattern R1 and the second correlator output signal $CS_2$ is generated in response to a correlation of the long pattern with the second reference pattern R2.

The first logic element 2011 may be configured to multiply the correlator output signal $CS_1$ by −1 to compensate for negative peaks in the first correlator output signal $CS_1$ caused by a presence of the complemented first sequence $\bar{S}$ in the long pattern LP=[$\bar{S}$, T, $\bar{T}$, $\bar{S}$]. The second logic element 2012 may be configured to multiply the delayed correlator output signal $CS_{1d}$ by −1 to compensate for negative peaks in the first correlator output signal $CS_1$ caused by the other presence of the complemented first sequence $\bar{S}$ in the long pattern LP=[$\bar{S}$, T, $\bar{T}$, $\bar{S}$]. The second logic element 2013 may be configured to multiply the delayed correlator output signal $CS_{2d2}$ by −1 to compensate for negative peaks in the second correlator output signal $CS_2$ caused by a presence of the complemented second sequence $\bar{T}$ in the long pattern LP=[$\bar{S}$, T, $\bar{T}$, $\bar{S}$].

The summer 2020 sums, aggregates, or otherwise combines the first correlator output signal $CS_1$ and the delayed correlator signals $CS_{1d}$, $CS_{2d1}$, and $CS_{2d2}$ to generate the aggregator output signal having a dominant peak representative of the sums of the individual peaks. More specifically, the summer 2020 aggregates or combines individual peaks resulting from different instances of the complemented first sequence $\bar{S}$, the second sequence T, and/or complemented second sequence $\bar{T}$ in the long pattern to generate a large dominant peak that can be more easily detected than any of the individual peaks (particularly at high SNRs levels associated with the low data rate).

Figure 21A:
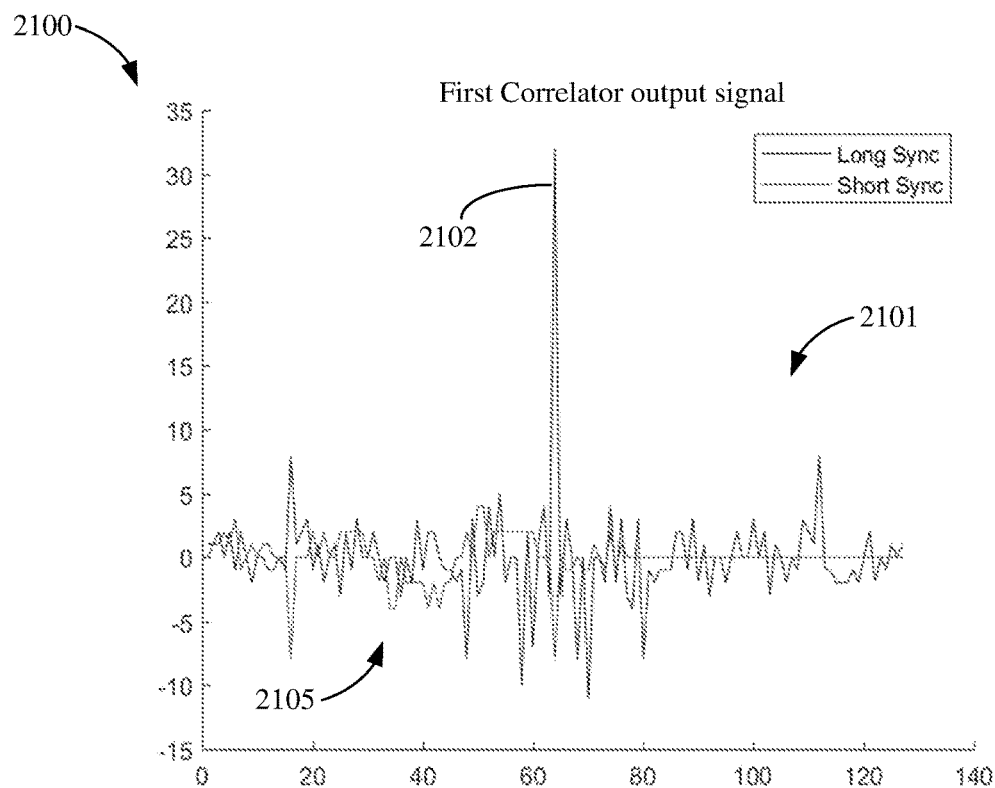
FIG. 21A shows a graph depicting an example waveform based on a correlation of a long pattern.

FIG. 21A shows a graph 2100 depicting an example waveform 2101 based on an aggregation of correlation output signals based on the correlation of the long pattern LP=[$\bar{S}$, T, $\bar{T}$, $\bar{S}$] with instances of the first reference pattern R1 and the second reference pattern R2. For example, the example waveform 2101 can represent the aggregator output signal from the aggregator 1910 described above with reference to FIG. 19 when the long pattern is received. The output waveform 2101 includes a large positive peak 2102 that represents the sum or combination of four peaks in the correlator output signals which correspond to the presence of the sequences $\bar{S}$, T, $\bar{T}$, $\bar{S}$ in the long pattern.

The graph 2100 also depicts an example output waveform 2105 based on an aggregation of correlation output signals based on the correlation of the short pattern SP=S with instances of the first reference pattern R1 and the second reference pattern R2. For example, the example waveform 2101 can represent the aggregator output signal from the aggregator 1910 described above with reference to FIG. 19 when the short pattern is received. The output waveform 2105 does not include any notable peaks or at least the peaks are relatively small compared to the large positive peak 2102 corresponding to the aggregation of peaks resulting from the long pattern LP=[$\bar{S}$, T, $\bar{T}$, $\bar{S}$].

Figure 21B:
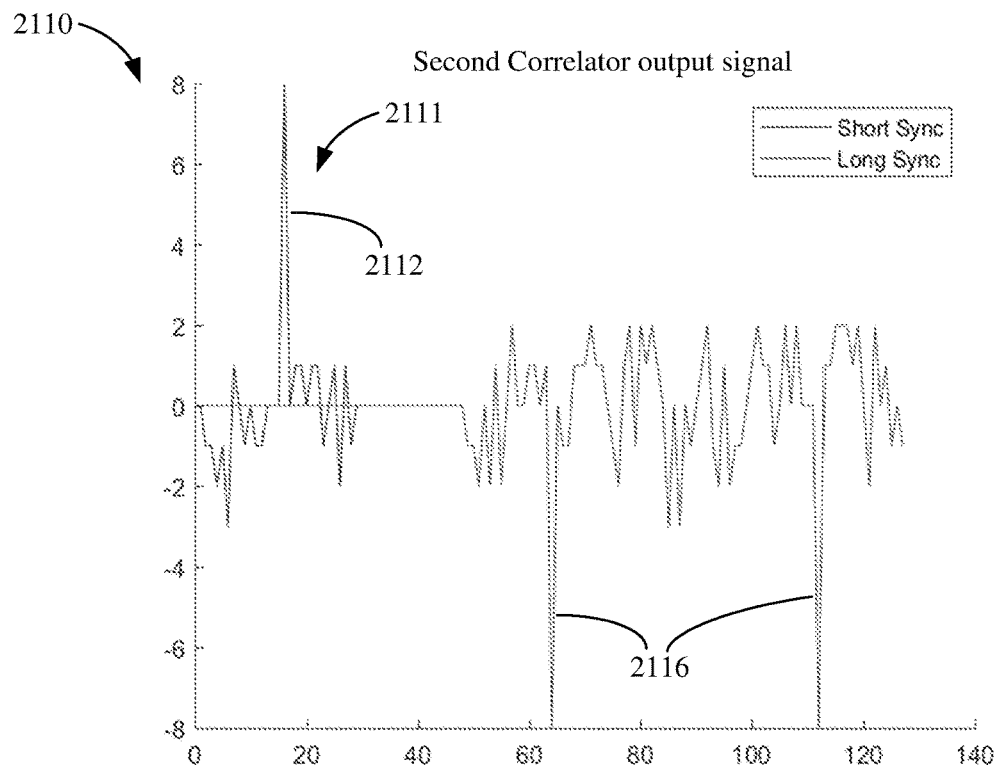
FIG. 21B shows a graph depicting an example waveform based on a correlation of a short pattern.

FIG. 21B shows a graph 2110 depicting an example waveform 2111 based on a correlation of the short pattern SP=S with the first reference pattern RE For example, the example waveform 2111 can represent the correlator output signal from the first correlator 1930S described above with reference to FIG. 19 when a short pattern is received. The output waveform 2111 includes a large positive peak 2112 in the first correlator output signal $CS_1$ resulting from a presence of the first sequence S in the short pattern.

The graph 2110 also depicts an example output waveform 2115 based on a correlation of the long pattern LP=[$\bar{S}$, T, $\bar{T}$, $\bar{S}$] with instances of the first reference pattern R1. For example, the example waveform 2115 can represent the correlator output signal from the first correlator 1930S described above with reference to FIG. 19 when a long pattern is received.

In addition, because the short pattern includes the first sequence S and the long pattern does not include any instances of the first sequence S, the waveform 2111 based on a correlation of the short pattern SP=S with the first reference pattern R1 will have a large positive peak, whereas the output waveform 2115 based on a correlation of the long pattern LP=[$\bar{S}$, T, $\bar{T}$, $\bar{S}$] with instances of the first reference pattern R1 will have negative peaks (such as peaks 2116) but not positive peaks.

Figure 22:
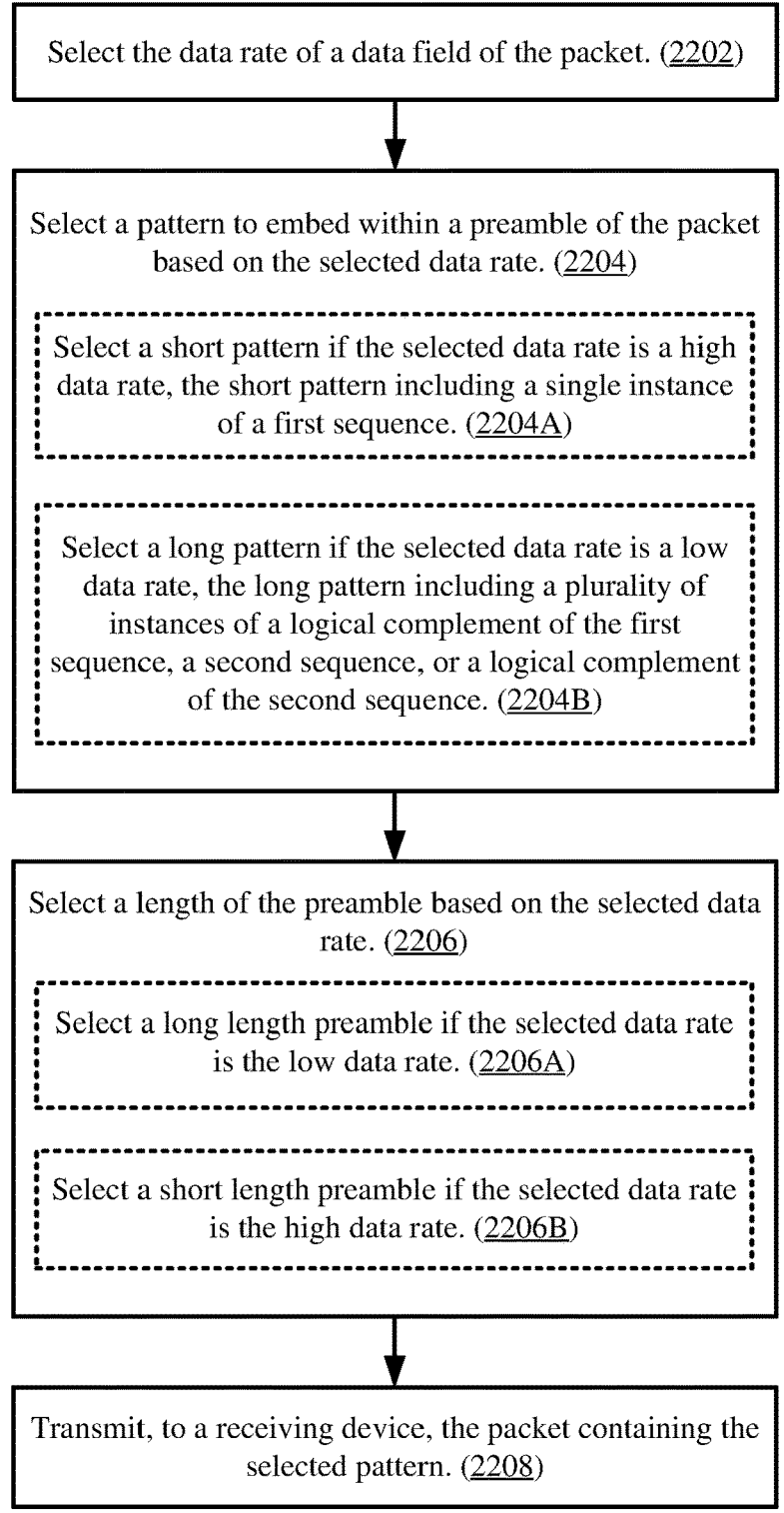
FIG. 22 shows an illustrative flow chart depicting another example operation for indicating a data rate of a transmitted packet.

FIG. 22 shows an illustrative flow chart depicting another example operation 2200 for indicating a data rate of a transmitted packet. The example operation 2200 may be performed by any suitable wireless device including, for example, the AP 110 of FIG. 1, any of the wireless devices WD1-WD4 of FIG. 1, or the wireless device 200 of FIG. 2. The transmitting device selects the data rate of a data field of the packet (2202). In some implementations, the transmitting device may select between a low data rate and a high data rate. In some aspects, the low data rate is 62.5 kb/s, and the high data rate is 250 kb/s.

The transmitting device selects a pattern to embed within a preamble of the packet based on the selected data rate (2204). In some implementations, the transmitting device selects a short pattern if the selected data rate is the high data rate, the short pattern including a single instance of the first sequence (2204A), and selects a long pattern if the selected data rate is the low data rate, the long pattern including a plurality of instances of a logical complement of the first sequence, a second sequence, or a logical complement of the second sequence (2204B). In some implementations, the first and second sequences S and T are different from each other, for example, where S=[0,1,0,1,1,0,0,1,1,1,1,0,1,0,0,0] and T=[1,1,1,0,0,1,0,1,0,1,1,0,1,0,0,0]. In some aspects, the short pattern SP=S, and the long pattern LP=[$\overline{S}$, T, T, $\overline{S}$].

The transmitting device selects a length of the preamble based on the selected data rate (2206). In some implementations, the transmitting device selects a long length preamble if the selected data rate is the low data rate (2206A), and selects a short length preamble if the selected data rate is the high data rate (2206B). In some aspects, the long preamble is configured to contain the long pattern, and the short preamble is configured to contain the short pattern.

The transmitting device then transmits, to a receiving device, the packet including the preamble containing the selected pattern (2208). The packet may be transmitted by modulating an OFDM waveform using an ON-OFF Keying (OOK) modulation scheme. In some aspects, a presence of the long pattern in the preamble may indicate that the packet is transmitted at the low data rate, and a presence of the short pattern in the preamble may indicate that the packet is transmitted at the high data rate.

Figure 23:
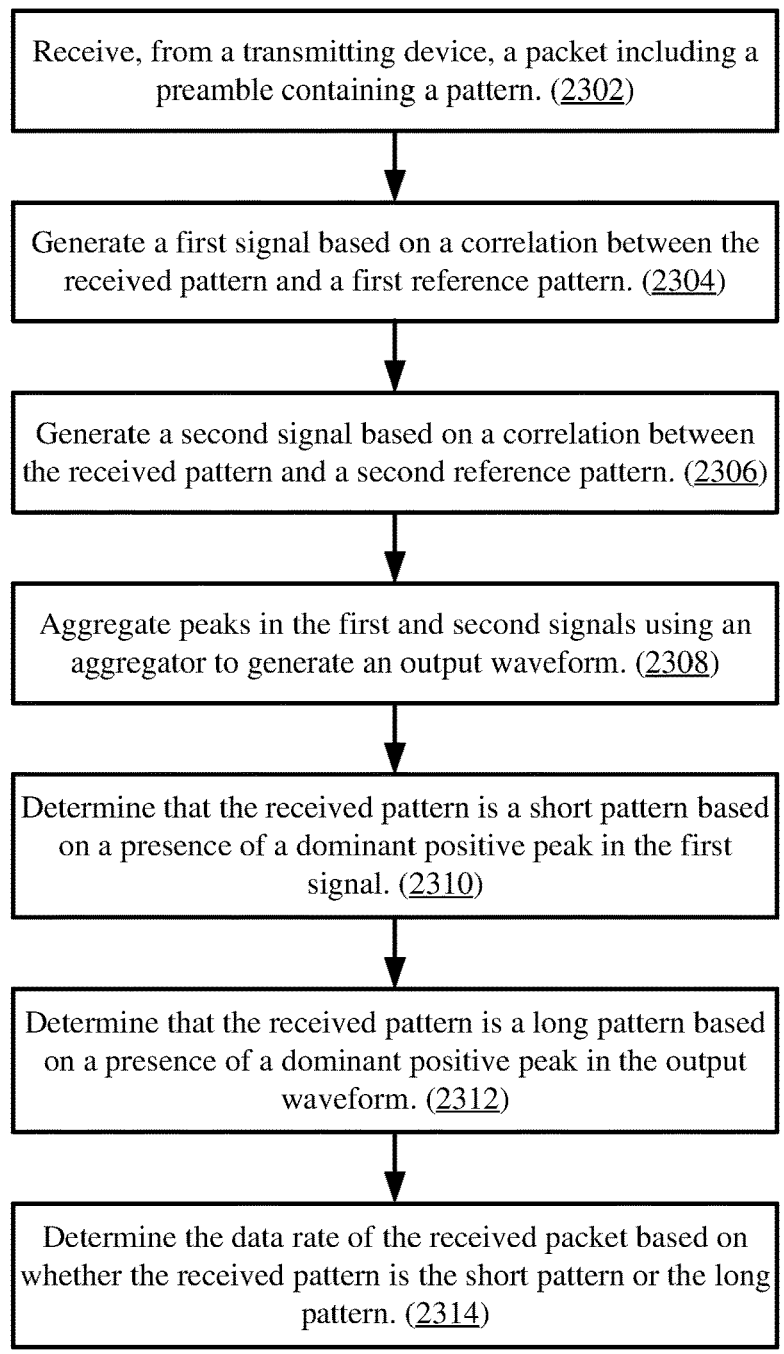
FIG. 23 shows an illustrative flow chart depicting another example operation for determining a data rate of a received packet.

FIG. 23 shows an illustrative flow chart depicting another example operation 2300 for determining a data rate of a received packet. The example operation 2300 may be performed by any suitable wireless device including, for example, the AP 110 of FIG. 1, any of the wireless devices WD1-WD4 of FIG. 1, or the wireless device 200 of FIG. 2. The receiving device receives, from a transmitting device, a packet including a preamble containing a pattern (2302). In some implementations, the preamble may be a short preamble that contains a short pattern, or may be a long preamble that contains a long pattern. The short pattern may include a single instance of a first sequence S, and the long pattern may include a plurality of instances of the complemented first sequence $\overline{S}$, the second sequence T, or the complemented second sequence $\overline{T}$.

The receiving device generates a first signal based on a correlation between the received pattern and a first reference sequence R1 (2304), and generates a second signal based on a correlation between the received pattern and a second reference sequence R2 (2306). In some implementations, the receiving device may use the first correlator 1930S to correlate the short pattern with the first reference pattern R1. In some aspects, a large positive peak in the first signal may indicate that the received pattern is the short pattern.

The receiving device aggregates peaks in the first and second signals using an aggregator to generate an output waveform (2308).

The receiving device may determine that the received pattern is a short pattern based on a presence of a dominant positive peak in the first signal (2310), and may determine that the received pattern is a long pattern based on a presence of a dominant positive peak in the output waveform (2312). In some implementations, the presence of a dominant peak in the waveform generated by the first aggregator may indicate that the received pattern comprises the long pattern, and the presence of a dominant peak in the waveform generated by the second aggregator may indicate that the received pattern comprises the short pattern.

The receiving device determines the data rate of the received packet based on whether the received pattern is the short pattern or the long pattern (2314). In some aspects, the receiving device determines that the data rate of the packet is the low data rate if the received pattern is the long pattern, and determines that the data rate of the packet is the high data rate if the received pattern comprises the short pattern FIG. 24 shows a table 2400 depicting an example auto-correlation metric for the short pattern, example auto-correlation metric for the long pattern, example cross-correlation metric between the short pattern and the long pattern, and example cross-correlation metric between the long pattern and the short pattern.

Figures 24, 25:
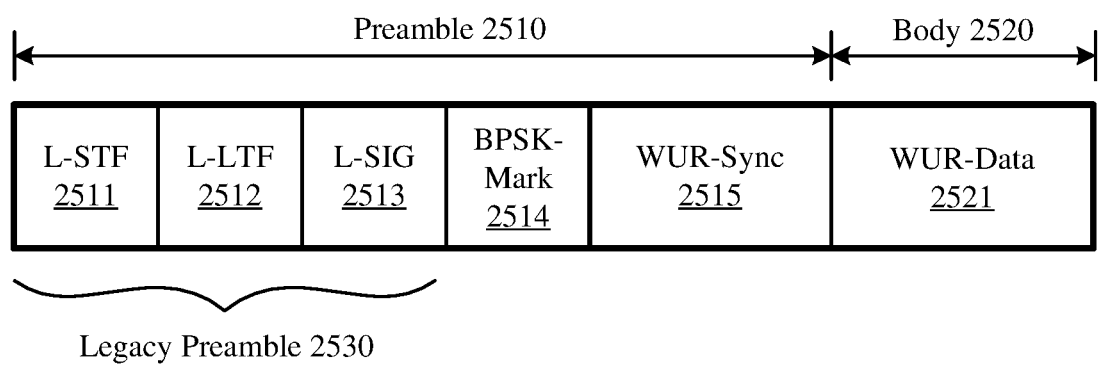
FIG. 24 shows a table depicting example auto-correlation and cross-correlation metrics for a short pattern and a long pattern.
FIG. 25 shows an example wake-up receiver packet.

FIG. 25 shows an example wake-up receiver (WUR) packet 2500. The WUR packet 2500 is shown to include a preamble 2510 and a body 2520. The body 2520 includes a WUR data field 2521. The WUR data field 2521 may be used to carry data to be transmitted from a transmitting device to a receiving device. In some implementations, data contained in the WUR data field 2521 may include a number protocol service data units (PSDUs). In addition, or in the alternative, data contained in the WUR data field 2521 may be encoded using Manchester-based encoding.

The preamble 2510 includes a legacy short training field (L-STF) 2511, a legacy long training field (L-LTF) 2512, a legacy signaling (L-SIG) field 2513, a BPSK-Mark field 2514, and a WUR-Sync field. The L-STF 2511, the L-LTF field 2512, and the L-SIG field 2513 may form a legacy preamble 2530. In some implementations, the legacy preamble 2530 may be transmitted using the same bandwidth as a bandwidth used to transmit the WUR-data field 2521. In other implementations, the legacy preamble 2530 may be transmitted using a larger bandwidth than the bandwidth used to transmit the WUR-data field 2521. In some aspects, the legacy preamble 2530 may be transmitted using a 20 MHz channel, and the WUR-data field 2521 may be transmitted using a 4 MHz channel (or any higher bandwidth channel).

The L-STF 2511 may include information for coarse frequency estimation, automatic gain control, and timing recovery. The L-LTF 2512 may include information for fine frequency estimation, channel estimation, and fine timing recovery. The L-SIG field 2513 may include modulation and coding information including, for example, the MCS scheme used by the transmitting device to wirelessly transmit the WUR packet 2500.

The BPSK-Mark field 2514 may contain a BPSK modulated OFDM symbol.

The WUR-Sync field 2515 may be used to store a pattern that indicates the data rate at which the WUR data field 2521 of the WUR packet 2500 is transmitted. The WUR-Sync field 2515 may have a duration that is based on the data rate of the WUR data field 2521. For example, in some implementations, the WUR-Sync field 2515 may have a duration of either 64 µs or 128 µs depending on the data rate of the WUR data field 2521. As described, the WUR-Sync field 2515 may include a long pattern (having a duration of 128 µs) to indicate that the WUR data field 2521 is transmitted using the low data rate (such as 62.5 kb/s), and the WUR-Sync field 2515 may include a short pattern (having a duration of 64 µs) to indicate that the WUR data field 2521 is transmitted using the high data rate (such as 250 kb/s). In some implementations, the long pattern may be a first structure including two instances of the sequence W (concatenated together to form [W,W]), and the short pattern may be a second structure including a single instance of the logically complemented sequence $\overline{W}$.

During transmission of the WUR packet 2500, a PSDU may be processed and appended to the preamble 2510 as the WUR-Data field 2521. A legacy receiving device may process and decode the legacy preamble 2530 to assist in the protection of the WUR data, and may process the WUR-Sync field 2515 to aid in the detection, demodulation, and delivery of the PSDU.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for indicating a data rate of a packet, the method performed by a transmitting device and comprising:
    selecting the data rate of a data field of the packet;
    selecting a sequence;
    indicating a reference pattern to a receiving device, the reference pattern based on the selected sequence;
    selecting a first pattern including two instances of the selected sequence when the selected data rate is a low data rate, the first pattern configured to generate two positive peaks in a signal based on a correlation between the first pattern and the reference pattern;
    selecting a second pattern including one instance of a logical complement of the selected sequence when the selected data rate is a high data rate, the second pattern configured to generate one negative peak in the signal based on a correlation between the second pattern and the reference pattern; and
    transmitting the packet to the receiving device, the preamble of the packet including either the first pattern or the second pattern based on the selected data rate.

2. The method of claim 1, wherein the first number is greater than the second number, the low data rate is approximately 62.5 kb/s, and the high data rate is approximately 250 kb/s.

3. The method of claim 1, wherein the second structure further includes one or more instances of a second sequence or one or more instances of a logical complement of the second sequence.

4. The method of claim 1, wherein the second structure further includes one or more instances of a pad sequence.

5. The method of claim 1, wherein the selected pattern is embedded within a Sync field of the packet preamble.

6. The method of claim 1, wherein the selected pattern is transmitted by modulating an OFDM waveform using an ON-OFF keying modulation scheme.

7. The method of claim 1, further comprising:
    selecting a length of the preamble based on the selected data rate.

8. The method of claim 1, wherein the reference pattern is derived from the sequence by:
    converting each logical low bit of the sequence to a negative one; and
    converting each logical high bit of the sequence to a positive one.

9. The method of claim 1, wherein the selected sequence comprises a maximum length sequence (MLS).

10. The method of claim 1, wherein the selected sequence is configured to indicate the first data rate, and the logical complement of the selected sequence is configured to indicate the second data rate.

11. The method of claim 1, wherein the first pattern is configured to generate noise in the correlation signal when the first pattern and the reference pattern are misaligned in time.

12. A transmitting device, comprising:
one or more processors; and
a memory storing instructions that, when executed by the one or more processors, cause the transmitting device to:
select a data rate of a data field of the packet;
select a sequence;
indicate a reference pattern to a receiving device, the reference pattern based on the selected sequence;
select a first pattern including two instances of the selected sequence when the selected data rate is a low data rate, the first pattern configured to generate two positive peaks in a signal based on a correlation between the first pattern and the reference pattern;
select a second pattern including one instance of a logical complement of the selected sequence when the selected data rate is a high data rate, the second pattern configured to generate one negative peak in the signal based on a correlation between the second pattern and the reference pattern; and
transmit the packet to the receiving device, the preamble of the packet including either the first pattern or the second pattern based on the selected data rate.

13. The transmitting device of claim 12, wherein the first number is greater than the second number, the low data rate is approximately 62.5 kb/s, and the high data rate is approximately 250 kb/s.

14. The transmitting device of claim 12, wherein the second structure further includes one or more instances of a second sequence or one or more instances of a logical complement of the second sequence.

15. The transmitting device of claim 12, wherein the second structure further includes one or more instances of a pad sequence.

16. The transmitting device of claim 12, wherein the selected pattern is embedded within a Sync field of the packet preamble.

17. The transmitting device of claim 12, wherein the selected pattern is transmitted by modulating an OFDM waveform using an ON-OFF keying modulation scheme.

18. The transmitting device of claim 12, wherein execution of the instructions further causes the transmitting device to:
select a length of the preamble based on the selected data rate.

19. The transmitting device of claim 8, wherein the reference pattern is derived from the sequence by:
converting each logical low bit of the sequence to a negative one; and
converting each logical high bit of the sequence to a positive one.

20. The transmitting device of claim 12, wherein the selected sequence comprises a maximum length sequence (MLS).

21. The method of claim 1, wherein the selected sequence is configured to indicate the first data rate, and the logical complement of the selected sequence is configured to indicate the second data rate.

22. The transmitting device of claim 12, wherein the first pattern is configured to generate noise in the correlation signal when the first pattern and the reference pattern are misaligned in time.

23. A non-transitory computer-readable medium storing one or more programs containing instructions that, when executed by one or more processors of an apparatus, cause the apparatus to perform operations comprising:
selecting a data rate of a data field of a packet to be transmitted to a receiving device selecting a sequence;
indicating a reference pattern to the receiving device, the reference pattern based on the selected sequence;
selecting a first pattern including two instances of the selected sequence when the selected data rate is a low data rate, the first pattern configured to generate two positive peaks in a signal based on a correlation between the first pattern and the reference pattern;
selecting a second pattern including one instance of a logical complement of the selected sequence when the selected data rate is a high data rate, the second pattern configured to generate one negative peak in the signal based on a correlation between the second pattern and the reference pattern; and
transmitting the packet to the receiving device, the preamble of the packet including either the first pattern or the second pattern based on the selected data rate.

24. The non-transitory computer-readable medium of claim 23, wherein the first number is greater than the second number, the low data rate is approximately 62.5 kb/s, and the high data rate is approximately 250 kb/s.

25. The non-transitory computer-readable medium of claim 23, wherein the second structure further includes one or more instances of a second sequence or one or more instances of a logical complement of the second sequence.

26. The non-transitory computer-readable medium of claim 23, wherein the second structure further includes one or more instances of a pad sequence.

27. The non-transitory computer-readable medium of claim 23, wherein the selected pattern is embedded within a Sync field of the packet preamble.

28. The non-transitory computer-readable medium of claim 23, wherein execution of the instructions causes the apparatus to perform operations further comprising:
selecting a length of the preamble based on the selected data rate.

29. The non-transitory computer-readable medium of claim 23, wherein the reference pattern is derived from the sequence by:
converting each logical low bit of the sequence to a negative one; and
converting each logical high bit of the sequence to a positive one.

30. An apparatus, comprising:
means for selecting a data rate of a data field of a packet to be transmitted to a receiving device;
means for selecting a sequence;
means for indicating a reference pattern to the receiving device, the reference pattern based on the selected sequence;
means for selecting a first pattern including two instances of the selected sequence when the selected data rate is a low data rate, the first pattern configured to generate two positive peaks in a signal based on a correlation between the first pattern and the reference pattern;
means for selecting a second pattern including one instance of a logical complement of the selected sequence when the selected data rate is a high data rate, the second pattern configured to generate one negative peak in the signal based on a correlation between the second pattern and the reference pattern; and means for transmitting the packet to the receiving device, the preamble of the packet including either the first pattern or the second pattern based on the selected data rate.

* * * * *